(12) United States Patent
Lukic et al.

(10) Patent No.: US 11,356,015 B2
(45) Date of Patent: Jun. 7, 2022

(54) MODULAR MEDIUM VOLTAGE FAST CHARGERS

(71) Applicant: NORTH CAROLINA STATE UNIVERSITY, Raleigh, NC (US)

(72) Inventors: Srdjan Lukic, Raleigh, NC (US); Xinyu Liang, Raleigh, NC (US); Chi Zhang, Apex, NC (US); Srdjan Srdic, Vienna (AT)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/611,773

(22) PCT Filed: May 9, 2018

(86) PCT No.: PCT/US2018/031903
§ 371 (c)(1),
(2) Date: Nov. 7, 2019

(87) PCT Pub. No.: WO2018/208991
PCT Pub. Date: Nov. 15, 2018

(65) Prior Publication Data
US 2021/0152080 A1 May 20, 2021

Related U.S. Application Data

(60) Provisional application No. 62/504,247, filed on May 10, 2017.

(51) Int. Cl.
*H02M 1/42* (2007.01)
*H02M 7/487* (2007.01)
(Continued)

(52) U.S. Cl.
CPC .......... *H02M 1/4258* (2013.01); *H01F 19/00* (2013.01); *H01F 27/325* (2013.01);
(Continued)

(58) Field of Classification Search
CPC ....... H02M 1/4208; H02M 7/487; H02M 7/49
(Continued)

(56) References Cited

U.S. PATENT DOCUMENTS 6,058,031 A * 5/2000 Lyons ................... H02M 7/487
363/132
7,518,886 B1 * 4/2009 Lai ........................... H02P 8/12
363/17
(Continued)

FOREIGN PATENT DOCUMENTS

CN 106533152 3/2017
CN 106533152 A * 3/2017
(Continued)

OTHER PUBLICATIONS

European Application 18798134.5, Extended European Search Report, dated Apr. 13, 2021, 12 pages.
(Continued)

*Primary Examiner* — Gary A Nash
(74) *Attorney, Agent, or Firm* — Kilpatrick Townsend and Stockton LLP

(57) ABSTRACT

Certain embodiments involve a modular medium voltage fast charger. The modular medium voltage fast charger can include: (1) a predictive power factor correction ("PFC") controller (or predictive controller) for series-interleaved multi-cell three-level boost ("SIMCB") converters, (2) an active neutral point clamped ("NPC") dual active bridge ("DAB") modulation scheme to achieve soft switching, (3) an auxiliary capacitor to reduce NPC DAB turn-off voltages, (4) a comprehensive and scalable protection circuit, and (5) a high-isolation pulse transformer with a bobbin for reducing coupling capacitance of the pulse transformer.

6 Claims, 77 Drawing Sheets

(51) Int. Cl.
| | |
|---|---|
| H02M 7/49 | (2007.01) |
| H01F 19/00 | (2006.01) |
| H01F 27/32 | (2006.01) |
| H02H 3/02 | (2006.01) |
| H02J 7/06 | (2006.01) |
| H02M 1/12 | (2006.01) |
| H02M 1/14 | (2006.01) |
| H02M 3/158 | (2006.01) |
| H02M 3/335 | (2006.01) |
| H02M 1/00 | (2006.01) |

(52) U.S. Cl.
CPC ............... *H02H 3/02* (2013.01); *H02J 7/06* (2013.01); *H02M 1/12* (2013.01); *H02M 1/14* (2013.01); *H02M 1/4225* (2013.01); *H02M 1/4233* (2013.01); *H02M 3/1584* (2013.01); *H02M 3/33584* (2013.01); *H02M 7/487* (2013.01); *H02M 1/007* (2021.05); *H02M 1/0074* (2021.05); *H02M 1/4208* (2013.01); *H02M 7/49* (2013.01)

(58) Field of Classification Search
USPC ........................................ 363/34, 65, 67, 68
See application file for complete search history.

(56) References Cited

U.S. PATENT DOCUMENTS

| | | | | |
|---|---|---|---|---|
| 9,257,864 | B2* | 2/2016 | Pahlevaninezhad | H02J 7/022 |
| 2005/0017699 | A1* | 1/2005 | Stanley ............... | H02M 1/4208 |
| | | | | 323/282 |
| 2008/0112200 | A1* | 5/2008 | Tan ....................... | H02M 7/487 |
| | | | | 363/101 |
| 2015/0146455 | A1* | 5/2015 | Engel ................ | H02M 3/33584 |
| | | | | 363/17 |
| 2016/0016479 | A1* | 1/2016 | Khaligh .................. | H01F 38/08 |
| | | | | 363/17 |
| 2016/0118877 | A1* | 4/2016 | Zhang ..................... | H02M 7/04 |
| | | | | 363/52 |

FOREIGN PATENT DOCUMENTS

| | | | | |
|---|---|---|---|---|
| EP | 2808879 | A1 * | 12/2014 | ......... H01F 27/2895 |
| EP | 2808879 | | 10/2015 | |

OTHER PUBLICATIONS

European Application 18798134.5, Partial Supplementary European Search Report, dated Jan. 13, 2021, 12 pages.

Liang, X., et al., "Predictive Control of a Series-Interleaved Multicell Three-Level Boost Power-Factor-Correction Converter", Institute of Electrical and Electronics Engineers, Transactions on Power Electronics, vol. 33, No. 10, Oct. 2018, pp. 8948-8960.

Rothmund, D., et al., "SiC-Based Unidirectional Solid-State Transformer Concepts for Directly Interfacing 400V DC to Medium-Voltage AC Distribution Systems", Institute of Electrical and Electronics Engineers, 36th International Telecommunications Energy Conference (INTELEC), XP032694475, Sep. 28, 2014, 9 pages.

Rufer, A., "High-Power High-Voltage Isolated DC-DC Converters using an NPC Balanced Capacitive Divider", Institute of Electrical and Electronics Engineers, 17th European Conference on Power Electronics and Applications (EPE'15 ECCE—Europe), Sep. 8-10, 2015, 10 pages.

PCT/US2018/031903 , "International Preliminary Report on Patentability", dated Nov. 21, 2019, 6 pages.

PCT/US2018/031903 , "International Search Report and Written Opinion", dated Aug. 23, 2018, 8 pages.

* cited by examiner

| Region | Operating Mode | Current Ripple Slope |
|---|---|---|
| $\|v_{in}\| < \dfrac{v_{bus}}{2}$ | 1 | $\dfrac{\|v_{in}\|}{L_{boost}}$ |
| $\|v_{in}\| < \dfrac{v_{bus}}{2}$ | 2, 3 | $\dfrac{2\|v_{in}\| - v_{bus}}{2L_{boost}}$ |
| $\|v_{in}\| > \dfrac{v_{bus}}{2}$ | 2, 3 | $\dfrac{2\|v_{in}\| - v_{bus}}{2L_{boost}}$ |
| $\|v_{in}\| > \dfrac{v_{bus}}{2}$ | 4 | $\dfrac{\|v_{in}\| - v_{bus}}{L_{boost}}$ |

FIG. 3

| Component | Value | Component | Value |
|---|---|---|---|
| $L_{grid}$ | 16mH | $L_{boost}$ | 0.8mH |
| $C_f$ | 30nF | $C_{bus}$ | 1.1mF |
| $C_d$ | 1uF | $V_{cbus}$ | 800V |
| $R_d$ | 40Ω | $V_{in}$ | 2.4kVrms |
| $f_{sw}$ | 25kHz | $t_c$ | 1μs |

FIG. 15

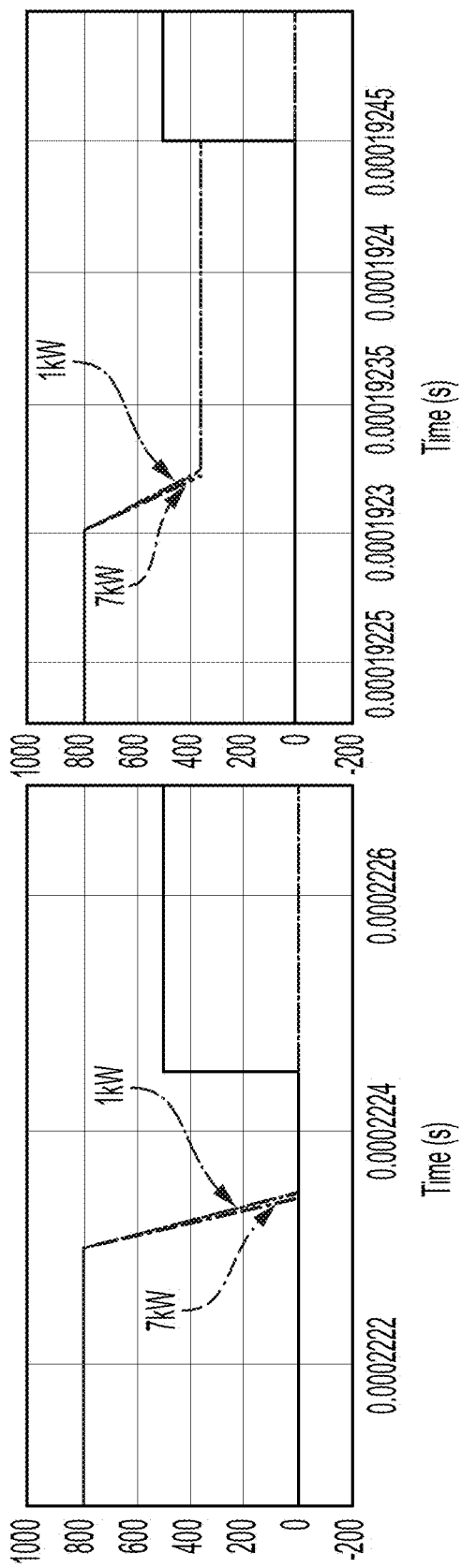

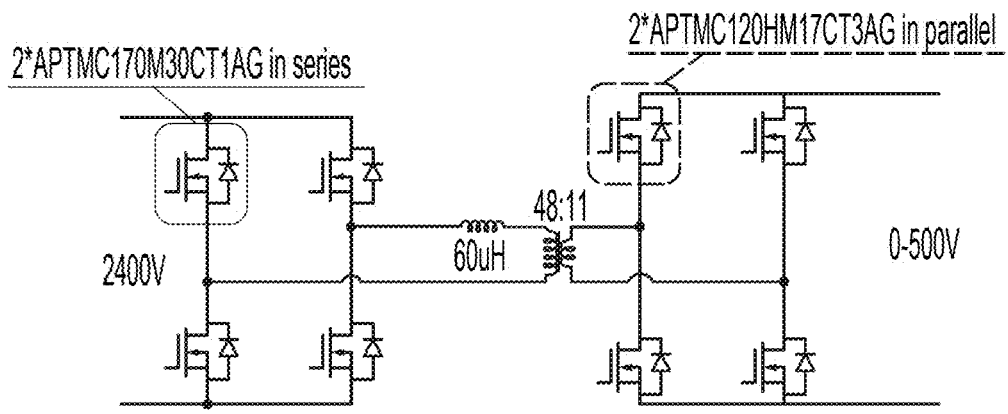
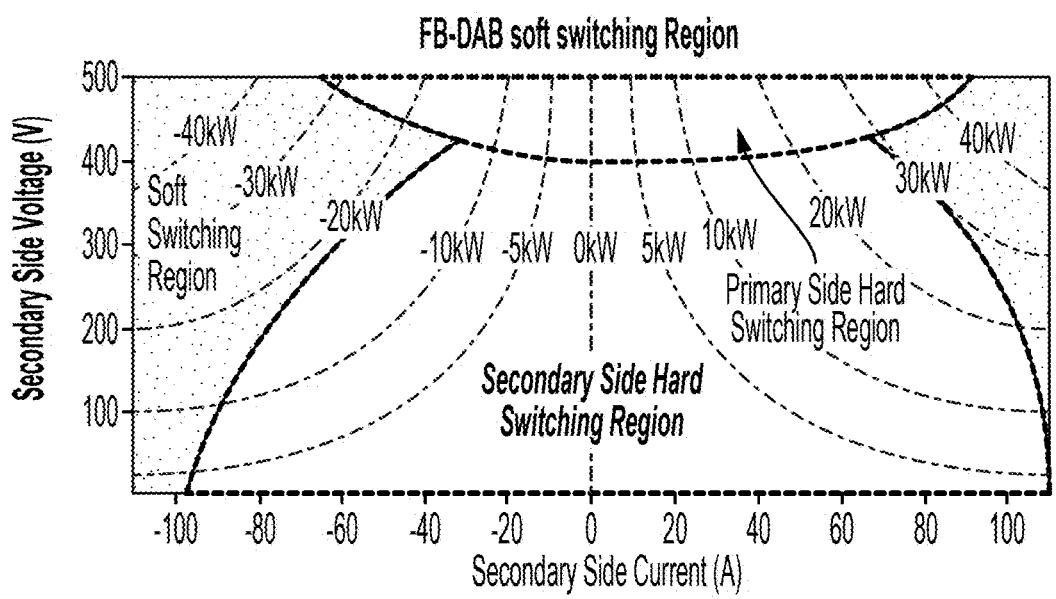
FIG. 47

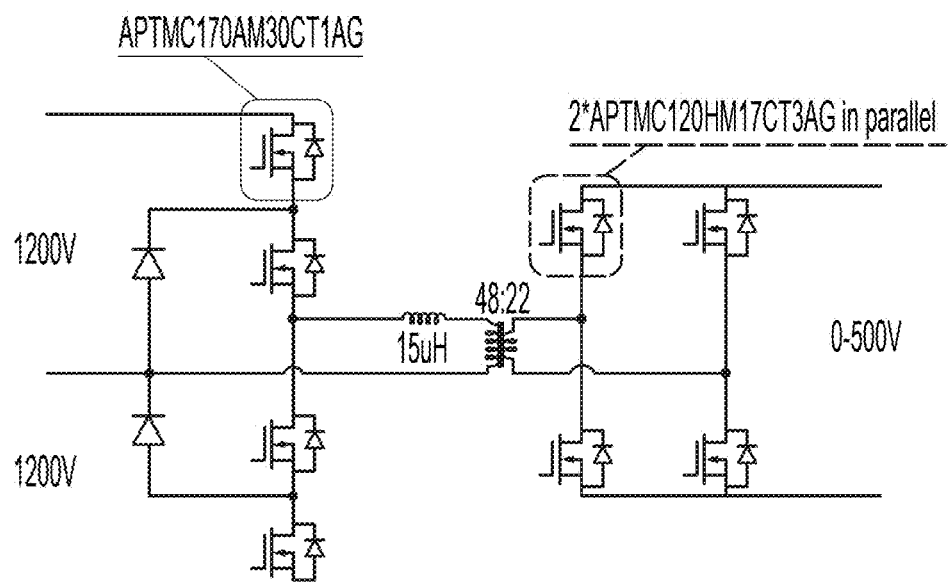
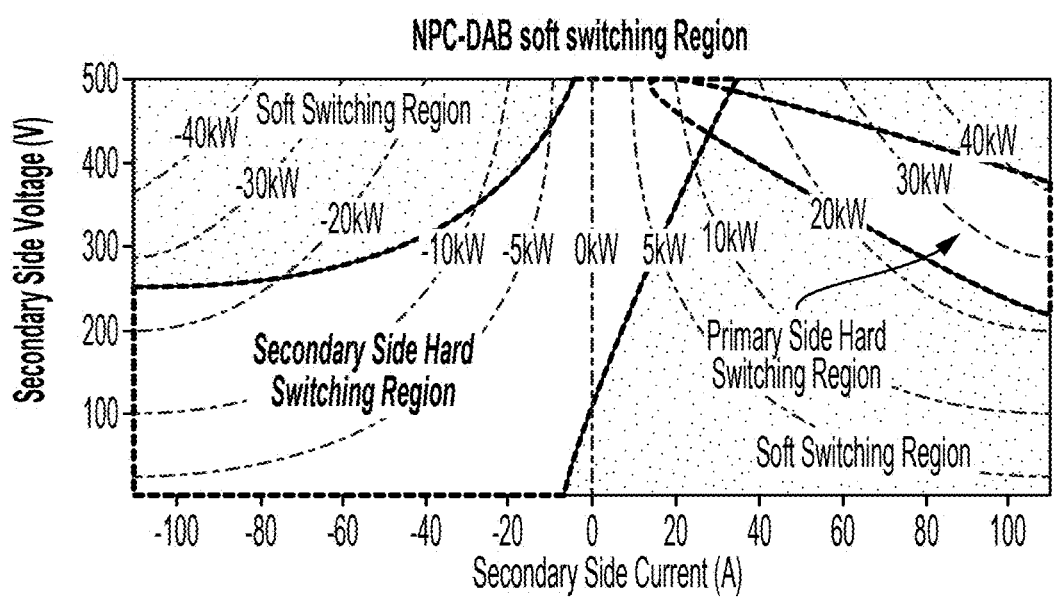
FIG. 48

| | $V_{GS1}$ | $V_{GD1}$ | $V_{GS2}$ | $V_{GD2}$ | $V_{GS3}$ |
|---|---|---|---|---|---|
| Initial | 0 | $V_{dc}/2$ | $V_{dc}/2$ | 0 | $V_{dc}/2$ |
| Final | $V_{dc}/2$ | 0 (D1 on) | $V_x$ | $V_x$ | $V_{dc}/2 - V_x$ |

FIG. 53

MODULAR MEDIUM VOLTAGE FAST CHARGERS

CROSS-REFERENCE TO RELATED APPLICATIONS

This application is a U.S. national phase of International Application PCT/US2018/031903 filed May 5, 2018, which claims priority to U.S. Provisional Application No. 62/504,247, titled "Modular Medium Voltage Fast Chargers" and filed May 10, 2017, the entirety of each of which is hereby incorporated by reference herein.

This invention was made with government support under grant number DE-EE0006521 awarded by the Department of Energy. The government has certain rights to this invention.

TECHNICAL FIELD

The present disclosure relates generally to solid-state transformer ("SST")-based medium-voltage rectifiers. More specifically, but not by way of limitation, this disclosure relates to SST-based modular medium-voltage rectifiers implemented as electric vehicle chargers.

BACKGROUND

A rectifier such as, for example, a solid-state rectifier, is an electrical device that converts alternating current ("AC") to direct current ("DC"). In some instances, DC generated using the rectifier can be used to operate or power one or more devices, circuits, or other DC loads.

SUMMARY

In one example, a system includes one or more power electronic converters connected to a power grid and a rectifier. The system further includes a power factor correction ("PFC") converter comprising one or more three-level boost ("TLB") power electronic converters comprising one or more input terminals and output terminals. The system also includes one or more DC/DC converters comprising a plurality of input terminals. The input terminals of the TLB converters can be connected in series and the output terminals of the TLB converters are connected to the input terminals of the DC/DC converter. The system also includes an input interface for measuring a rectifier input current, grid voltage, and TLB converter output voltage. The system further includes a processing device for controlling the rectifier input current to be in phase with the grid voltage by applying one or more control signals to each of a plurality of active semiconductor switches inside each TLB converter.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

FIG. 3 is a table showing various operation mode distributions and a corresponding current ripple slope and operation region, according to some aspects.

FIG. 15 is a table showing various circuit parameter values, according to some aspects.

FIGS. 43-46 depict an example of a performance comparison between passive and active NPC, according to some aspects.

FIGS. 47-49 depict soft switching regions for the full-bridge DAB ("FB-DAB"), NPC-DAB and active NPC-DAB ("A-NPC-DAB") in a fast charger application, according to some aspects.

FIG. 53 is table listing an initial condition and a final voltage for each of various capacitors, according to some aspects.

DETAILED DESCRIPTION

Certain aspects and features of the present disclosure relate to a modular medium-voltage rectifiers and a medium-voltage fast charger as a preferred embodiment of the disclosure. In some aspects, the modular medium voltage fast charger can include: (1) a PFC for series-interleaved multi-cell three-level boost ("SIMCB") converters, (2) an active neutral point clamped ("NPC") dual active bridge ("DAB") modulation scheme to achieve soft switching, (3) an auxiliary capacitor to reduce NPC DAB turn-off voltages, (4) a comprehensive and scalable protection circuit, and (5) a high-isolation pulse transformer with a bobbin for reducing coupling capacitance of the pulse transformer.

Connecting devices to an AC source (e.g., a power grid) can include a boost converter for adjusting a voltage and a current of a power signal. A boost converter can have different modes of operation based on a phase and amplitude of AC source voltage and current. In some aspects, a PFC controller can determine a duty cycle for boost converters using a single equation that covers each of the different modes of operation of the boost converter. The PFC controller can use the single equation to improve the performance of the boost converter.

Figure 11:
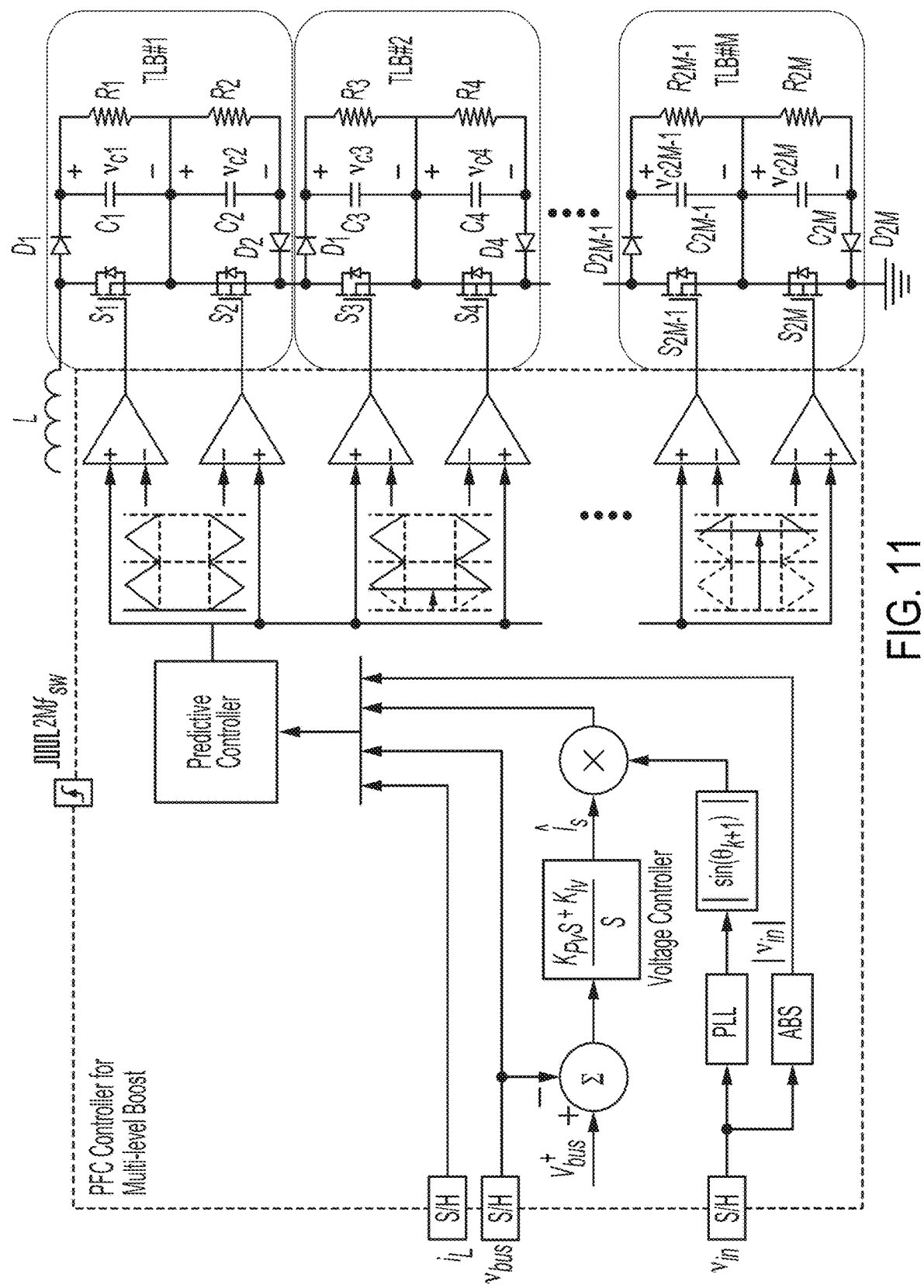
FIG. 11 depicts an example of a N-switch multi-level boost topology predictive control diagram with M TLB converters connected in series, according to some aspects.

In some embodiments, a predictive PFC controller can accurately predict an input current for different operating regions of the SIMCB converters in a single switching cycle without detecting the operating region of the SIMCB. The PFC controller can be used to control M series-interleaved three-level boosts (referred to as multi-cell topology), where M is a number of three-level boost stages that are connected in series, as shown in FIG. 11. In some examples, controlling the M series-interleaved three-level boosts can advantageously provide a more stable system operation that can avoid switching between modes of operation to provide predictive control. In some examples, the predictive PFC controller can produce a higher quality input current waveform by enabling the boost stage to operate with lower switching frequency and reducing the boost stage switching losses. In some examples, the predictive PFC controller can use a single equation and sample at a mid-point of a triangular carrier to provide high performance with low control complexity. The distortion of the input ac current near zero-crossing points can be significantly improved by the predictive PFC controller and low input current total harmonic distortion ("THD") can be achieved.

In some examples, a predictive PFC controller can use a universal equation for the different working regions of the multi-cell three-level boost to reduce the control complexity. The predictive PFC controller can work at the interleaved frequency, which can be determined by the switching frequency multiplied by the number of boost stages that are connected in series (e.g., in the system shown in FIG. 11, the number of boost stages is 2M). The generated next state duty cycle from the universal equations can be applied to every switch of the multi-cell three-level boost instantaneously, which can provide the fastest control able to be achieved. In some examples, the predictive PFC controller can provide predictive current control, which can result in reduced THD and can substantially minimize the current distortion around the current zero crossing point. In additional or alternative examples, a system including the predictive PFC controller that has high bandwidth may have system level benefits by reducing the size of the passive components including the input filter, input inductor and the DC-link capacitors. The simulation and experiment results included below indicate that the predictive PFC controller can achieve the control goals for a MV fast charger. In some instances, simulations of a boost stage have shown that the switching frequency can be reduced down to 10 kHz (while keeping the input current THD below 2%), which can reduce power losses by 130 W, compared to operating at 25 kHz.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

In some examples, a SST-based medium voltage ("MV") rectification can have high energy efficiency. The SST based MV rectification can be used in wind turbines, photovoltaics, battery storage, and electrical vehicle applications as depicted in FIG. 1.

Figure 1:
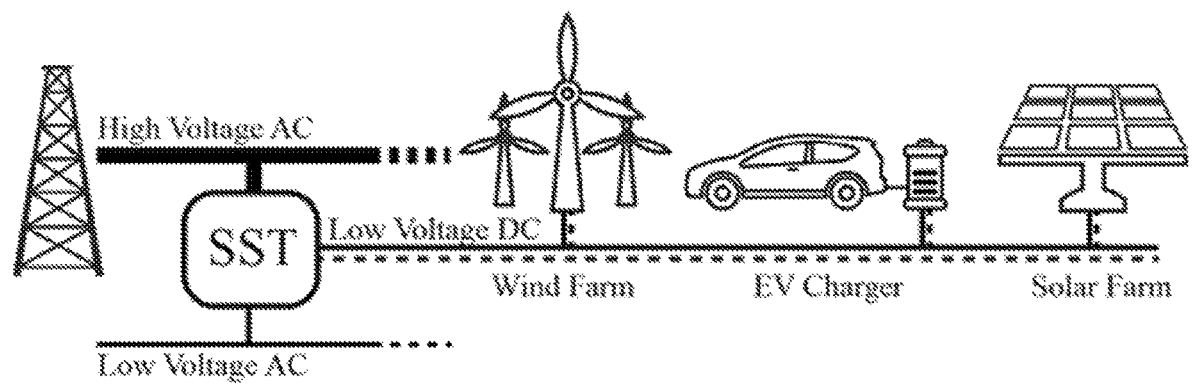
FIG. 1 is a schematic diagram depicting a hybrid microgrid connected by a SST, according to some aspects.

FIG. 1 is a schematic diagram depicting a hybrid microgrid connected to a MV grid by SST, according to some aspects.

In the example depicted in FIG. 1, the SST can be an interface between the medium voltage AC and the low voltage DC, and low voltage AC. Wide band-gap ("WBG") devices (e.g., silicon carbide ("SiC") devices) can enable the SST based MV rectifier to operate in a higher switching frequency with substantial reduction in losses and significant improvement in power density. A modular MV WBG fast charger can use WBG semiconductor power devices to reduce overall system costs, increase efficiency by reducing losses, and reduce volume and weight.

Illustrative Examples of a System and Method for Predictive Control of a Series-Interleaved Multi-Cell Three-Level Boost Power Factor Correction Converter In some examples, a TLB topology can be stacked in series to meet the high voltage requirements for medium voltage application. In some instances, by interleaving the boost stages, the size of the input inductor can be reduced.

In some aspects, predictive current control for a TLB topology is based on interleaved leading-triangle modulation. The predictive current control can provide stable performance and noticeable improvement of THD and zero-crossing distortion. In an interleaving switching pattern, even though the dynamic models can be different for the two working regions, the next state duty equations may be identical. By applying the leading triangle modulation and suitable sampling strategy, an average current control can be achieved. In some examples, a stability analysis can show that predictive current control based on interleaved leading-triangle modulation can be intrinsically stable and provide single-cycle or substantially real-time predictions.

In additional or alternative aspects, predictive current control based on interleaved leading-triangle modulation can be used with N-switch boost topologies. For example, a seven-level boost topology for a MV Fast Charger, with a total dc-link voltage of 4.8 kV, output power 50 kW can provide good input current THD and stable performance.

Figure 2:
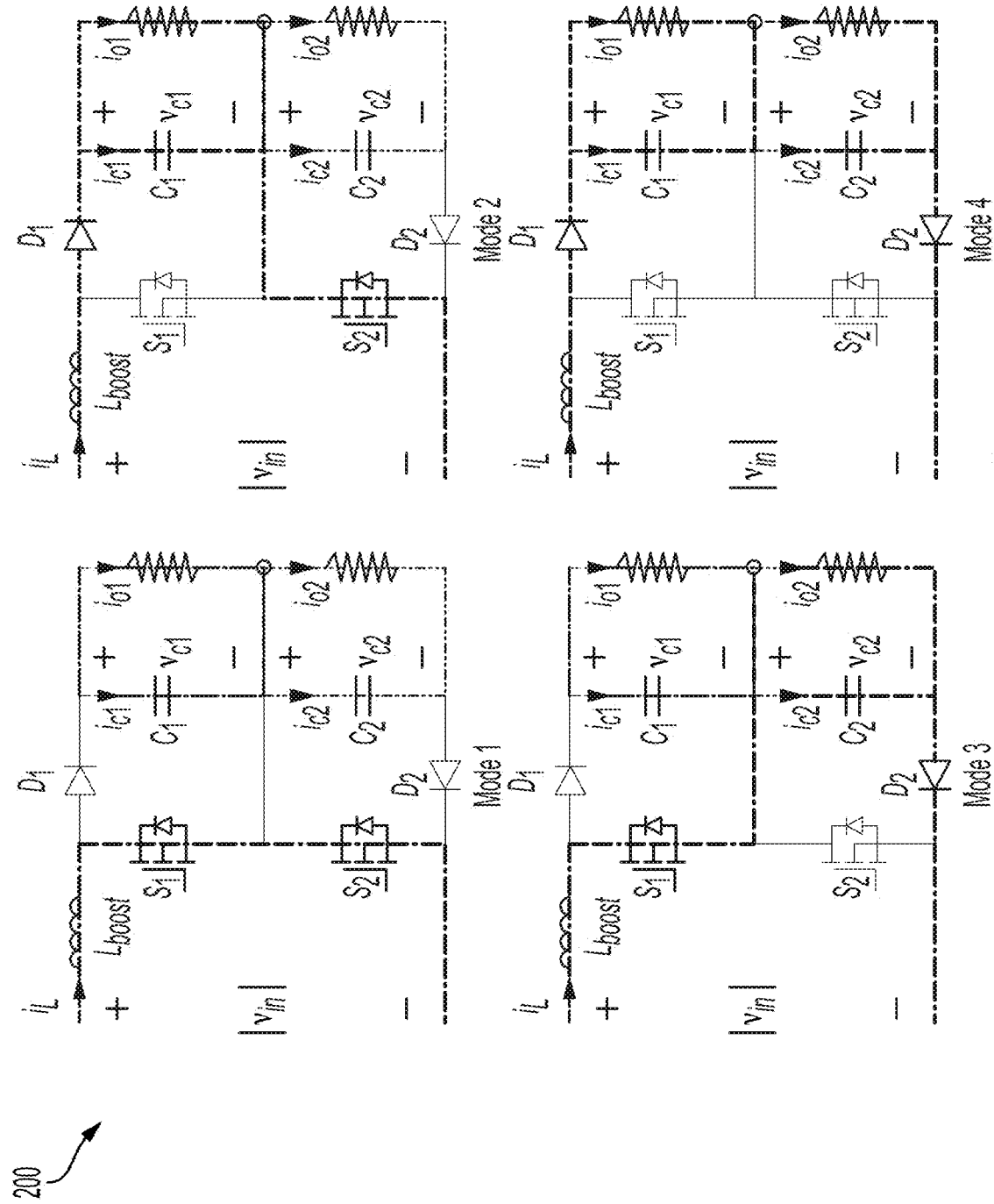
FIG. 2 is a schematic diagram depicting four operation modes of a TLB topology, which can be defined by various states of two switching devices, according to some aspects.

In some examples, a TLB topology can have four operating modes, which can be defined by four possible states of two switching devices ($S_1,S_2$). For instance, FIG. 2 is a schematic diagram depicting four operation modes of a TLB topology 200, which can be defined by various states of two switching devices, according to some aspects. In the example depicted in FIG. 2, the TLB topology can have four operations mode, which can be defined by four possible states of two switching devices namely (1,1), (1,0), (0,1), (0,0), as shown in FIG. 2.

In some aspects, the TLB 200 can operate with interleaved modulation, which can mean that the two switches can have carrier waveforms 180 degrees shifted. The interleaved mode can lower a maximum current ripple to $$\Delta i = \frac{V_o T_s}{16 L},$$

which can be the same as with two interleaved parallel boost converters and can be a quarter of other boost converters.

The TLB operation can be defined by two distinct operating regions, which can be determined by comparing an input voltage $v_{in}$ to a dc-link capacitor voltage $v_{c1}=v_{c2}=v_{dc}/2$, assuming capacitor voltages are balanced. In some examples, the converting ratio of the TLB can be the same as the conventional boost converter, $$\frac{v_{dc}}{v_{in}} = \frac{1}{1-d}.$$

In this example, comparing the input voltage $v_{in}$ to half of the dc-link voltage $v_{dc}/2$ can determine if the interleaved duty cycle is greater or less than 50%. With a 180-degree shifted interleaved pulse-width modulation ("PWM") duty greater than 50%, the switching state (0,0) can be eliminated from the circuit. Similarly, with an interleaved PWM duty less than 50%, no (1,1) switching will happen. In some examples, and based on Kirchhoff's Law, the operating modes distribution and the related current ripple slope for each operating region are listed in FIG. 3.

In a first region, $$\left(v_{in} < \frac{v_{bus}}{2}\right),$$

the duty cycle for the interleaved TLB can be larger than 50%. In some examples, in this region, a sub-circuit is changing between Mode 1 and either Mode 2 or Mode 3, depending on the acting switch. For Mode 1, both switches are turning on, the inductor receives a positive voltage $v_{in}$ and is charged, and the current ripple has a positive slope. For Mode 2 or Mode 3, the acting switch turns off to involve the related dc link capacitor into the circuit. Since $$v_{in} < \frac{v_{bus}}{2},$$

the voltage across the inductor, $$v_{in} - \frac{v_{bus}}{2},$$

is negative causing discharge with a downwards current ripple. The averaged inductor voltage and the current ripples are shown according to the following equations:

$$\langle v_L \rangle_{T_s} = |v_{in}| - (1-d)v_{bus} \quad (1)$$

$$\Delta i_{L\_up} = \frac{|v_{in}|}{Lf_s}(d - 0.5) \quad (2)$$

$$\Delta i_{L\_down} = \frac{0.5\, v_{bus} - |v_{in}|}{Lf_s}(1-d) \quad (3)$$

In the equations above, d is the duty cycle, $f_s$ is the switching frequency for each switch of the interleaved TLB. In some instances, TLB can be assumed as working at an interleaved switching pattern. So the active up ripple time period can be $$\frac{d - 0.5}{f_s}$$

and the down ripple time period can be $$\frac{1 - d}{f_s}.$$

In a second region, $$\left(\frac{v_{bus}}{2} < v_{in} < v_{bus}\right),$$

a duty cycle for the interleaved TLB can be less than 50%. In some examples, in this region, the sub-circuit can be changing between Mode 4 and either Mode 2 or Mode 3 depending on the acting switch. For Mode 2 and 3, only one dc-link capacitor is involved in the circuit. The inductor can receive a positive voltage $$v_{in} - \frac{v_{bus}}{2}$$

and is charged with a positive current ripple slope. For Mode 4, both switches are turned off with both the dc-link capacitors connected. In this example, since $$\frac{v_{bus}}{2} < v_{in} < v_{bus},$$

the inductor voltage, $v_{in} - v_{bus}$, is negative causing a negative slope discharge. Similarly, the averaged inductor voltage and the current ripples are shown according to the following equations:

$$\langle v_L \rangle_{T_s} = |v_{in}| - (1-d)v_{bus} \quad (4)$$

$$\Delta i_{L\_up} = \frac{|v_{in}| - 0.5\, v_{bus}}{Lf_s}d \quad (5)$$

$$\Delta i_{L\_down} = \frac{v_{bus} - |v_{in}|}{Lf_s}(0.5 - d) \quad (6)$$

In some examples, two of the working regions in a TLB share an identical average model as in a single boost multi-loop PI controller design. But, the current ripple equations for a TLB are not the same, which can mean the dynamic equations for the two working region in a TLB are not the same. In some instances, this can add additional complexity to existing TLB systems. For example, existing or conventional systems may involve detecting a region by comparing the input voltage and half of the DC bus voltage or a switching function may be involved to switch between the two dynamic equations. Compared to the voltage comparison region detection, the switching function method may be used for logic combination control references since the sensing noises of the input voltage can provide further complexities for the comparison method. Existing predictive controller approaches can include identifying the operational regions and an N level boost may have $2^{N-1}$ operating modes and N−1 working regions, which can make the region detection even more difficult when multiple cells are used.

Embodiments of the present disclosure provide advantageous over conventional systems and method. For example, by transforming the dynamic circuit model into discrete time frames and applying an optimal duty cycle determined by estimating the next-state current, a predictive current control method described herein can provide faster dynamic responses and higher accuracy compared to a PI current-control method.

In some aspects, predictive control using leading-triangle modulation techniques can eliminate the step of selecting a correct operating region. The predictive control can use a leading-triangle modulation technique and the current can be sampled at the peak of the triangular carrier, which is the mid-point of either the up or down current ripple. Given the sampling point, a prediction can be made to force the next mid-point of the ripple current to follow the current reference. For example, FIG. 4 depicts examples of modulation, sampling, and prediction principles for predictive control, according to some aspects.

Figure 4:
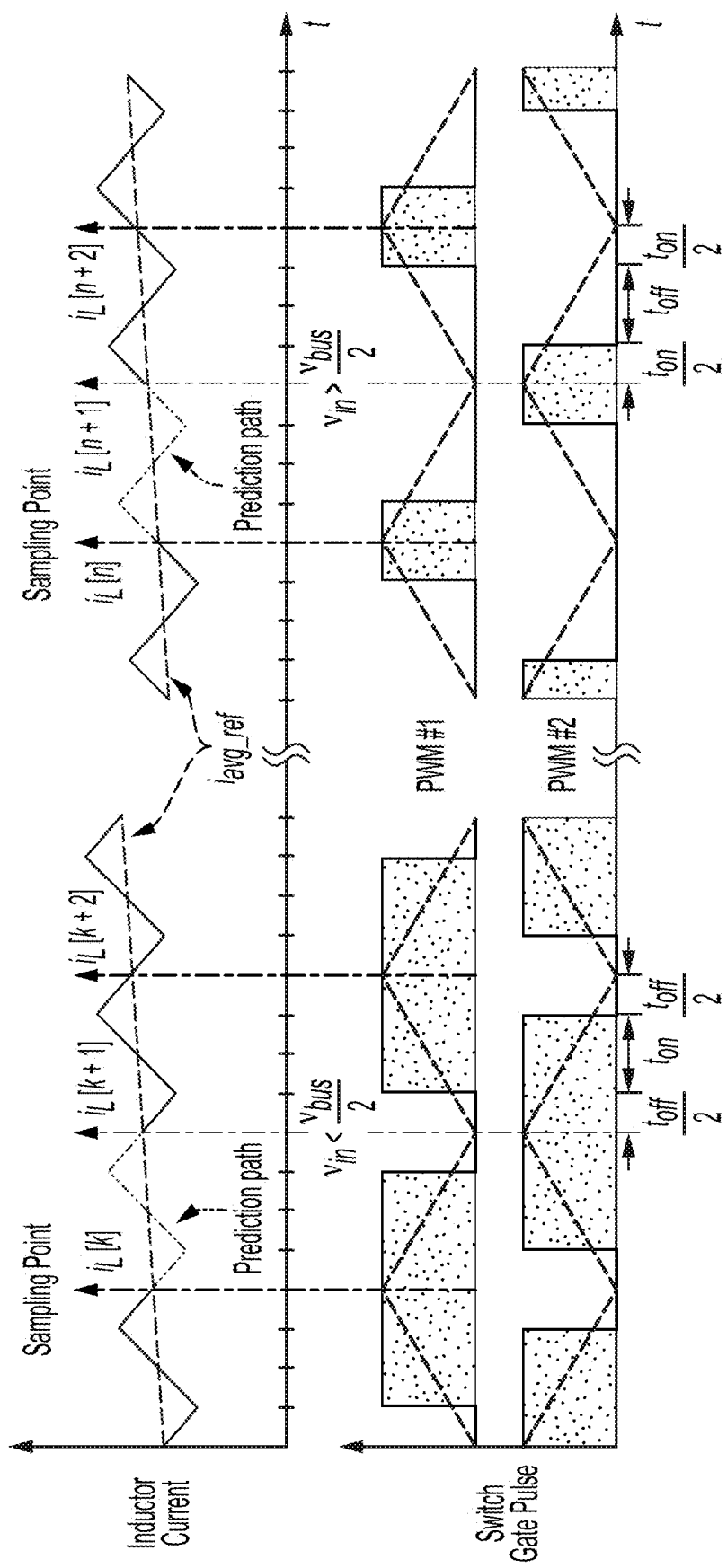
FIG. 4 depicts examples of modulation, sampling, and prediction principles for predictive control, according to some aspects.

In the example of FIG. 4, an inductor current waveform and switch gate pulse signal for both working regions are shown. In this example, modulation, sampling, and prediction principles of the predictive PFC controller control when the switch duty exceeds 50% and when the switch duty is below 50%. For the working region $$v_{in} < \frac{v_{bus}}{2},$$

a sampling point can be at the mid-point of the downward ripple. In some examples, the PFC controller can predict half of the downward ripple, upward ripple, and again half of the downward ripple based on the current sample. In order to force the next downward ripple to follow the reference current, the current waveform equation can be written according to the equation (7). Because a switching frequency of a TLB can be higher than the grid frequency, input voltage, current reference, and bus capacitor voltages can be assumed to be constant.

$$i_L[k]+\tfrac{1}{2}i_{ripple\_up}(d)-i_{ripple\_down}(d)+\tfrac{1}{2}i_{ripple\_up}(d)= i_{avg\_ref}[k+1] \quad (7)$$

In some examples, taking equations (2) and (3) above into the equation gives the solution of the duty cycle:

$$i_L[k] + \frac{|v_{in}|}{Lf_s}(d-0.5) - \frac{0.5\,v_{bus}-|v_{in}|}{Lf_s}(1-d) = i_{avg\_ref}[k+1] \quad (8)$$

$$d = 2\,Lf_s\frac{i_{avg\_ref}[k+1]-i_L[k]}{v_{bus}} + \frac{v_{bus}-|v_{in}|}{v_{bus}} \quad (9)$$

For the working region $$v_{in} > \frac{v_{bus}}{2},$$

a sampling point can be at the mid-point of the upward ripple. Half of the upward ripple, a downward ripple, and another half of the upward ripple can be predicted. Similar to the above analysis, the current waveform equation is, $$i_L[k]+\tfrac{1}{2}i_{ripple\_down}(d)-i_{ripple\_up}(d)+\tfrac{1}{2}i_{ripple\_down}(d)=i_{avg\_ref}[k+1] \quad (10)$$

In some examples, taking (5) and (6) into the equation gives:

$$i_L[k] + \frac{|v_{in}|-0.5\,v_{bus}}{Lf_s}d - \frac{v_{bus}-|v_{in}|}{Lf_s}(0.5-d) = i_{avg\_ref}[k+1] \quad (11)$$

$$d = 2Lf_s\frac{i_{avg\_ref}[k+1]-i_L[k]}{v_{bus}} + \frac{v_{bus}-|v_{in}|}{v_{bus}} \quad (12)$$

In some instances, since equations (9) and (12) are the same, a predictive control method using leading-triangle modulation may be performed without detecting a working region. Both equations (9) and (12) described above can include a static component, $$\frac{v_{bus}-|v_{in}|}{v_{bus}},$$

which can reflect the operating point of the TLB converter where variables vary at line frequency and a dynamic component, $$2Lf_s\frac{i_{avg\_ref}[k+1]-i_L[k]}{v_{bus}},$$

which can regulate the current in switching frequency.

In some examples, since the control can be based on a physical model, an accurate estimation of the inductance value can be part of operating the PFC. The PFC function can involve a large current variation range and the input inductance value can vary due to saturation effects. An incorrect value for the inductance can cause oscillations and even controller instability. The sampling accuracy can also affect the performance of the predictive PFC, which can result in a high requirement for the controller's disturbance rejection ability. The inductance L and the input current sampling $i_L$ can be in a linear relationship in (12) but with an opposite sign. So, the current sampling error $\Delta_L^i$ can be treated as a negative inductance value error $\Delta L$. In this example, the low frequency value $v_{bus}$ and $|v_{in}|$ can be assumed to be accurate.

A perturbation method can be used to test the stability of the converters. As described above, in ideal conditions with accurate estimation on the inductance value, the duty cycle for one switching period can be based on the following equation:

$$D_{ideal} = 2L_0 f_s \frac{i_{avg\_ref}[k+1]-i_L[k]}{v_{bus}} + \frac{v_{bus}-|v_{in}|}{v_{bus}} \quad (13)$$

But, in a real case, the estimation of the inductance may be based on the following equation:

$$D_{real} = 2Lf_s \frac{i_{avg\_ref}[k+1]-i_L[k]}{v_{bus}} + \frac{v_{bus}-|v_{in}|}{v_{bus}} \quad (14)$$

Figure 5:
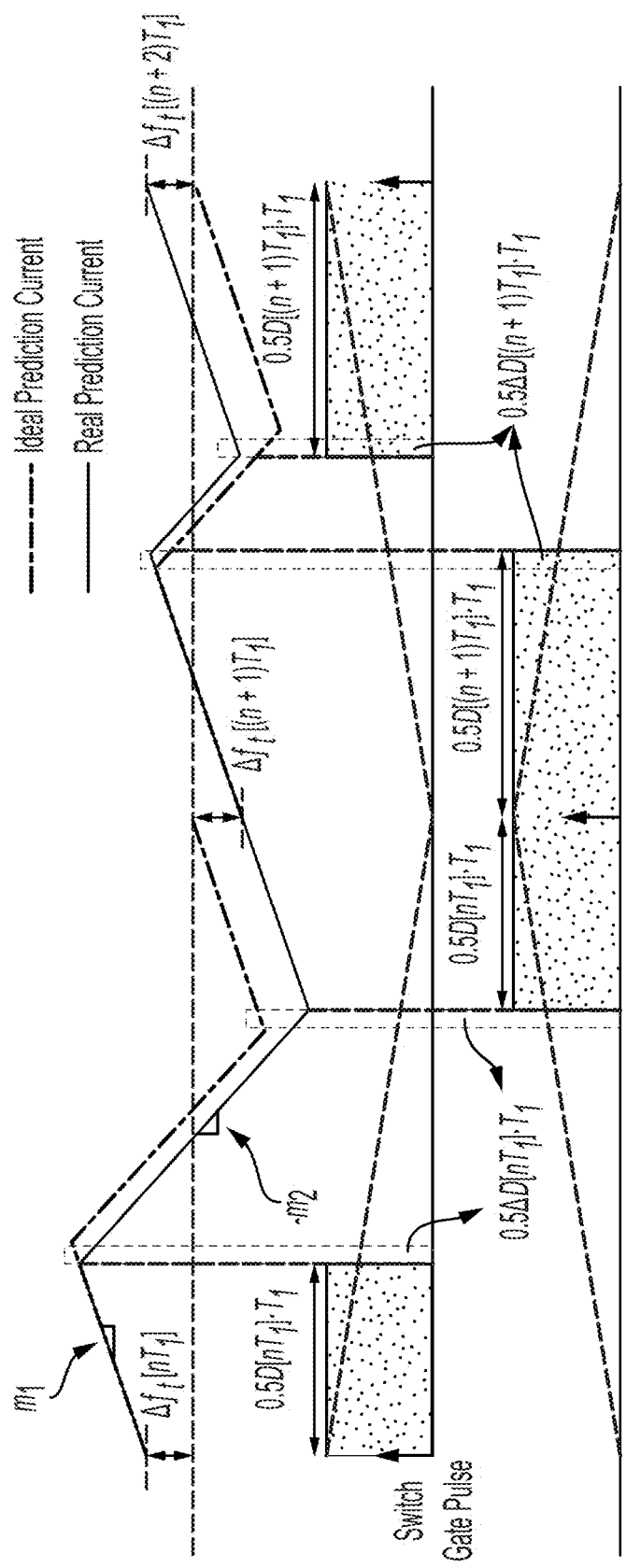
FIG. 5 depicts a current perturbation at a sampling instant, according to some aspects.

FIG. 5 depicts a current perturbation at a n sampling instant.

In some aspects, $Z_0=2L_0 f_s$ and $Z=2Lf_s$, and the duty cycle can be written according to the following equations:

$$\Delta i_L[nT_s] = i_{avg\_ref}[nT_s] - i_L[nT_s] \quad (15)$$

$$\Delta D[nT_s] = \frac{\Delta i_L[nT_s]}{v_{bus}}(Z_0 - Z) \quad (16)$$

$$\Delta i_L[(n+1)T_s] = \Delta D[nT_s]\cdot(m_1-m_2)\cdot T_s \quad (17)$$

In the equations above, $m_1$ and $m_2$ are upward and downward inductor current ripple slope. The slope difference $m_1-m_2$ in either of the working region is $$\frac{v_{bus}}{2L}.$$

Thus the current perturbation in next and n cycles are:

$$\Delta i_L[(n+1)T_s] = \frac{\Delta i_L[nT_s]}{v_{bus}} \cdot (Z_0 - Z) \cdot \frac{v_{bus}}{2L} \cdot T_s = \Delta i_L[nT_s]\frac{Z_0 - Z}{Z_0} \quad (18)$$

$$\Delta i_L[(n+m)T_s] = \Delta i_L[nT_s] \cdot \left(\frac{Z_0 - Z}{Z_0}\right)^m \quad (19)$$

From equation (19) it can be concluded that for $Z > Z_0$ and that the stable criterion can be $Z < 2Z_0$. When the $Z_0 - Z$ component is negative, the stabilizing process can include oscillations. When $Z < Z_0$, a system can be stable with no oscillations.

Figure 6:
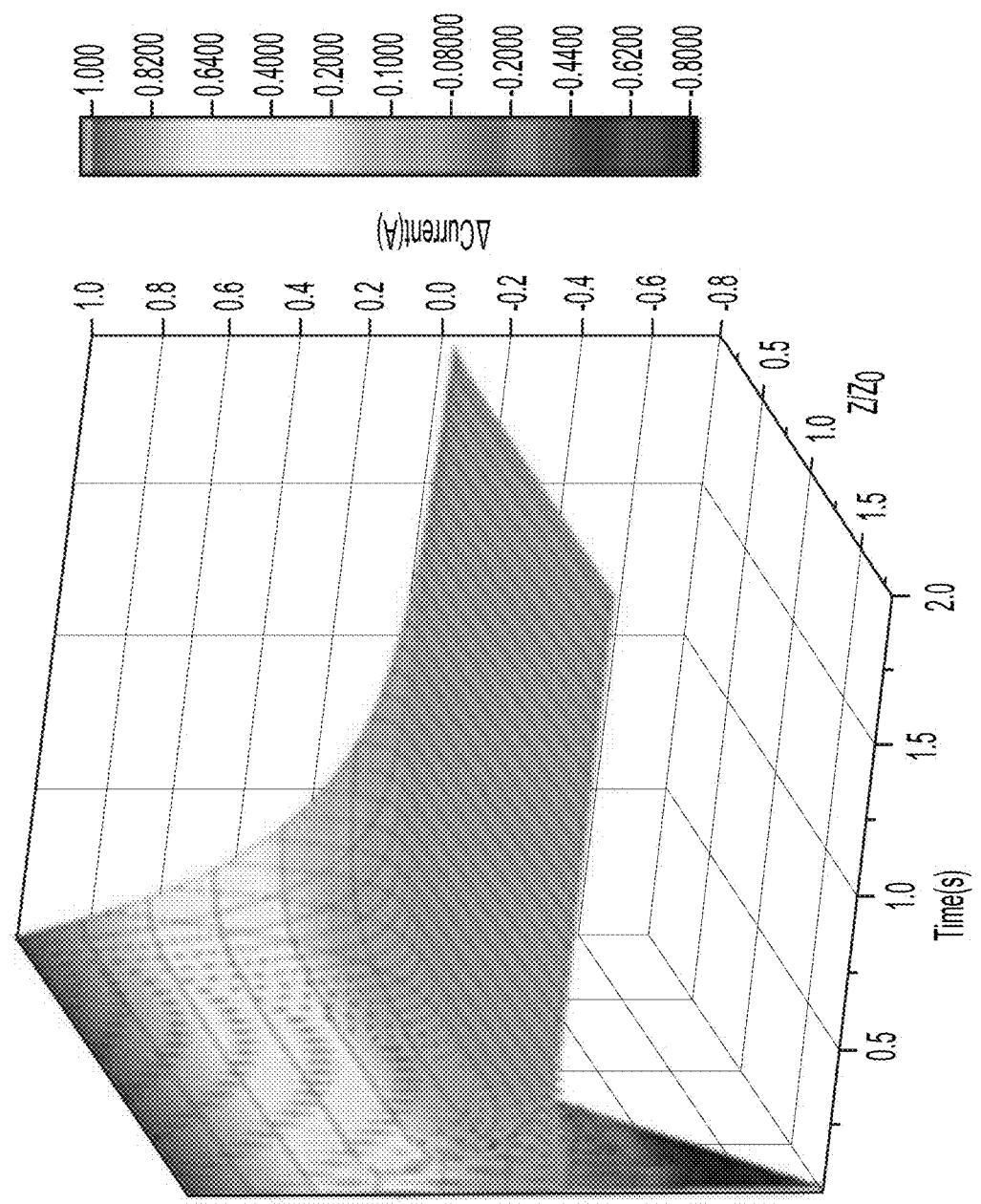
FIG. 6 is a graph depicting a three-dimension plot of time vs. unit value of Z vs. current error $\Delta_L^i$ for a predictive control, according to some aspects.

FIG. 6 is a graph depicting a three-dimension plot of time vs. unit value of Z vs. current error $\Delta_L^i$ for a predictive control, according to some aspects.

In the example depicted in FIG. 6, at time 0, a perturbation can be applied. The predictive controller can eliminate a disturbance in the next cycle, when the inductance is correctly estimated. In some examples, if the inductance estimation is lower than the actual value, the current perturbation can be compensated without oscillation.

Figure 7:
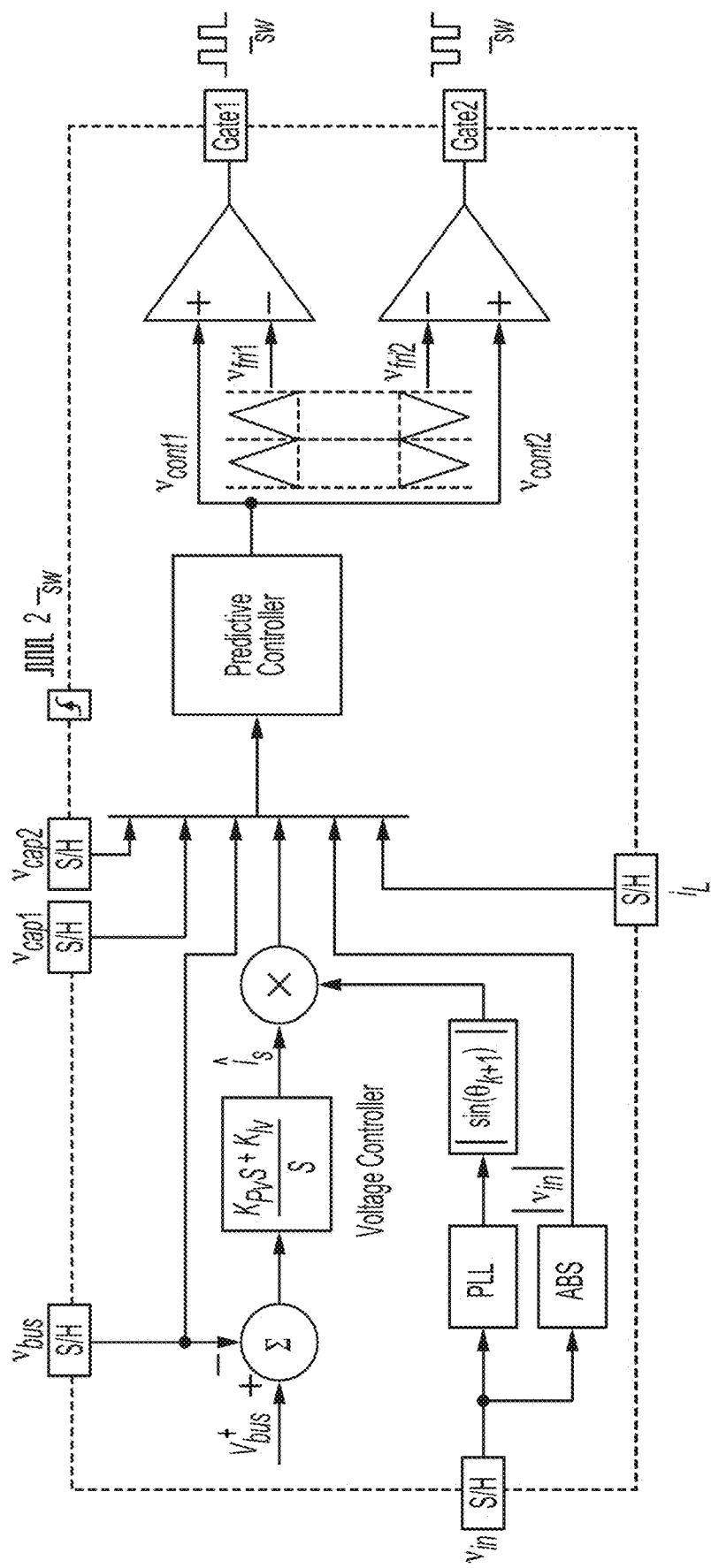
FIG. 7 depicts a PFC control implementation diagram for a TLB interleaved predictive control together with an outer voltage loop, according to some aspects.

FIG. 7 depicts a PFC control implementation diagram for a TLB interleaved predictive control together with an outer voltage loop.

The predictive control or controller can be operating under an interleaving frequency that is twice the switching frequency for the TLB. The predictive calculation for each switch can be conducted alternately using the parameters including the next cycle reference current, the inductor current, absolute value of input voltage, total bus voltage, and each capacitors' voltage captured in the nearest half switching cycle. After the calculation, the next cycle duty can be applied to both switches. In turn, the rising edge time of one of the switches and the falling edge time of the PWM of the other switch can be effected.

In some embodiments described herein, predictive control of a series-interleaved multi-cell TLB PFC can be faster, more accurate, and use less processing power by not detecting a working region. In some aspects, the predictive control can be more stable by eliminating a risk of incorrectly detecting a region change.

For multi-level converters, the split DC buses' mismatch in capacitance and equivalent series resistance ("ESR") can result in a voltage imbalance. An additional voltage-balancing loop can be included in the application of the multi-level converters. A balancing strategy for a multi-level converter used in SST can be used such that the minimum balancing controller needed for an N-switch multi-level converter is $N-1$.

In some examples of a predictive controller operating at an interleaving frequency, the balancing controller can be integrated into the predictive equation as a balancing component which is as follows:

$$d_{1,2} = 2Lf_s \frac{i_{avg\_ref}[k+1] - i_L[k]}{v_{bus}} + \frac{v_{bus} - |v_{in}|}{v_{bus}} mf(\pm(v_{cap1} - v_{cap2})) \quad (20)$$

In the equation above, $f(\pm(v_{cop1}, v_{cop2}))$ is the compensation component for the balancing control (PI or P).

Figure 8:
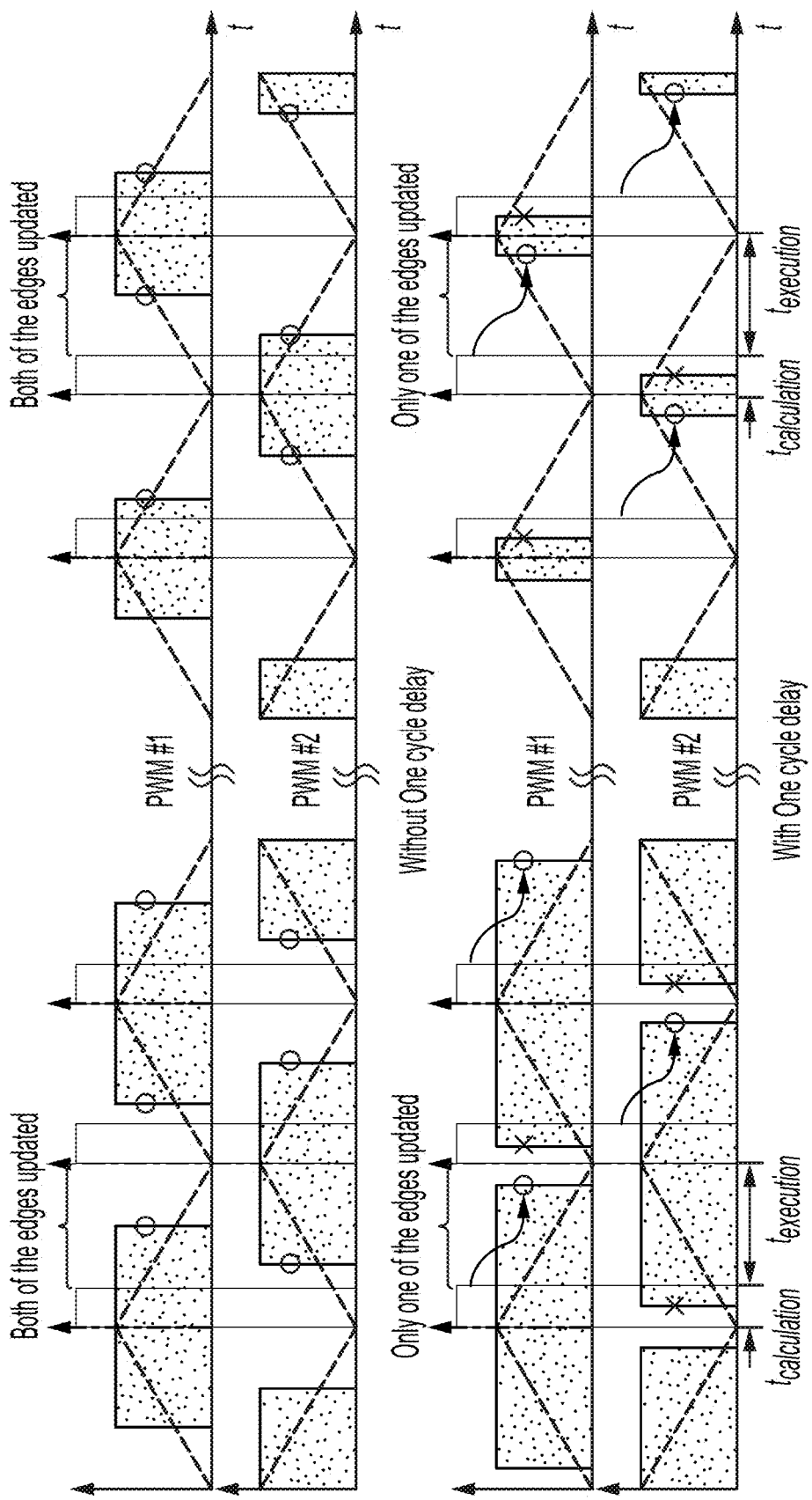
FIG. 8 depicts a one-cycle delay that can occur when either a rising or falling edge of a PWM is too close to a sampling point where a calculation starts, according to some aspects.

In some instances, the balancing approach described above can always keep either the upwards or the downwards current ripple unchanged, and shrink or extend the other current ripple. For example, in a first region $$\left(v_{in} < \frac{v_{bus}}{2}\right),$$

the balancing control can keep the upwards current ripple unchanged while affecting the downwards ripple. Similarly, for a second region, but reversely, the downwards current ripple can be unchanged. In some examples, such a balancing strategy can introduce an intrinsic oscillation into the inductor current waveform, but may not harm the system stability. Furthermore, at a zero crossing point, an oscillating current can draw the current to stay in the discontinuous mode since the downwards ripple period is sometimes longer than the optimized value. The voltage balancing controller output can be limited to ±10% to compensate for distortion at the zero-crossing point. For a digital controller, a one-cycle delay can exist in the predictive control implementation. The delay can occur in response to the optimal duty decided at the [n]th instant being applied after the [n+1]th instant due to performing all the calculations of the predictive algorithm. The calculated optimal duty cycle using measurement at [n]th instant can continue to be applied after [n+1]th instant resulting of an oscillation in the line current. In some examples of the predictive controller, a one-cycle delay occurs when either the rising or falling edge of the PWM is too close to the sampling point where the calculation starts as shown in FIG. 8.

In some examples, at time $nT_s$ with the current perturbation, the calculated duty cycle can be:

$$D[nT_s] = \frac{\Delta i_L[nT_s]}{v_{bus}}Z + \frac{v_{bus} - |v_{in}|}{v_{bus}} \quad (21)$$

Similarly, at time instance $(n+1)T_s$:

$$D[(n+1)T_s] = \frac{\Delta i_L[(n+1)T_s]}{v_{bus}}Z + \frac{v_{bus} - |v_{in}|}{v_{bus}} \quad (22)$$

Different than the leading-edge modulation, which the applied duty at $(n+1)T_s$, the leading-triangle modulation distributes the duty change into both the rising and falling edges. Though one of the edge loses the chance to execute, the other one has the whole cycle time to execute. Thus, the duty applied at $(n+1)T_s$ is $$\frac{D[nT_s] + D[(n+1)T_s]}{2}$$

and the duty variation at time $(n+1)T_s$ is:

$$\Delta D[(n+1)T_s] \frac{\Delta i_L[(n+1)T_s]Z_0}{v_{bus}} - \frac{\Delta i_L[nT_s] + \Delta i_L[(n+1)T_s]}{2} \cdot \frac{Z}{v_{bus}} \quad (23)$$

and the resulting current perturbation is, $$\Delta i_L[(n+2)T_s] = \Delta i_L[(n+1)T_s] - \frac{Z}{2Z_0}(\Delta i_L[(n+1)T_s] + \Delta i_L[nT_s]) \quad (24)$$

which can be written as follows:

$$\Delta i_L[(n+2)T_s] = \left(1 - \frac{Z}{2Z_0}\right)\Delta i_L[(n+1)T_s] - \frac{Z}{2Z_0}\Delta i_L[nT_s] \quad (25)$$

The discrete time expression can be transformed into z domain:

$$\Delta i(z) = (1-K)\Delta i(z)z^{-1} - K\Delta i(z)z^{-2} + u(z) \quad (26)$$

Where $$K = \frac{Z}{2Z_0}$$

and $\iota(z)$ is the input of the system. The equation can be simplified to:

$$\Delta i(z) = \frac{u(z)z^2}{z^2 - (1-K)z + K} \quad (27)$$

The stability criterion is poles within the unit circle, $$\left| \frac{(1-K) \pm \sqrt{(1-K)^2 - 4K}}{2} \right| < 1 \quad (28)$$

which is always true for $Z<Z_0$.

Figure 9:
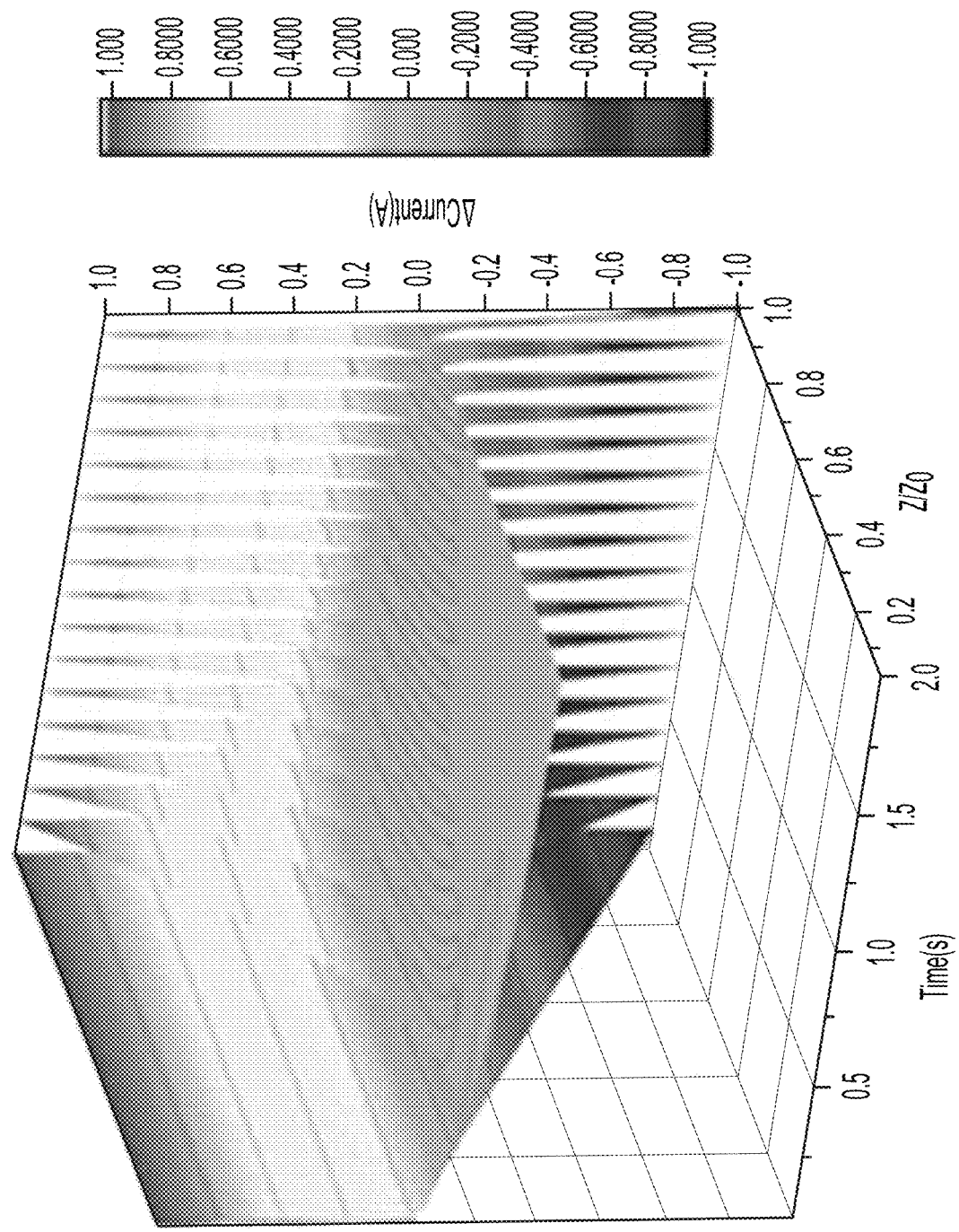
FIG. 9 is a graph depicting a three-dimension plot of time vs. unit value of Z vs. current perturbation $\Delta_L^i$ with one-cycle delay and leading-edge modulation, according to some aspects.
Figure 10:
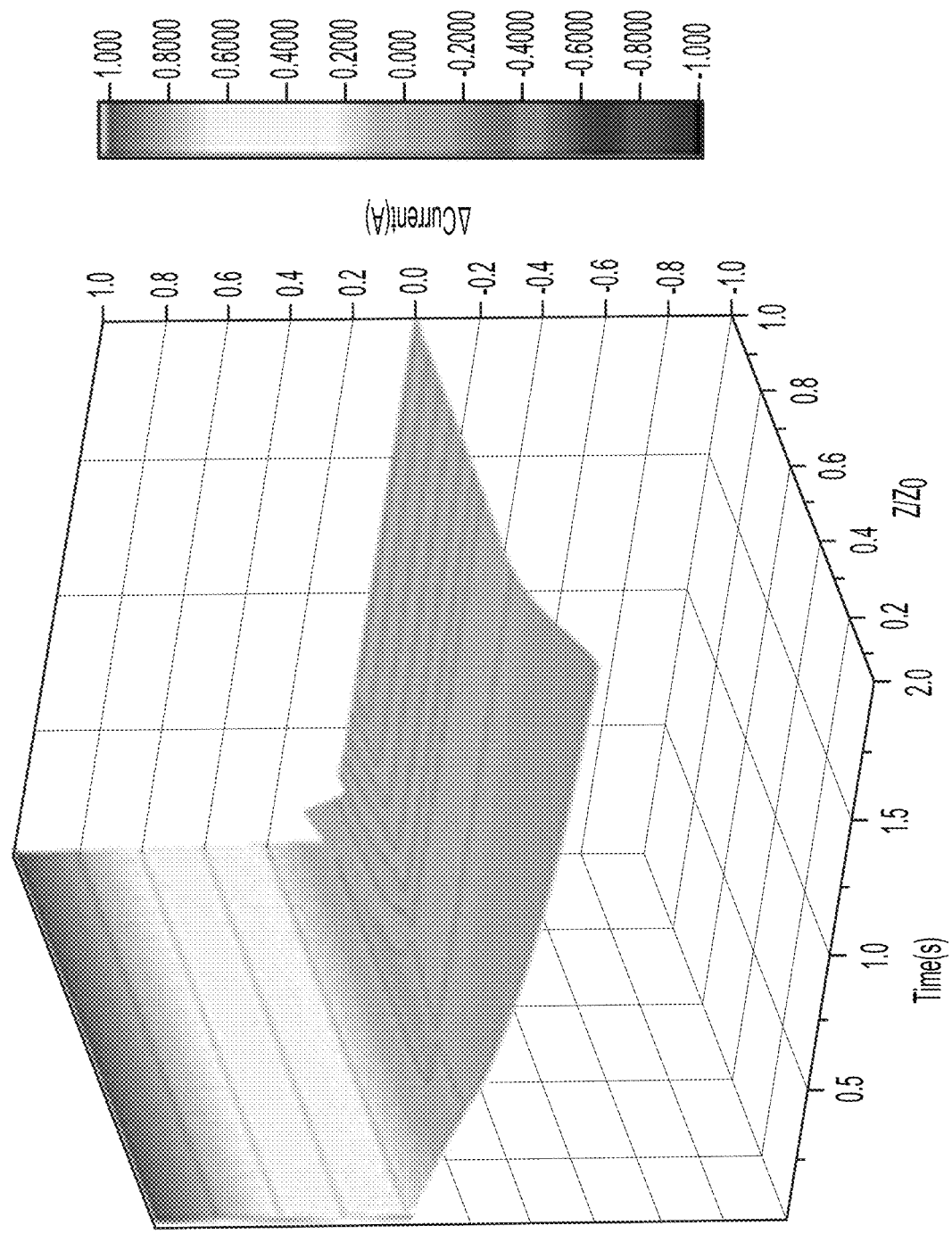
FIG. 10 is a graph depicting a three-dimension plot of time vs. unit value of Z vs. current perturbation $\Delta_L^i$ with one-cycle delay and leading-triangle modulation, according to some aspects.

FIG. 9 is a graph depicting a three-dimension plot of time vs. unit value of Z vs. current perturbation $\Delta_L^i$ with one-cycle delay and leading-edge modulation, according to some aspects. A current perturbation is applied at the first two sampling cycle. For comparison, a leading-triangle modulation plot is shown in FIG. 10.

As is shown, the system is stable with the current perturbation and compared to the leading-edge modulation, the leading-triangle modulation takes the advantages of smaller oscillation and faster damping.

The simplicity and stability of the methods described herein in TLB have been described above. As the voltage level and deliver power increase for the utility applications, a single TLB can be limited by the two switches' voltage rating. Cascading multiple TLB in series to form a multi-cell boost topology can provide higher input voltage for medium voltage applications. In some examples, an N-switch boost predictive control can be performed.

FIG. 11 depicts an example of a N-switch multi-level boost topology predictive control diagram with M TLB converters connected in series, according to some aspects.

Each of the TLB can be working in an interleaving pattern and each of the TLBs can be interleaved with a phase shift $$\frac{2\pi}{M}.$$

Prediction calculation can be performed at every mid-point of the "on event" for each PWM and the next cycle duty can be applied to each switches. For the N(=2M) switch multi-level boost topology, N working region can be divided with respect to the input voltage level and each region's range can be $$\frac{v_{bus}}{N}.$$

The voltage across the inductor can change between the two values below in each region.

$$v_{L\_up} = \left| v_{in} \right| - \frac{mv_{bus}}{N} \quad (29)$$

$$v_{L\_down} = \left| v_{in} \right| - \frac{(m+1)v_{bus}}{N}, \quad m \in [0, N-1]$$

Thus the predictive inductor current equation in each region is, $$i_L(n) = \frac{v_{L\_up}}{L} t_{on} - \frac{v_{L\_down}}{L}\left(\frac{T_s}{N} - t_{on}\right) \quad (30)$$

$$d = \frac{t_{on}}{T_s} + \frac{N-1-m}{N}, \quad m \in [0, N-1]$$

Solving the above equations, the region index n can be eliminated and the final predictive duty cycle for N-level boost is, $$d = NLf_s \frac{i_{avg\_ref}[k+1] - i_L[k]}{v_{bus}} + \frac{v_{bus} - [v_{in}]}{v_{bus}} \quad (31)$$

Figure 12:
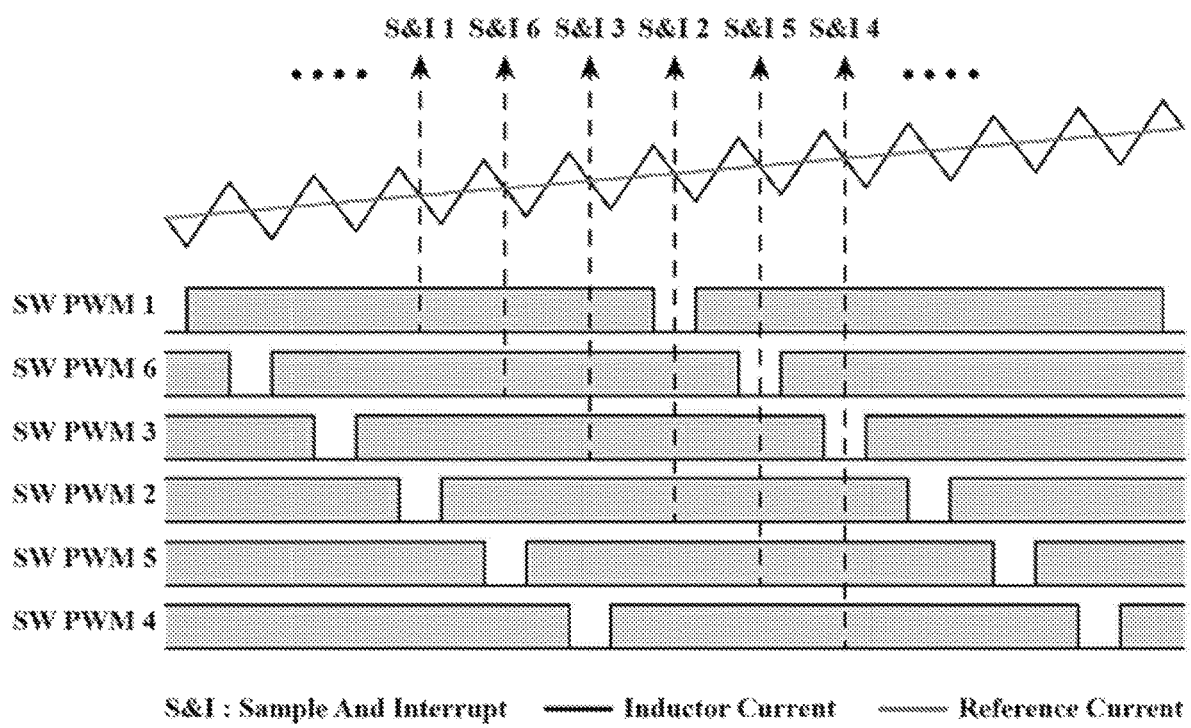
FIG. 12 depicts a duty cycle for each switch using the predictive controller, according to some aspects.

Sampling and calculation can happen at the middle of each switch's PWM turn on. The calculations can finish within one of the interleave periods, $1/Nf_{sw}$. The predictive duty from the calculations can be implemented into all the switches. FIG. 12 depicts a duty cycle for each switch using the predictive controller.

Figure 13:
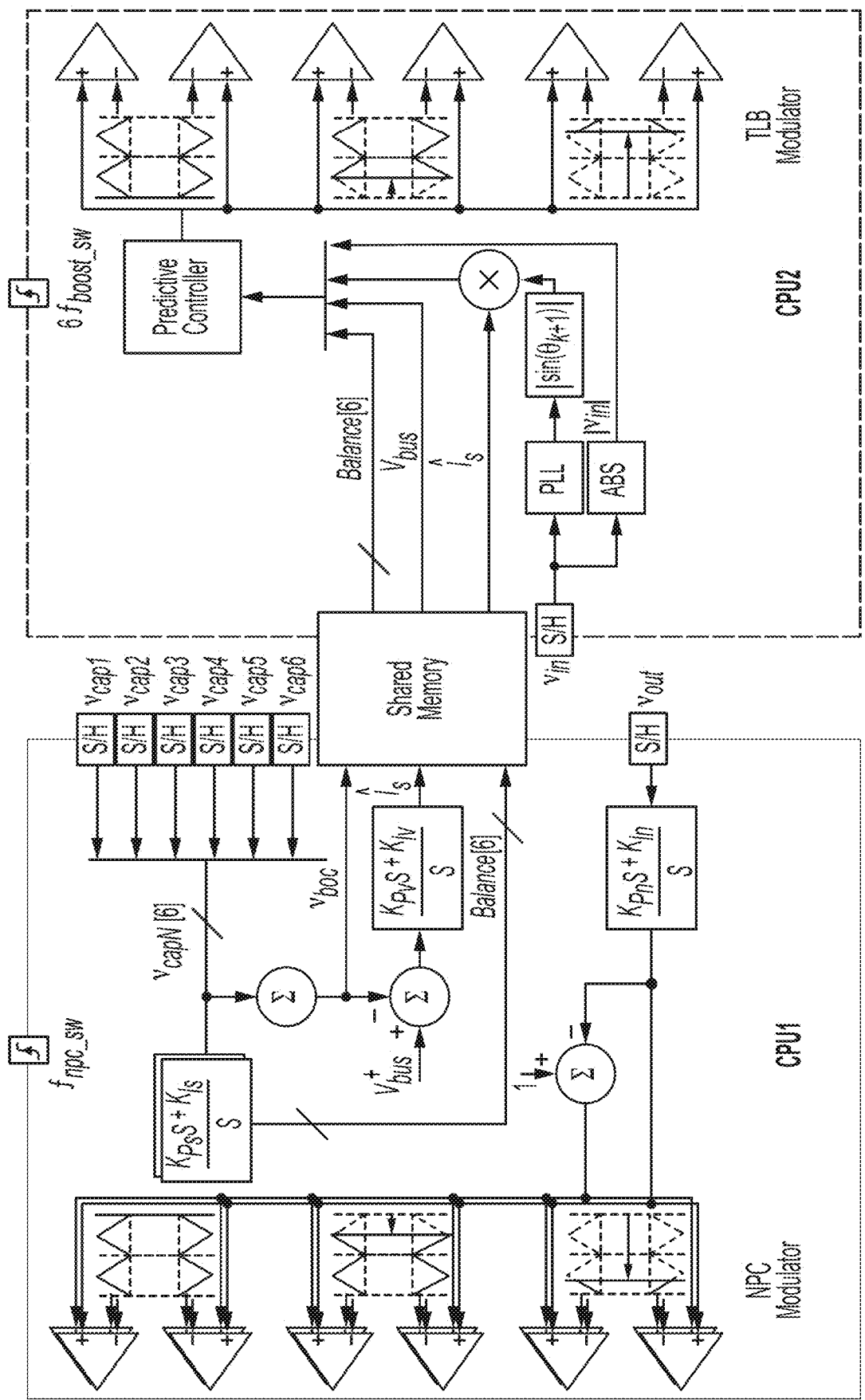
FIG. 13 depicts a Dual-core digital signal processor ("DSP") with the predictive controller, according to some aspects.

Since the sample and calculation can be running at the interleaving frequency, high-speed calculation can be used to avoid overflow. A Dual-core digital signal processor ("DSP") can assist in separating the high-speed calculation with other normal calculations. For example, FIG. 13 depicts a DSP with the predictive controller, according to some aspects.

Illustrative Examples of Simulation Results

Figure 14:
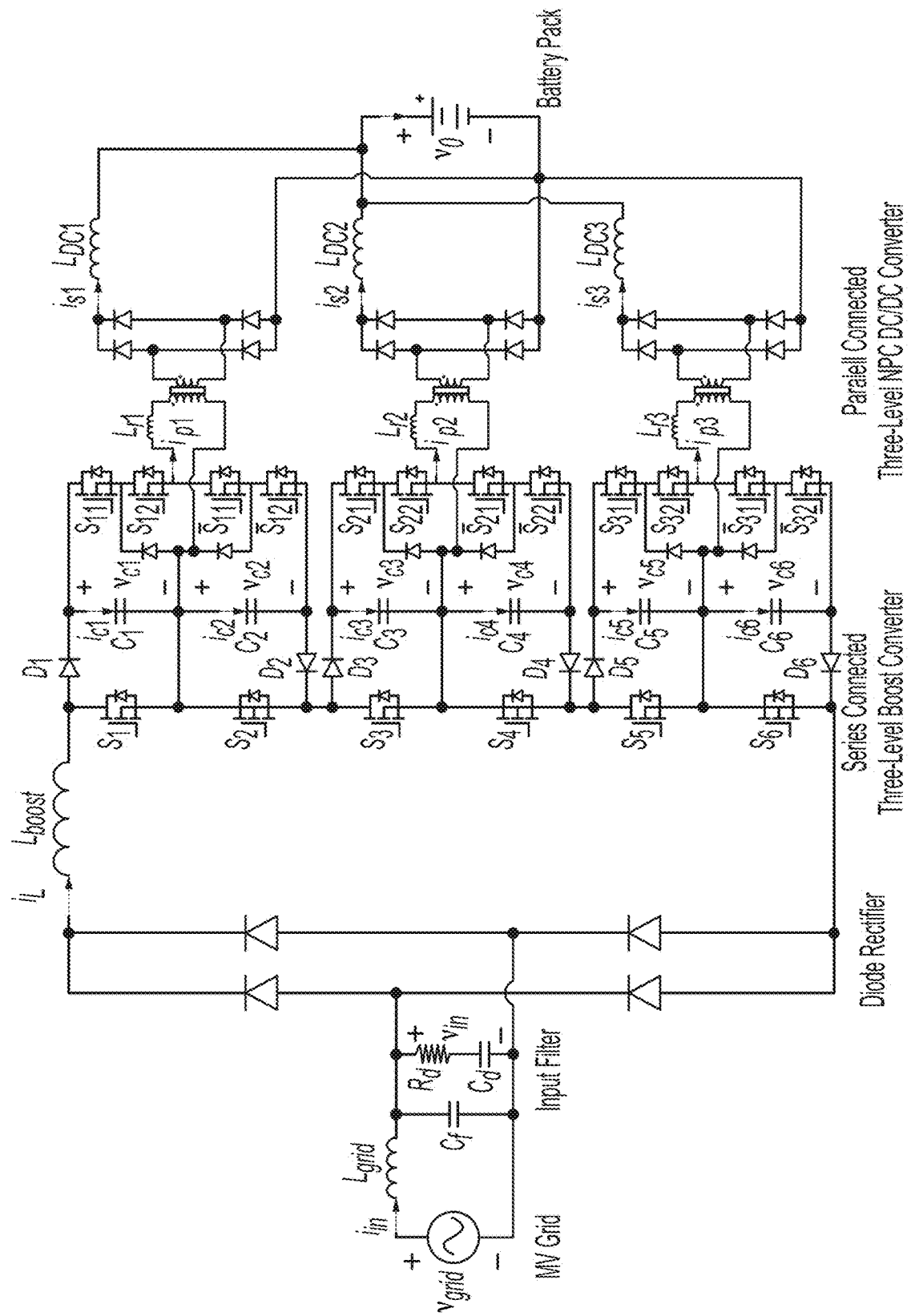
FIG. 14 depicts a schematic circuit diagram of a MV fast charger converter, according to some aspects.
Figure 16:
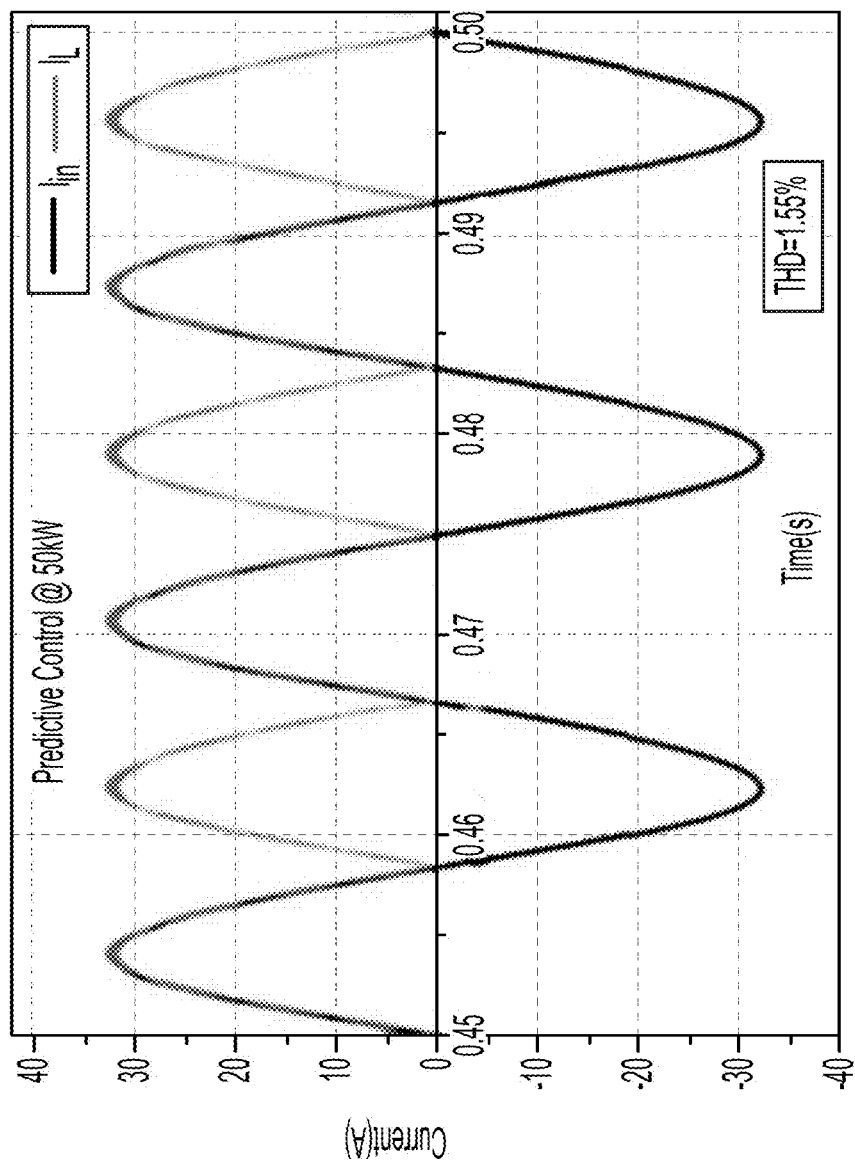
FIGS. 16-19 depict results for a predictive control applied to a MV Fast Charger at 15 kW and 50 kW compared with a PI controller, according to some aspects.
Figure 17:
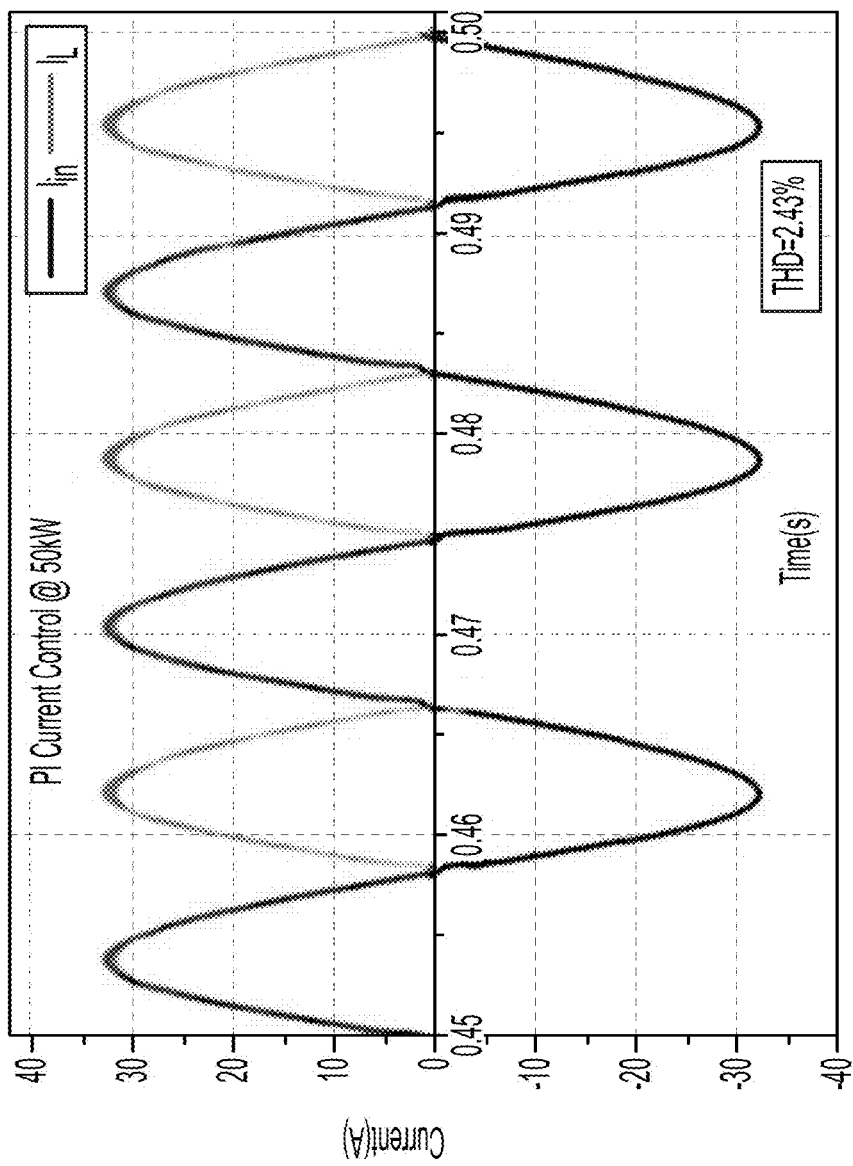
Figure 18:
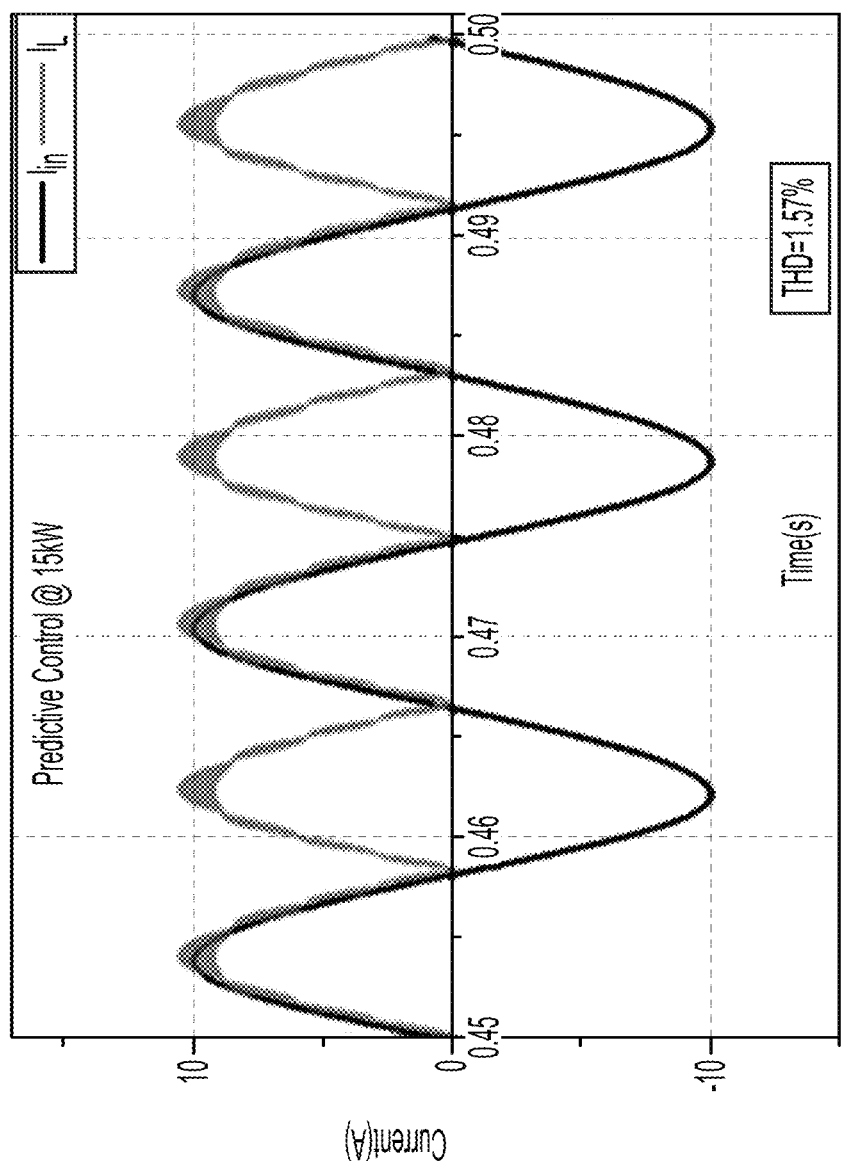
Figure 19:
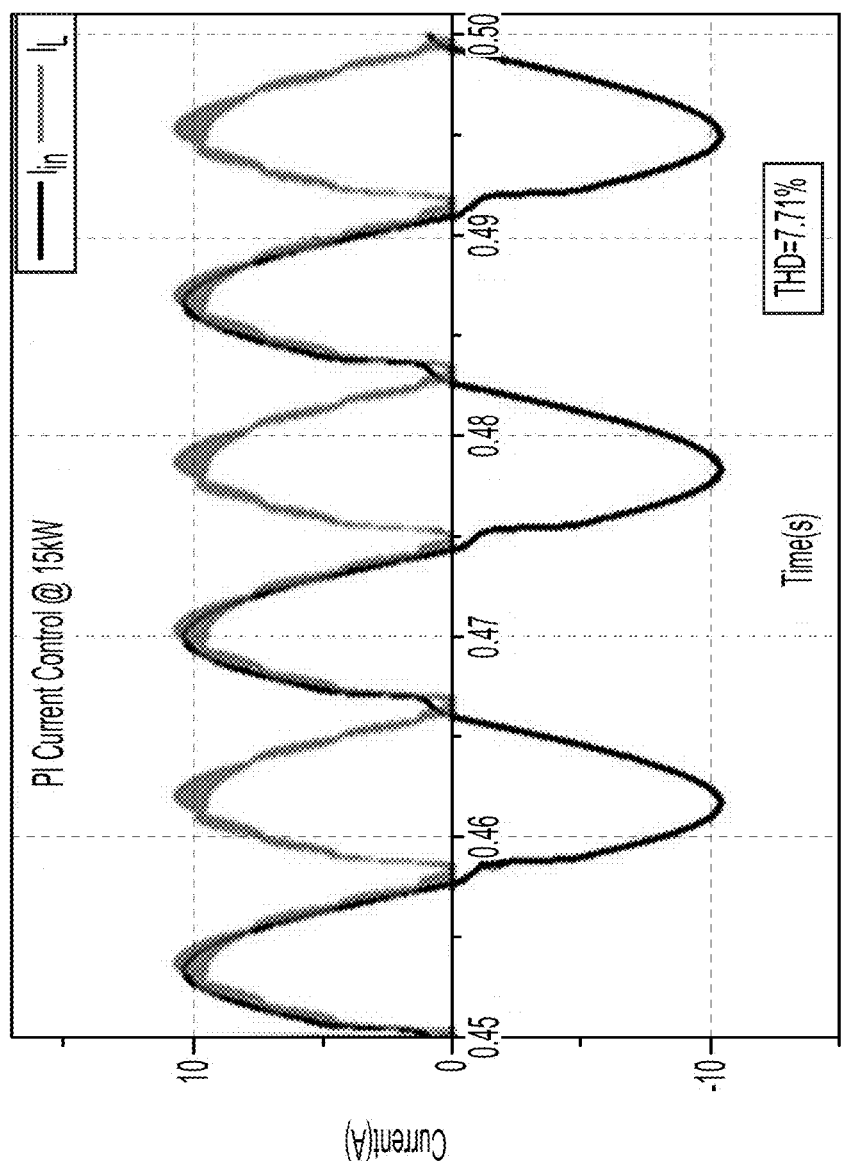

FIG. 14 is a simplified circuit diagram of a MV fast charger converter.

The MV fast charger depicted in FIG. 14 can include a diode rectifier, three TLB converters with their inputs coupled in series, and three isolated NPC/DC/DC converters with their outputs coupled in parallel. The diode rectifier can couple directly to the MV grid with an input filter. The output of each TLB converter can feed into two dc-link capacitors, with all 6 capacitors forming a 4.8 kV DC-bus. The NPC converters can act as the load of the TLBs, transferring energy from each TLB's capacitor to the output at 50-500 V DC and providing galvanic isolations. The input-series-output-parallel ("ISOP") configuration can enable the topology to take a high input voltage (2.4 kV) and deliver high power (50 kW).

In some aspects, predictive PFC control using leading-triangle modulation can be applied to the MV fast charger to achieve a low THD of the input current at a relatively large load range.

In some examples, as one of the ways to validate and characterize the control performance, a simulation model can be setup in the PSIM platform. In this example, the NPC load stage can be modeled as a resistive load and the circuit parameter values are listed in the table of FIG. 15.

In this example, the load range test, can be performed based on the Nissan Leaf charging profile, which can range from 15 kW to 50 kW. A PI current controller was simulated as well for comparison. The simulation results are shown in FIGS. 16-19.

FIGS. 16-19 depict results for a predictive PFC control applied to a MV Fast Charger at 15 kW and 50 kW compared with a PI controller, according to some aspects.

Figure 20:
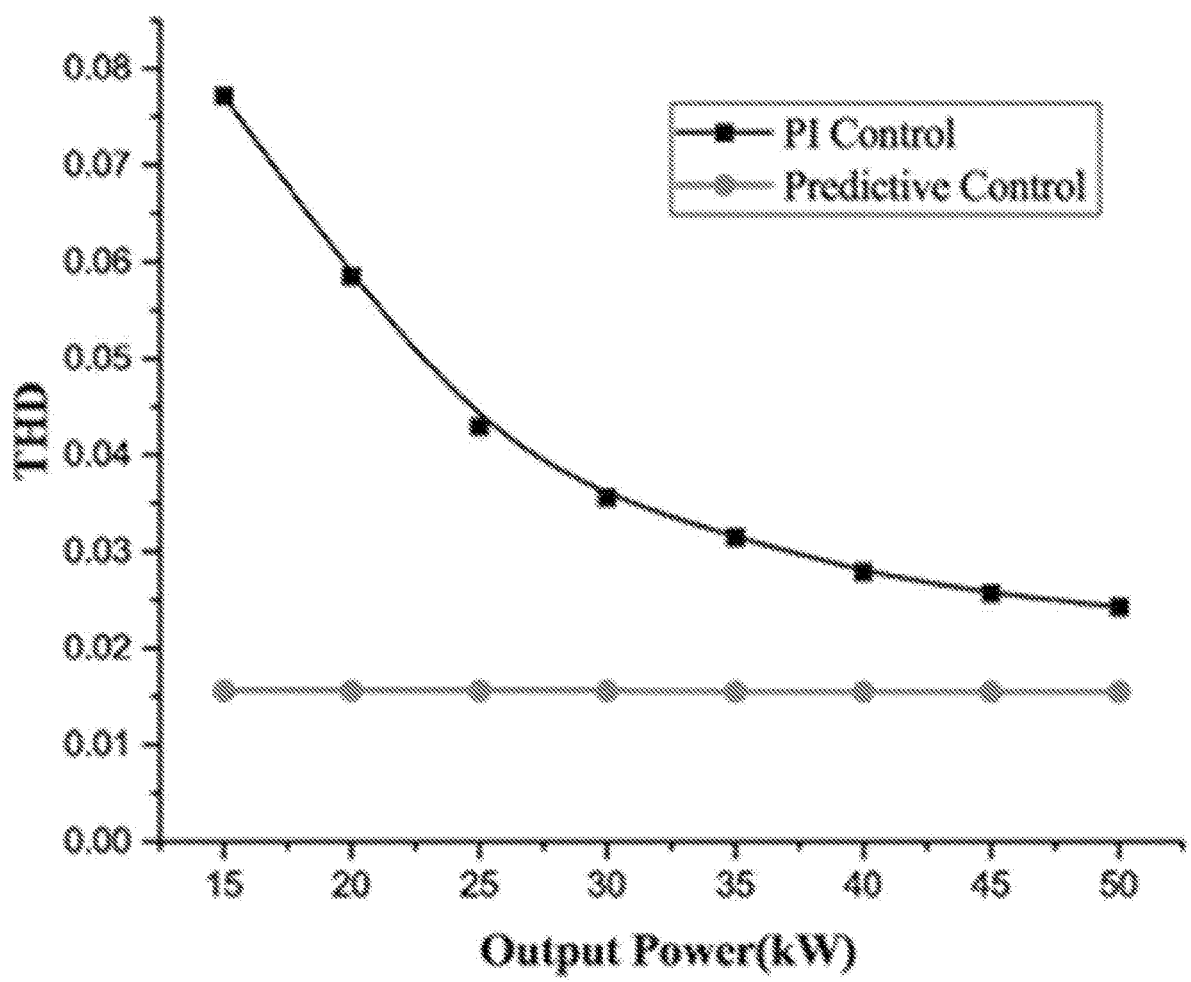
FIG. 20 is a graph depicting a simulated total harmonic distortion ("THD").

FIG. 20 is a graph depicting a simulated THD. The simulated THD plotted in FIG. 20 shows that, in some examples, the predictive control's performance is not affected by the load variation.

The example depicted in FIG. 20 shows a comparison of THD between a predictive control with the PI control with the variation of the load.

Figure 21:
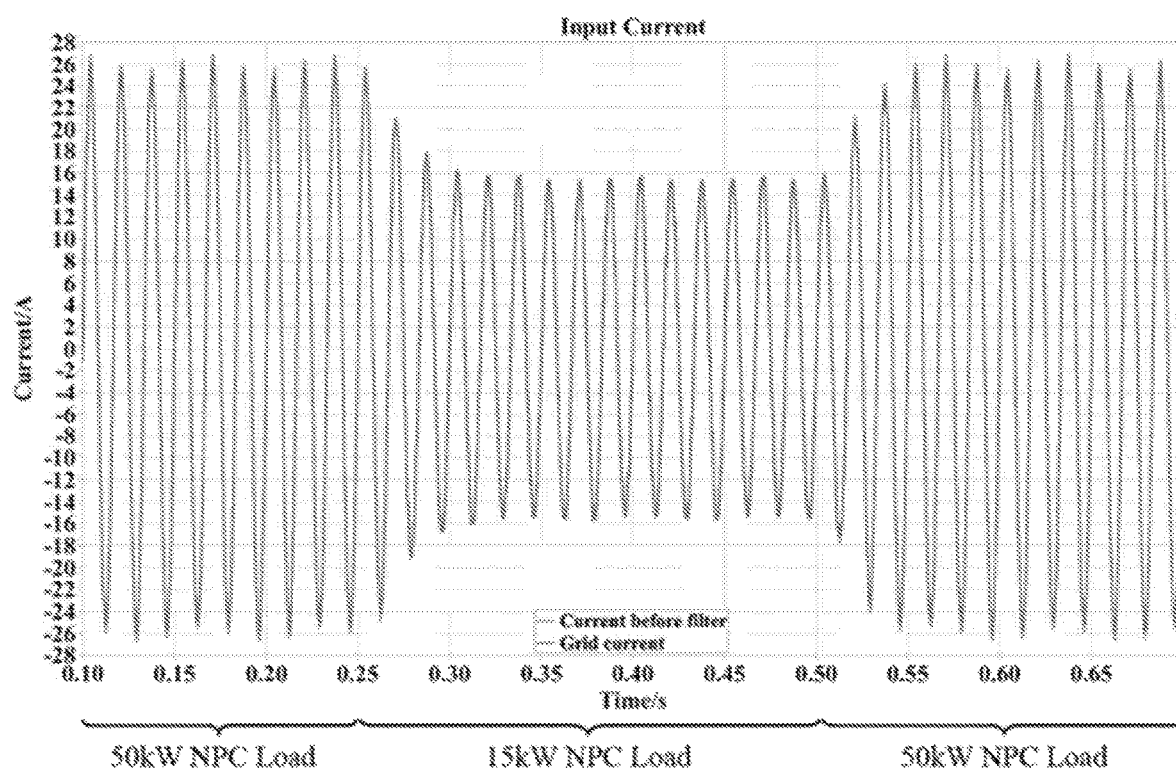
FIG. 21 depicts a dynamic response where a light load is switched in at 0.25 s and at 0.5 s the active load returns to 50 kW, according to some aspects.

In some examples, the dynamic simulation for the front end of the MV Fast Charger is done by switching the NPC load between full load (50 kW) and light load (15 kW). FIG. 21 depicts a dynamic response where a light load is switched in at 0.25 s and at 0.5 s the active load returns to 50 kW, according to some aspects.

Figure 22:
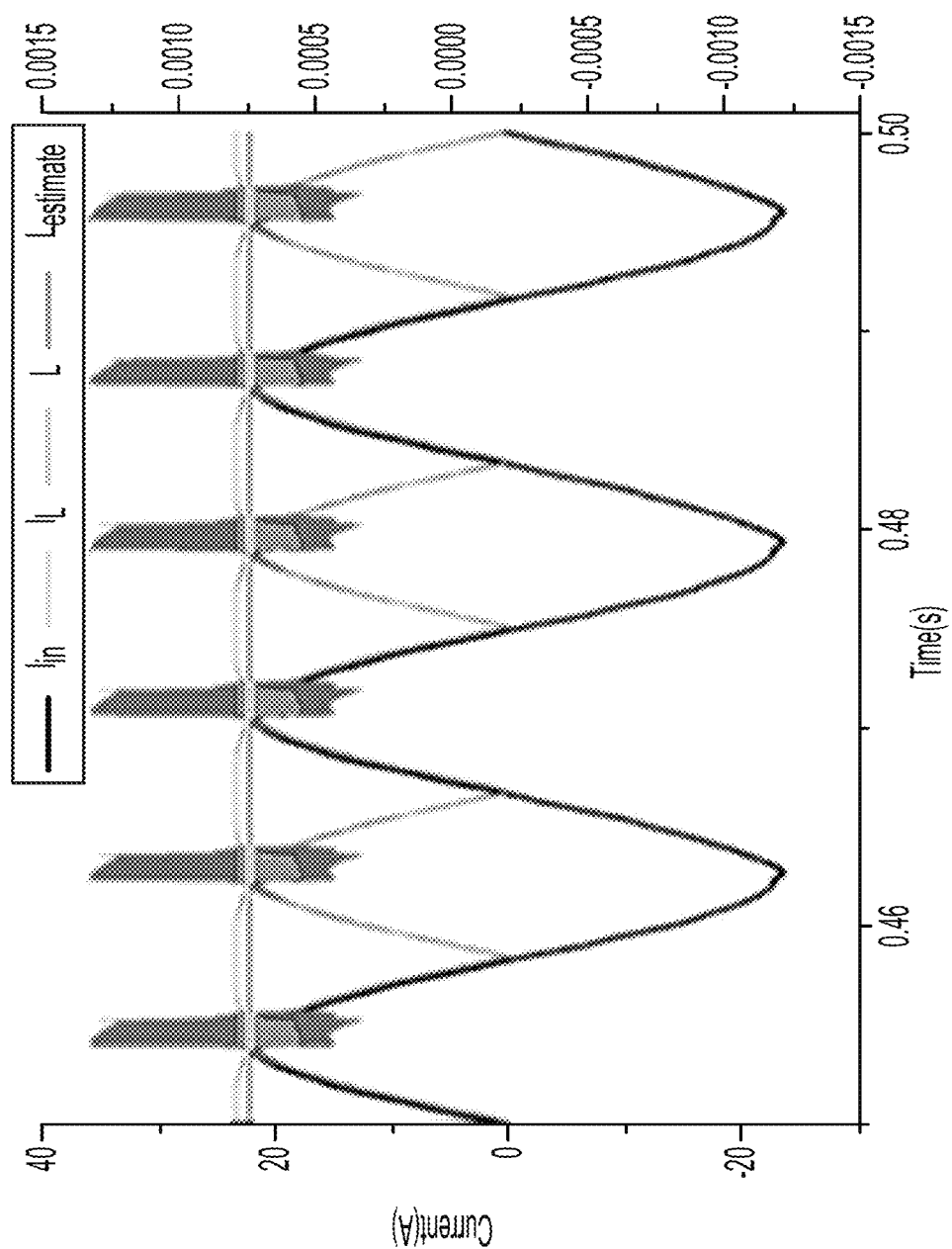
FIGS. 22-23 depict simulation results of an estimation of inductance equal to 0.75 mH and 0.6 mH, according to some aspects.
Figure 23:
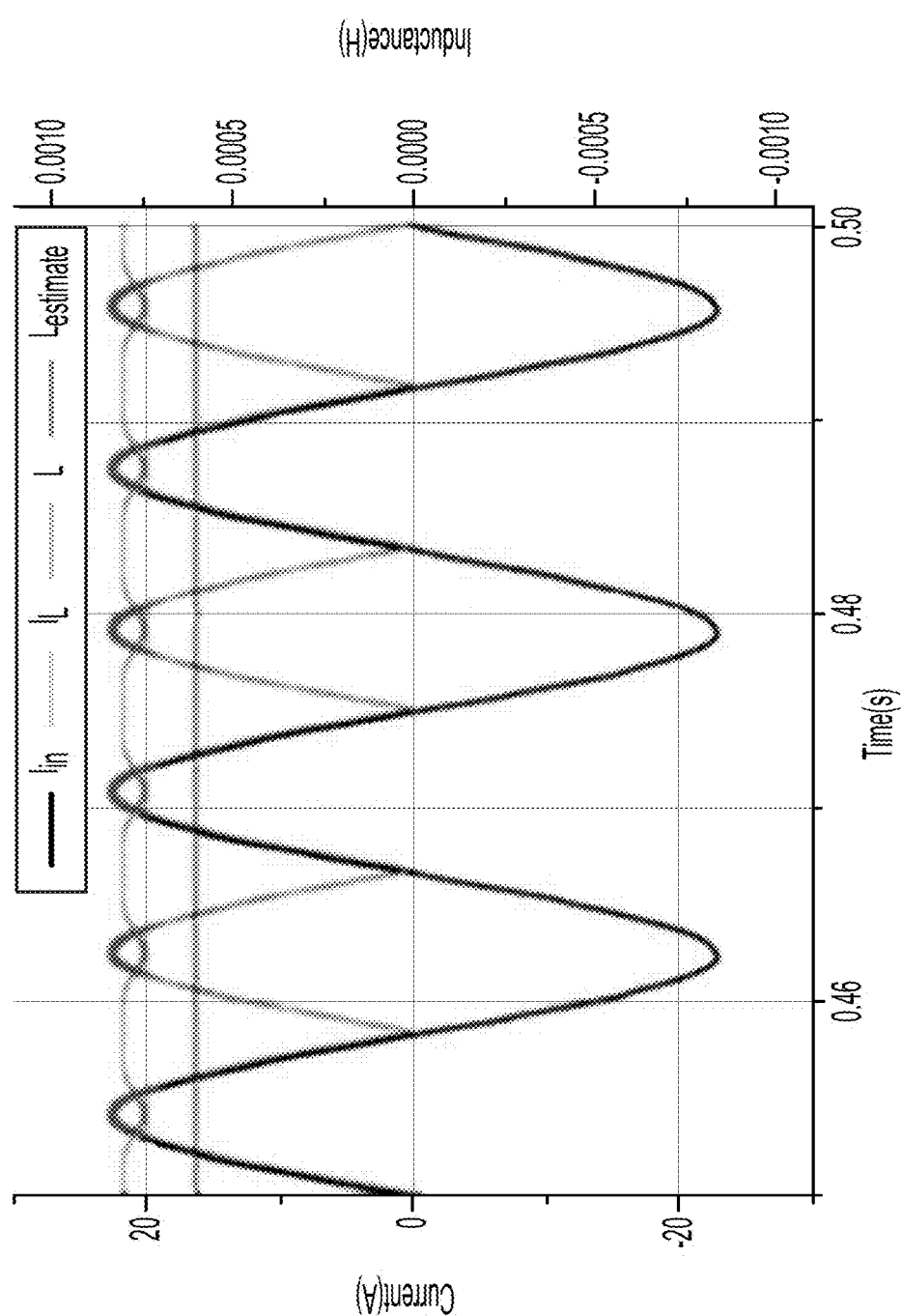

Simulations of the sensitivity of the predictive PFC controller to parameter variations of the influence of the one-cycle delay to leading-edge and triangle-edge modulation strategies can be done with a roll-off inductance that changes from 0.8 mH to 0.74 mH. FIGS. 22-23 depict simulation results of an estimation of inductance equal to 0.75 mH and 0.6 mH, respectively, according to some aspects.

Figure 24:
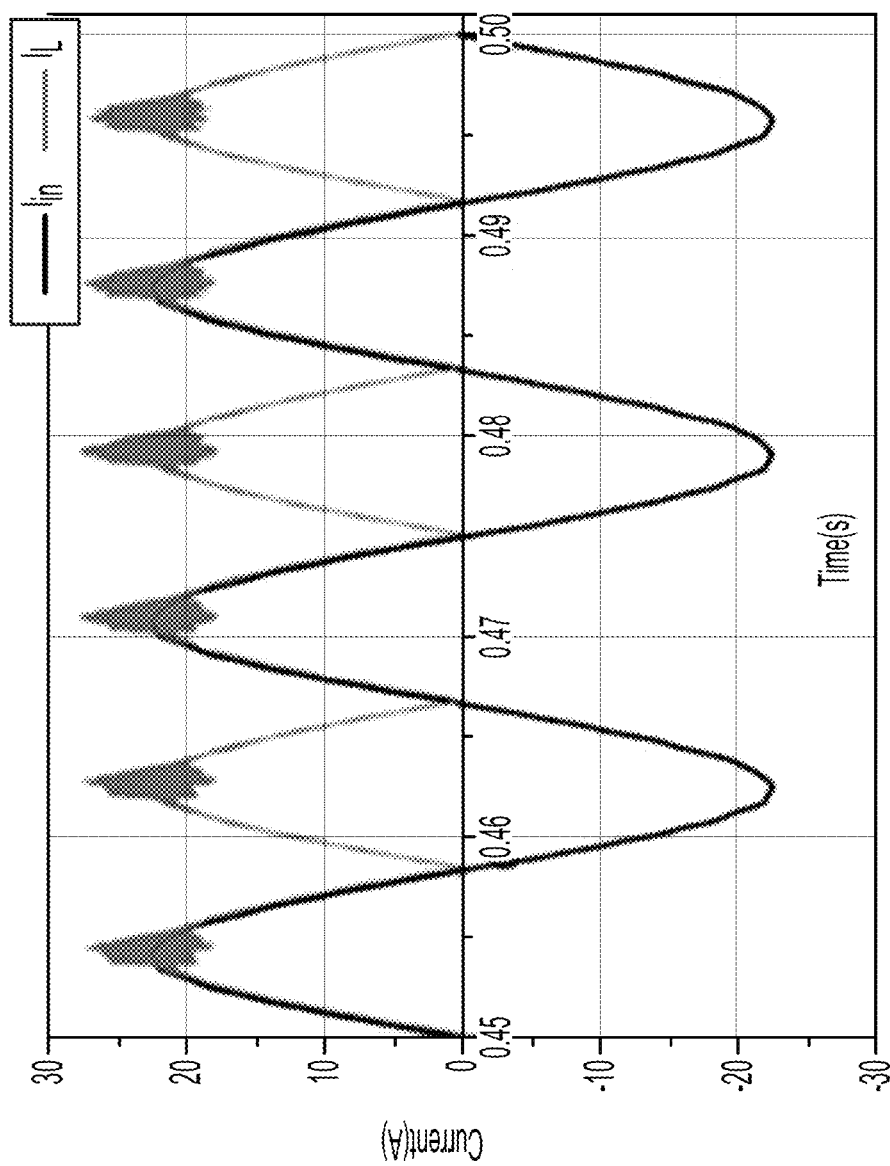
FIGS. 24-25 depict comparison simulation results of a leading-edge modulation and a leading-triangle modulation with 1 μs calculation delay, according to some aspects.
Figure 25:
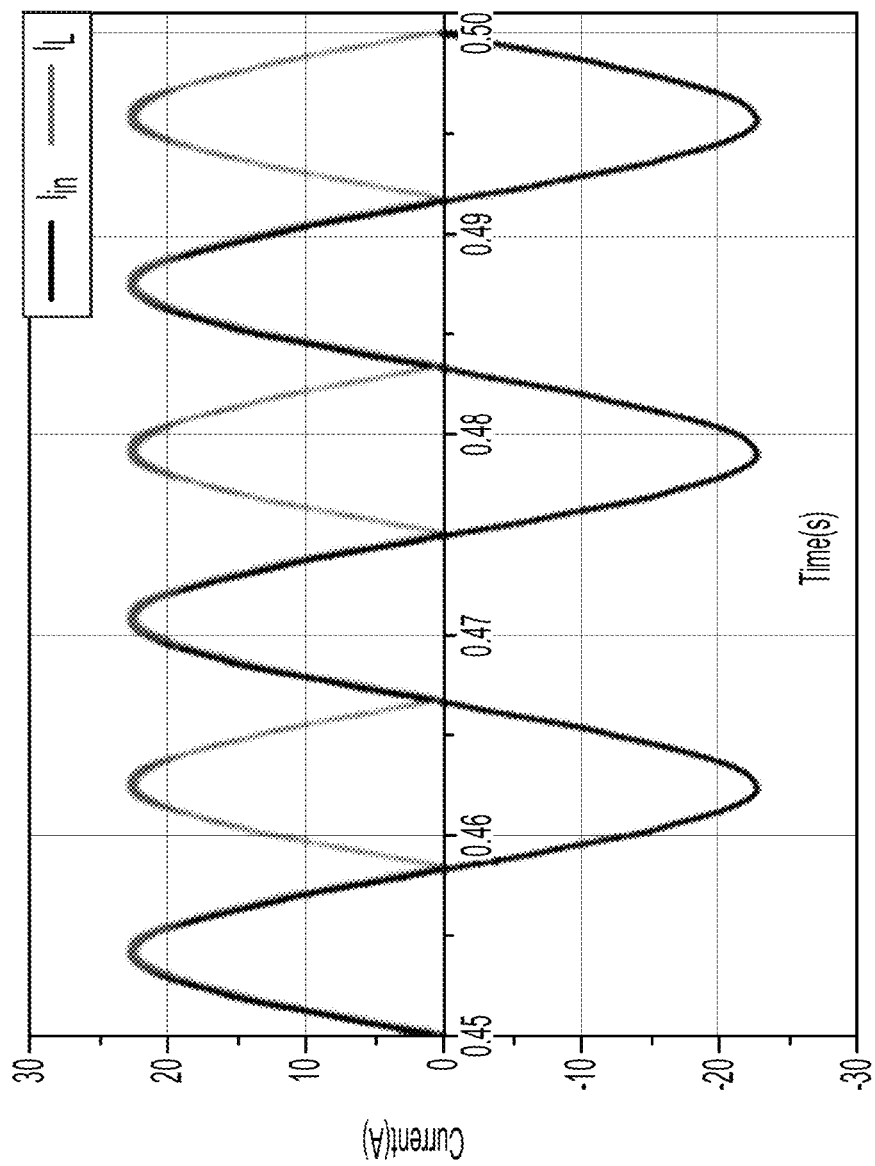

FIGS. 22-23 depict simulation run at 50 kW and a 25 kHz switching frequency at rated voltage. FIGS. 22-23 illustrate that with an over estimated inductance value, the system can start to oscillate. FIGS. 24-25 depict comparison simulation results of a leading-edge modulation and a leading-triangle modulation with 1 μs calculation delay, which depicts that the leading-edge modulation causes oscillations due to the one-cycle delay, while the leading-triangle modulation remains stable.

In some examples, the leading-edge modulation can cause oscillations due to the one-cycle delay, while the leading-triangle modulation remains stable.

Illustrative Examples of Experiment Results

Figure 26:
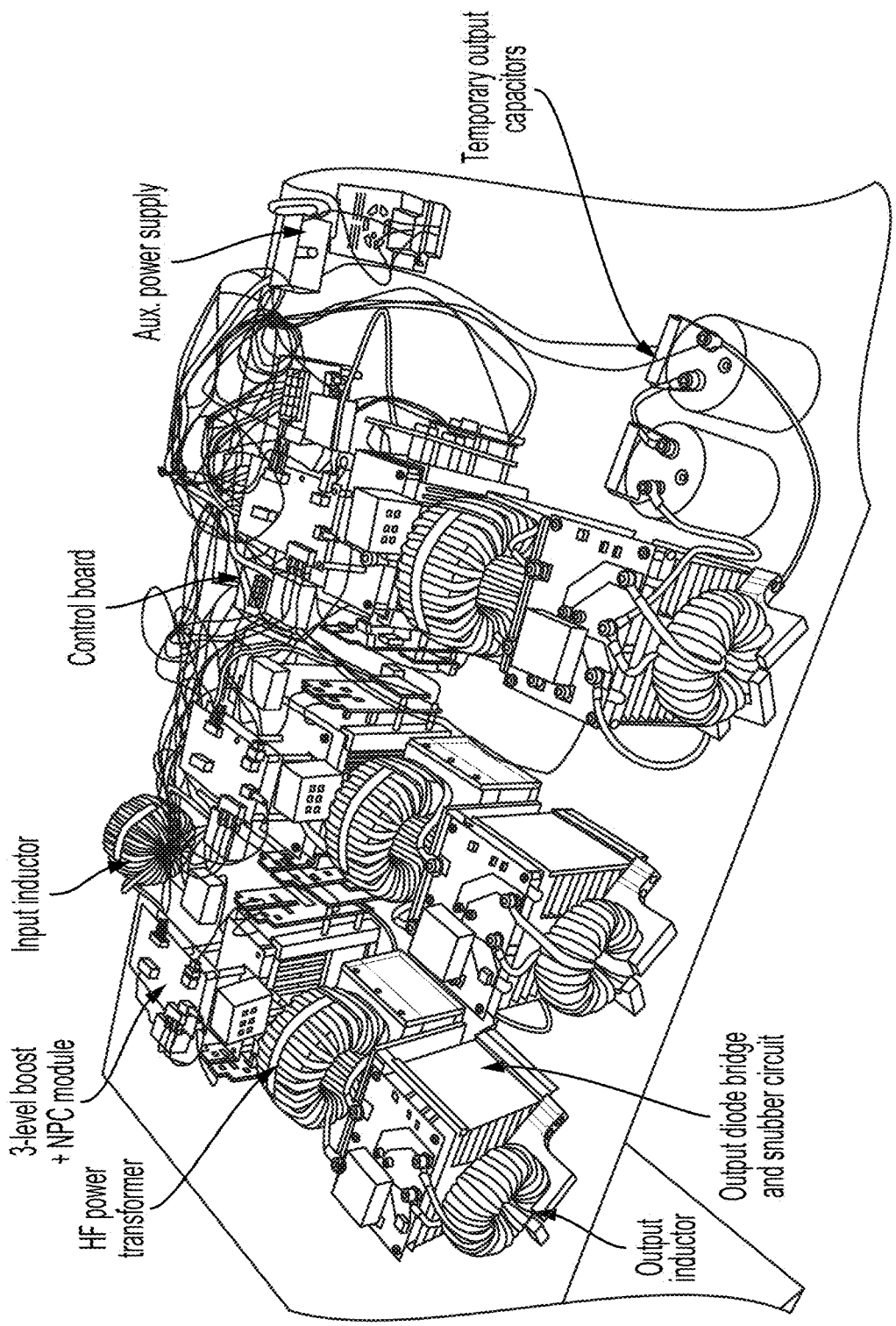
FIG. 26 depicts a 50 kW MV fast charger prototype using an input stage PFC control, according to some aspects.

FIG. 26 depicts a 50 kW MV fast charger prototype using an input stage predictive PFC control, according to some aspects. Examples of the devices selected can be the same as used in the simulations described above, except the resistive load can be replaced with three NPC active loads.

The predictive PFC control strategy as well as the whole PFC and NPC control algorithms can be implemented in a Digital Signal Processor ("DSP") (e.g., a commercially available version of a TMS28377D). The DSP can have two processing cores allowing high-bandwidth predictive PFC control to be allocated to one of the cores and other low-bandwidth controls including the DC-link voltage control, NPC output voltage control, and the capacitor voltage balancing control to be allocated into another core so that the affecting period for the one-cycle-delay can be as short as possible.

Figure 27:
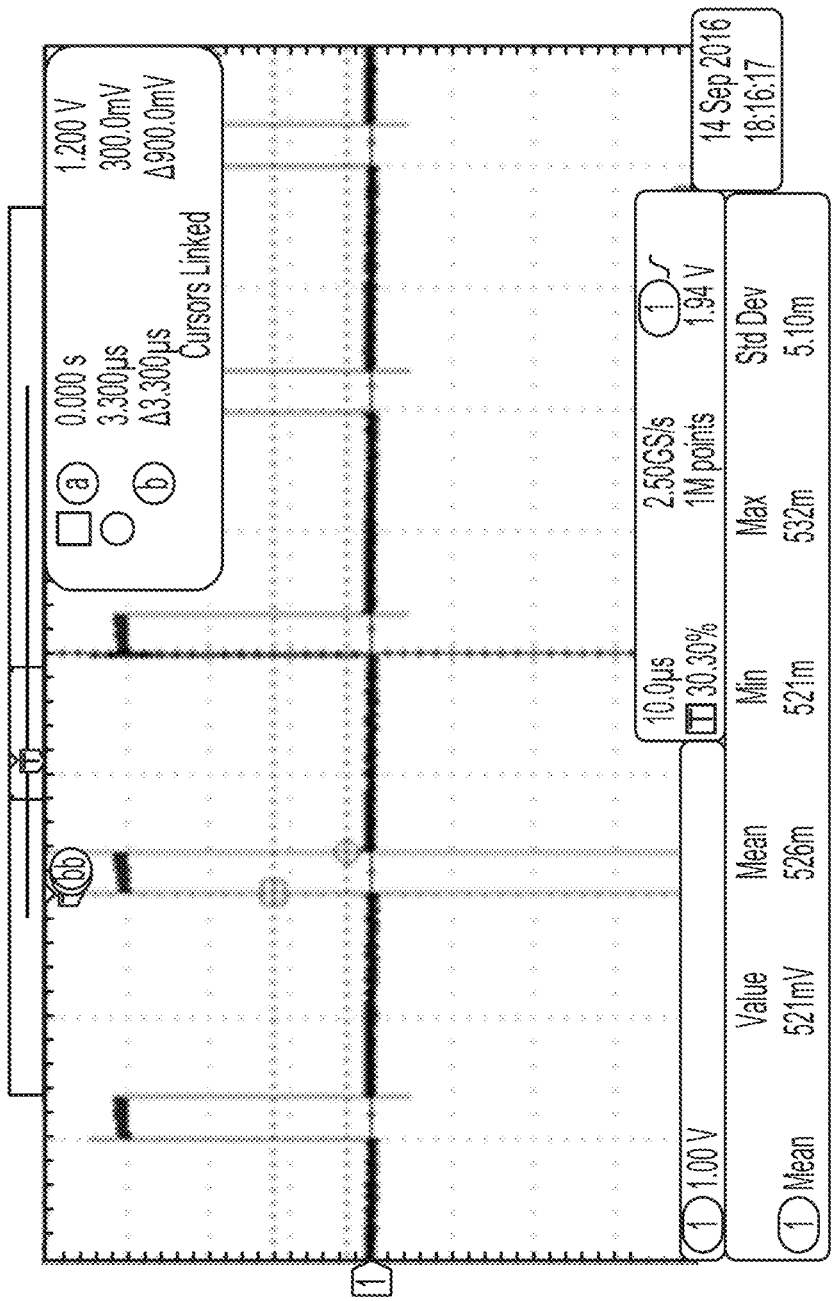
FIGS. 27-29 depict experiment results for a single TLB fed into an isolated DC/DC converter, according to some aspects.
Figure 28:
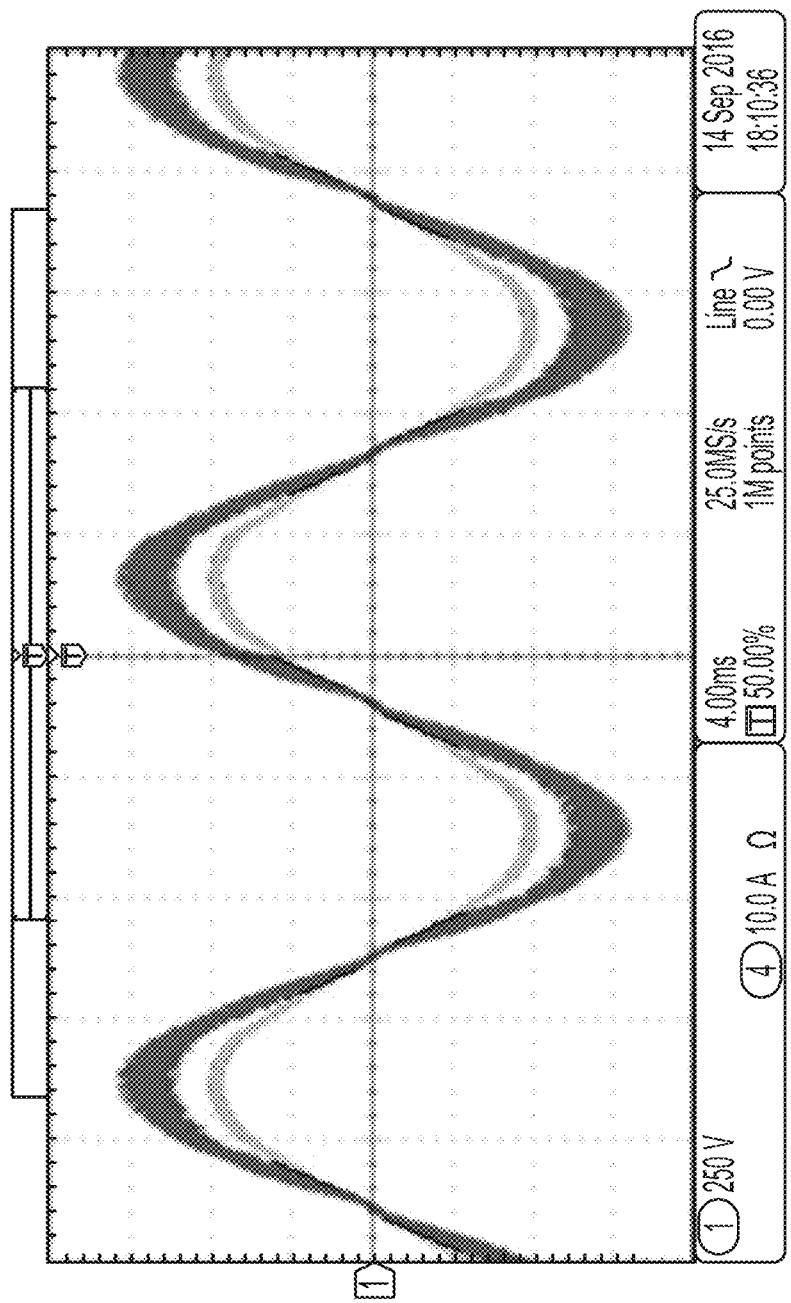
Figure 29:
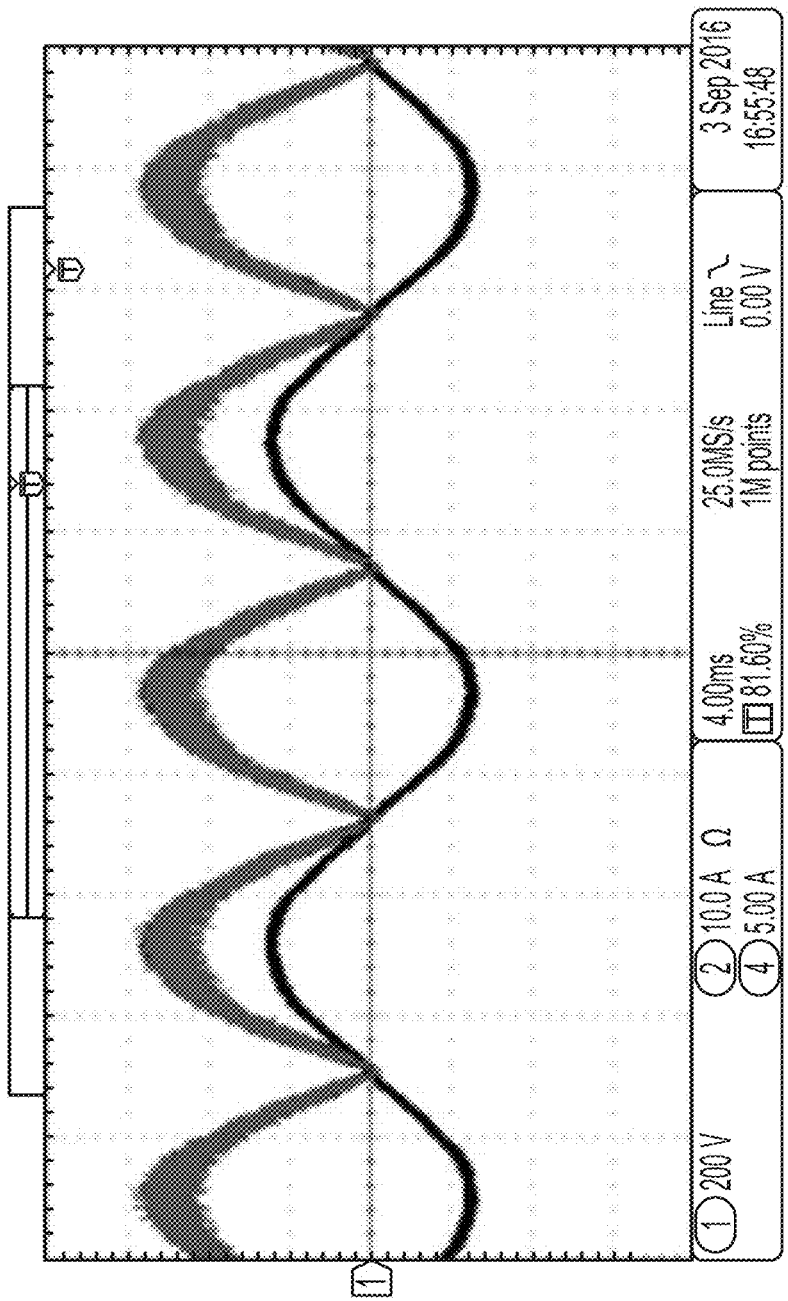

Based on the parameter sensitivity simulations and the core specification, estimated inductance can be selected to be 0.6 mH. FIGS. 27-29 depict experiment results for a single TLB fed into an isolated DC/DC converter, according to some aspects.

In the experimental verification, the computational delay is measured as shown in FIG. 27, which is 3.3 μs. In FIG. 28 the rated load 3.2Ω that will deliver 50 kW power at 400 V output voltage is applied, the test for the single module's input voltage is 600 Vrms, which is shown in the dark blue line, and the input current is 16 Arms, which is the green line.

In FIG. 29, the light load 11Ω, which will deliver 15 kW power at 400 V, is applied, the single module TLB is fed with a 750 Vrms input voltage, the dark blue line shows the input voltage after the rectifier. And the input current, which is the light blue line, is 7 Arms. The full load low input voltage test can be made with a 400 V input, the input current can be 11 A with first 40 harmonics listed. For full load, the input current THD can be lower than 2%.

Figure 30:
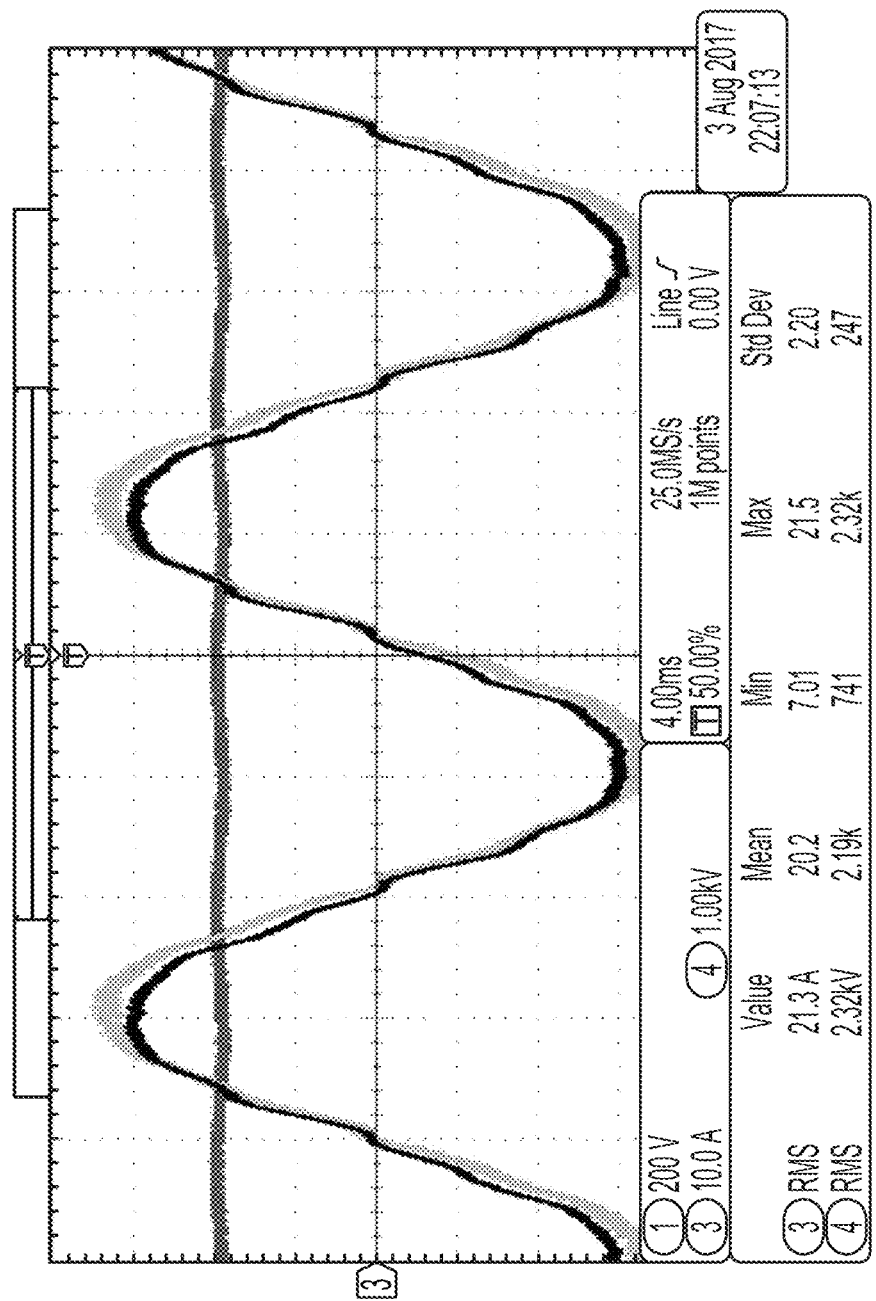
FIG. 30 depicts experiment results for MV Fast Charger prototype using an input stage PFC control, according to some aspects.

Three module test have also been conducted. The input rms voltage was 2.32 kV and the overall bus voltage was 4.8 kV. Shown in FIG. 30, the input voltage waveform is in light green, and the magenta line is the input current waveform and the blue is the output voltage.

In some examples, the test delivered 50.4 kW to the load, with an input rms current 22.8 A, input current THD 3.5% and output voltage of 396 V.

Figure 31:
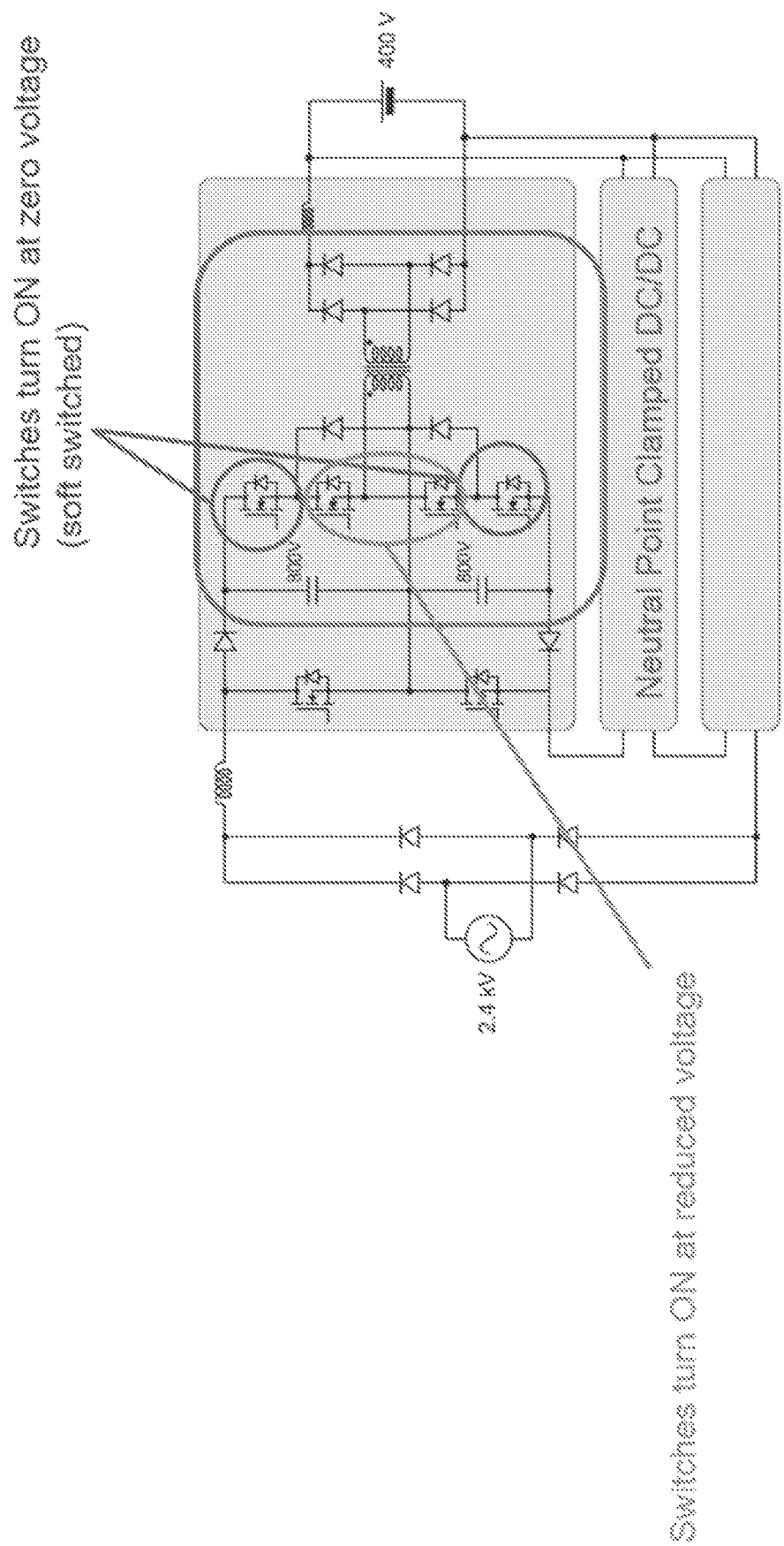
FIG. 31 depicts minimizing losses by implementing soft switching, according to some aspects.

Illustrative Examples of Soft Switching Under Wide-Input-Wide-Output Voltage Variation FIG. 31 depicts an efficiency of a fast charger, according to some aspects.

In some aspects, the efficiency of the fast charger can be improved by minimizing the losses in the NPC switches (switches $S_1$, $S_2$, $S_3$, $S_4$, $S_5$ and $S_6$ depicted in FIG. 14).

In some examples, the losses can be minimized by implementing soft switching. For example, soft switching can occur by ensuring that all of the devices turn off when the voltage or current through the device is zero as depicted in FIG. 31.

Figure 32:
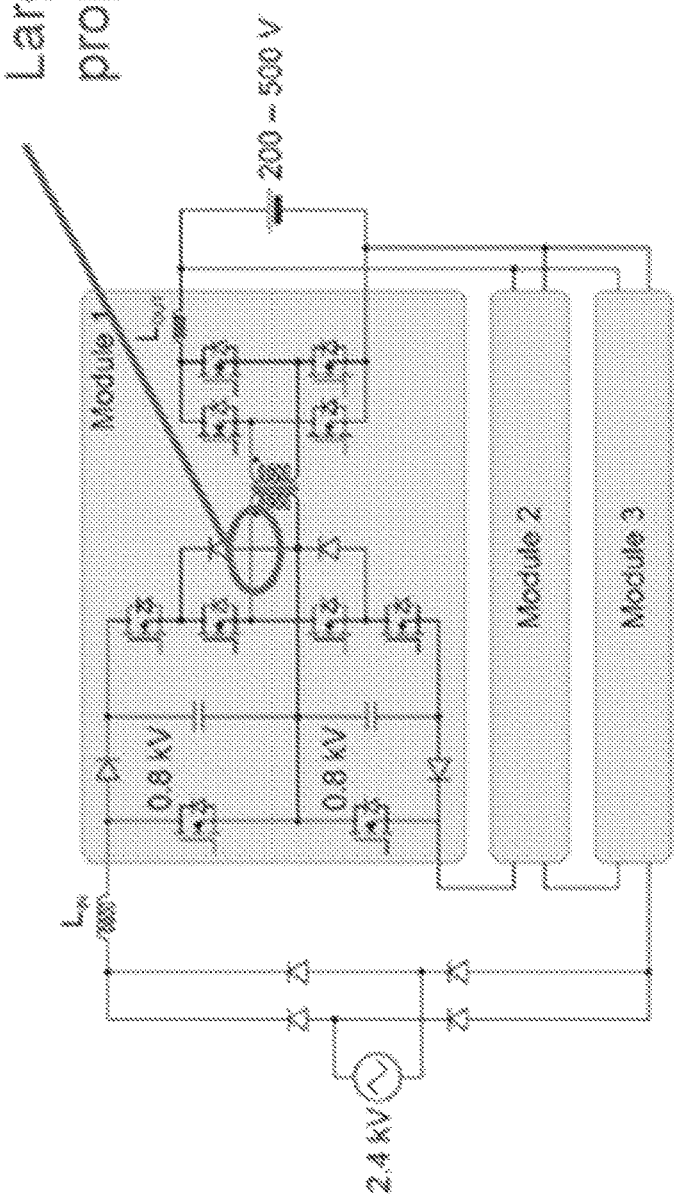
FIG. 32 depicts a topology, here referred to as a passive NPC dual active bridge ("NPC-DAB"), according to some aspects.

In some examples, by controlling the transformer leakage inductance the switching losses of the NPC can be reduced. By replacing diodes with switches on the secondary, a different topology referred to as a NPC dual active bridge ("NPC-DAB") is formed as illustrated in FIG. 32.

In some examples, the outer switches still work under hard-switching. In additional or alternative examples, the switching frequency is limited to 100 kHz by switching losses.

In additional or alternative examples, modulation methods such as controlling primary duty cycle, secondary duty cycle, and phase shift between the primary and secondary are used to extend soft-switching regions. Varying switching frequency modulation can achieve soft-switching PFC function. For example, the input voltage of the DAB can vary from zero to some pre-determined maximum value while the output voltage remains stable at some target voltage.

Figure 33:
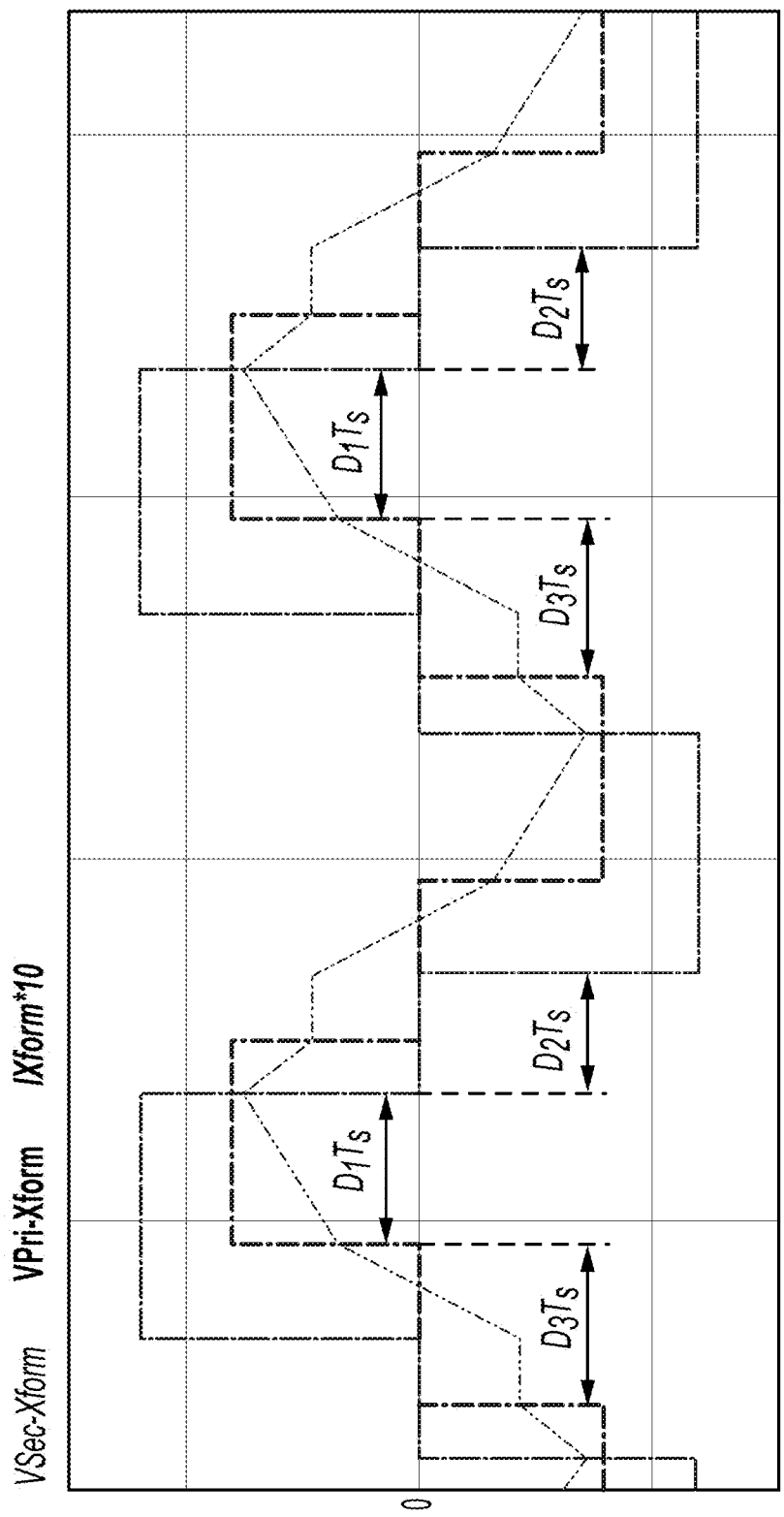
FIG. 33 depicts an example of the primary-to-secondary phase shift, primary side duty cycle, and secondary side duty cycle of a NPC-DAB, according to some aspects.

FIG. 33 depicts an example of the primary-to-secondary phase shift, primary side duty cycle, and secondary side duty cycle of a NPC DAB, according to some aspects.

The primary-to-secondary phase shift $D_1 T_S$, primary side duty cycle $D_2 T_S$, secondary side duty cycle $D_3 T_S$, are the 3 control freedoms for the DAB. These 3 degrees of freedom can be used to achieve soft switching under some conditions.

Figure 34:
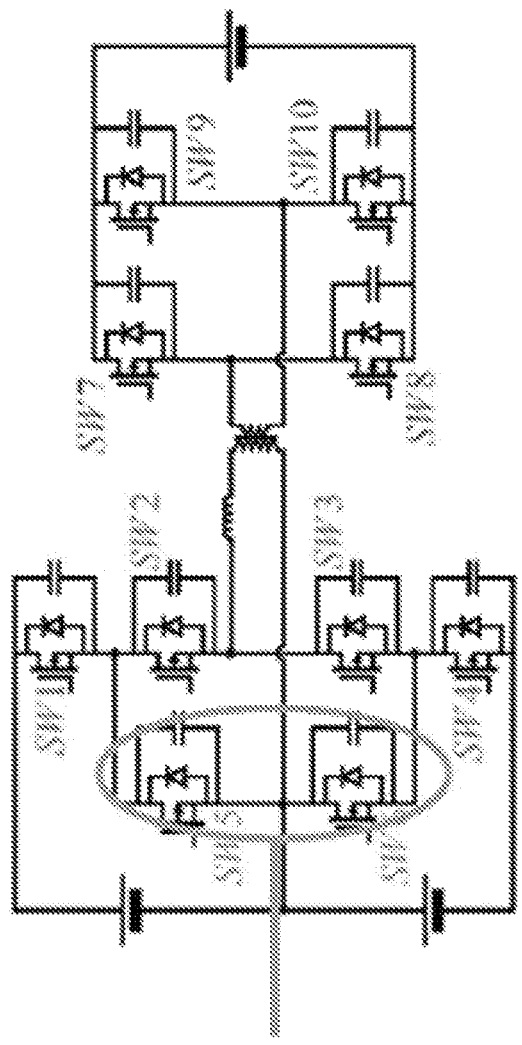
FIG. 34 depicts an example of an active NPC that can be used as part of a DAB topology, according to some aspects.

FIG. 34 depicts an example of an active NPC that can be used as part of a DAB topology, according to some aspects. In some examples, active NPC can use active switches in place of the diodes, as shown in FIG. 34.

In additional or alternative aspects, active NPC zero voltage switching ("ZVS") can be used in a DAB topology using a new modulation scheme. By introducing the controllable switches into the NPC topology and controlling them appropriately, soft switching for all switches can be achieved. In some examples, system losses are reduced and converter operating frequency can be increased, resulting in higher power density and higher efficiency.

Figure 35:
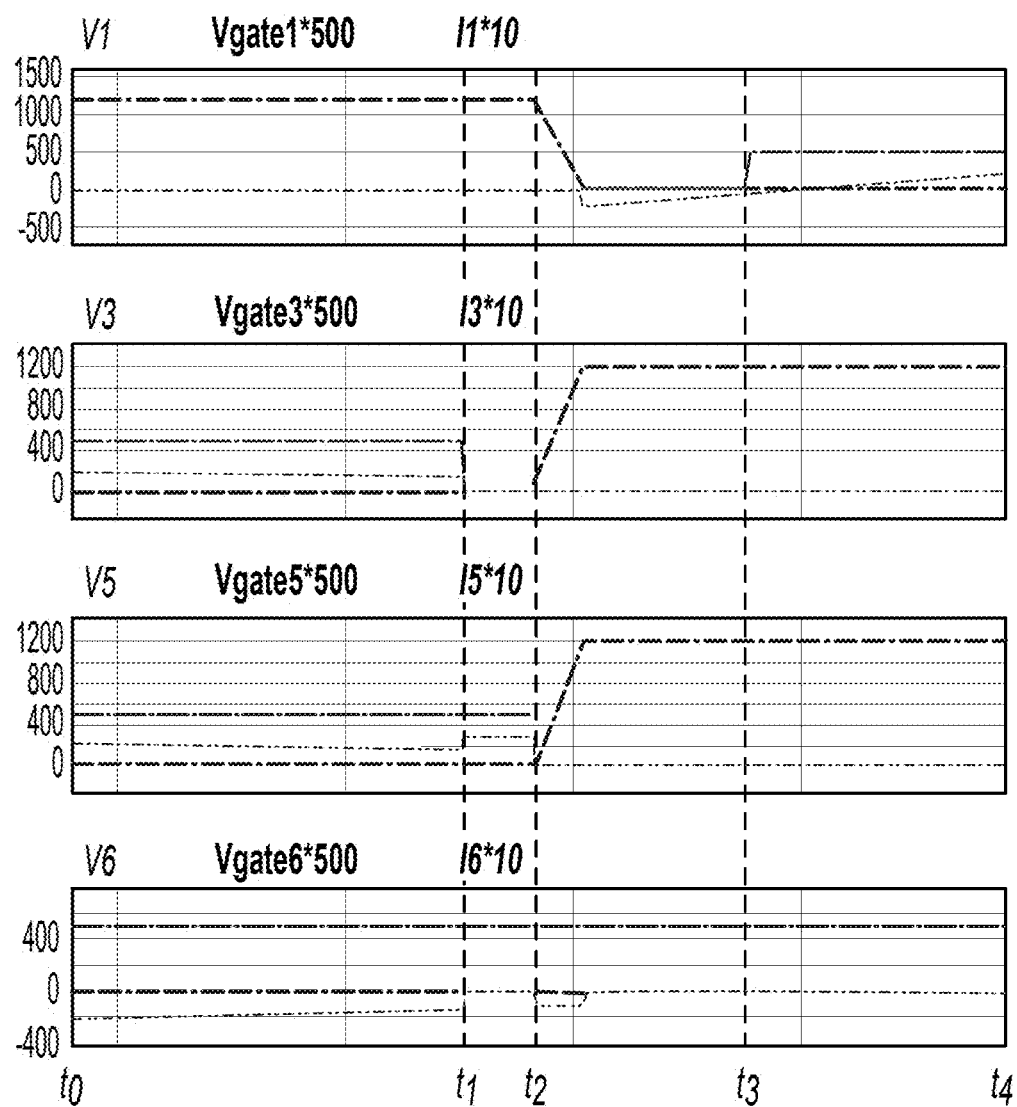
FIG. 35 depicts an example of voltages over time and current paths in a circuit for outer switch soft-switching, according to some aspects.
Figure 35:
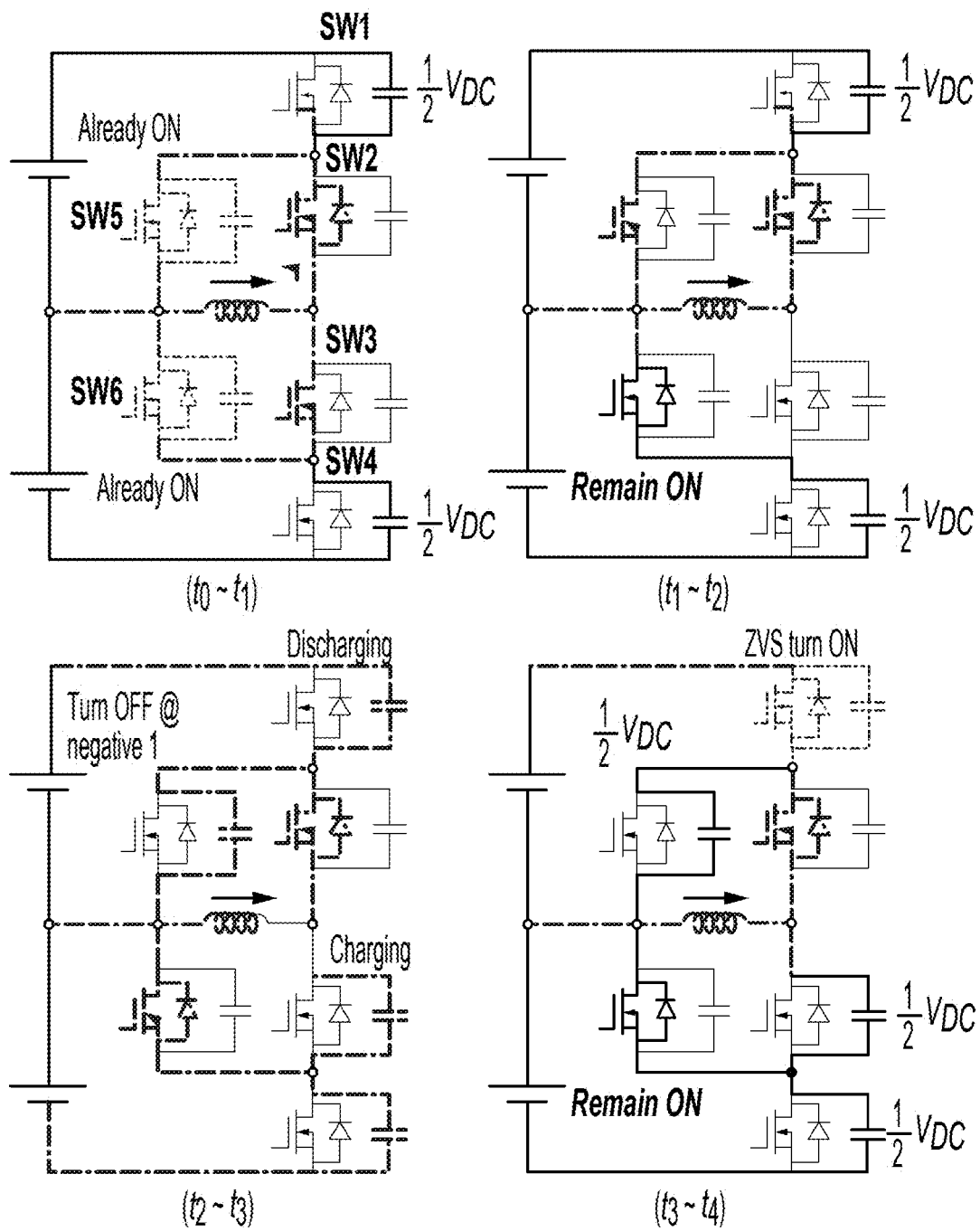

FIG. 35 depicts an example of voltages over time and current paths in a circuit for outer switch soft-switching, according to some aspects In the example depicts in FIG. 35, between $t_0$ and $t_1$, two inner switches (SW2, SW3) are on and the inductor current is circulating. Between $t_1$ and $t_2$, switch SW3 turns off. Since SW5 and SW6 are still conducting, current can still find a path such that no resonant charge or discharge occurs. Between $t_2$ and $t_3$, SW5 or SW6 can turn off, which can cut the path for the circulating current. If the circulating current remains negative, the outer switch SW1 capacitor can be discharged. In some examples, by controlling SW5 or SW6 to turn off at a negative current, a soft-switching range can be enlarged. Between $t_3$ and $t_4$, the outer switch SW1 turns on at zero voltage.

Figure 36:
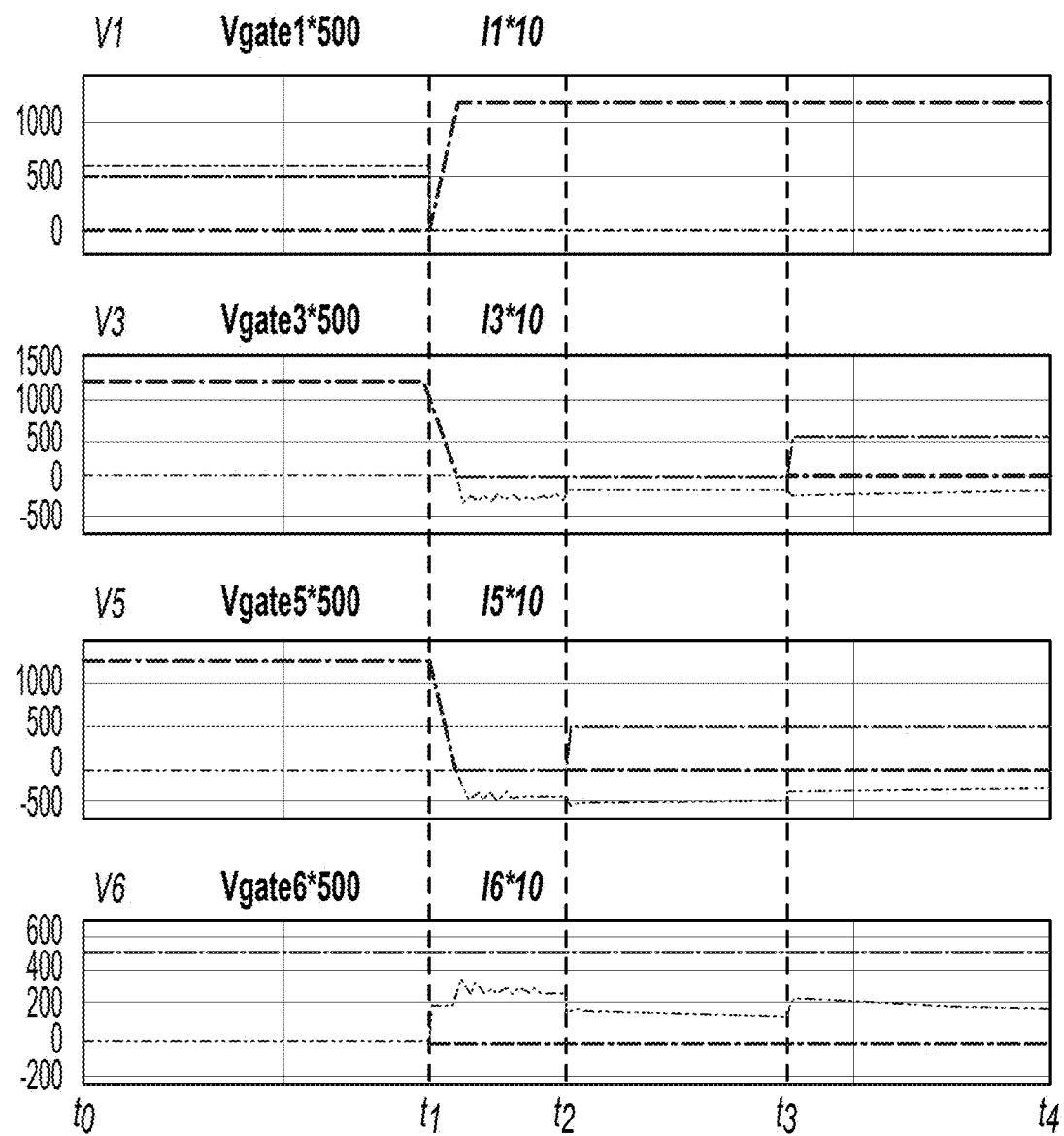
FIG. 36 depicts an example of voltages over time and current paths in a circuit for inner switch soft-switching, according to some aspects.
Figure 36:
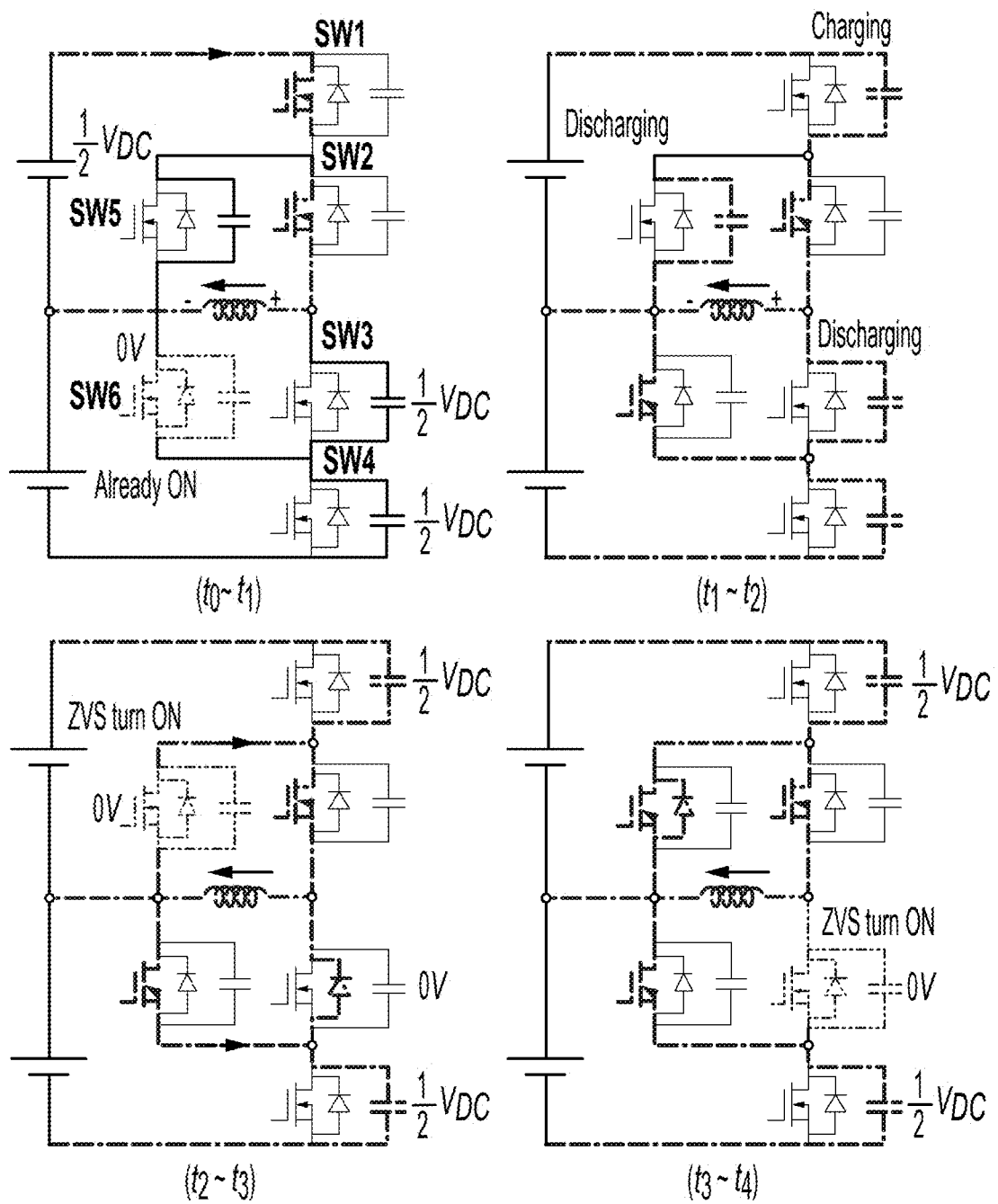

FIG. 36 depicts an example of voltages over time and current paths in a circuit for inner switch soft-switching, according to some aspects.

In the example depicted in FIG. 36, between $t_0$ and $t_1$, the upper two switches (SW1 and SW2) can be conducting when the inductor has a positive current. Between $t_1$ and $t_2$, the outer switch SW1 can turn off, which can prevent the current from circulating. In response to the current being prevented from circulating, the outer switch SW1, inner switch SW3, and SW5 can start to resonate. In some examples, the inner switch SW3 has a path to fully discharge its body capacitor rather than resonate with SW4 and SW6's body capacitor in a passive NPC. Between $t_2$ and $t_3$, SW5 can discharge to zero voltage, the body diode can conduct, and the MOSFET can turn on. Between $t_3$ and $t_4$, the inner switch SW3 can turn on at zero voltage.

Figure 37:
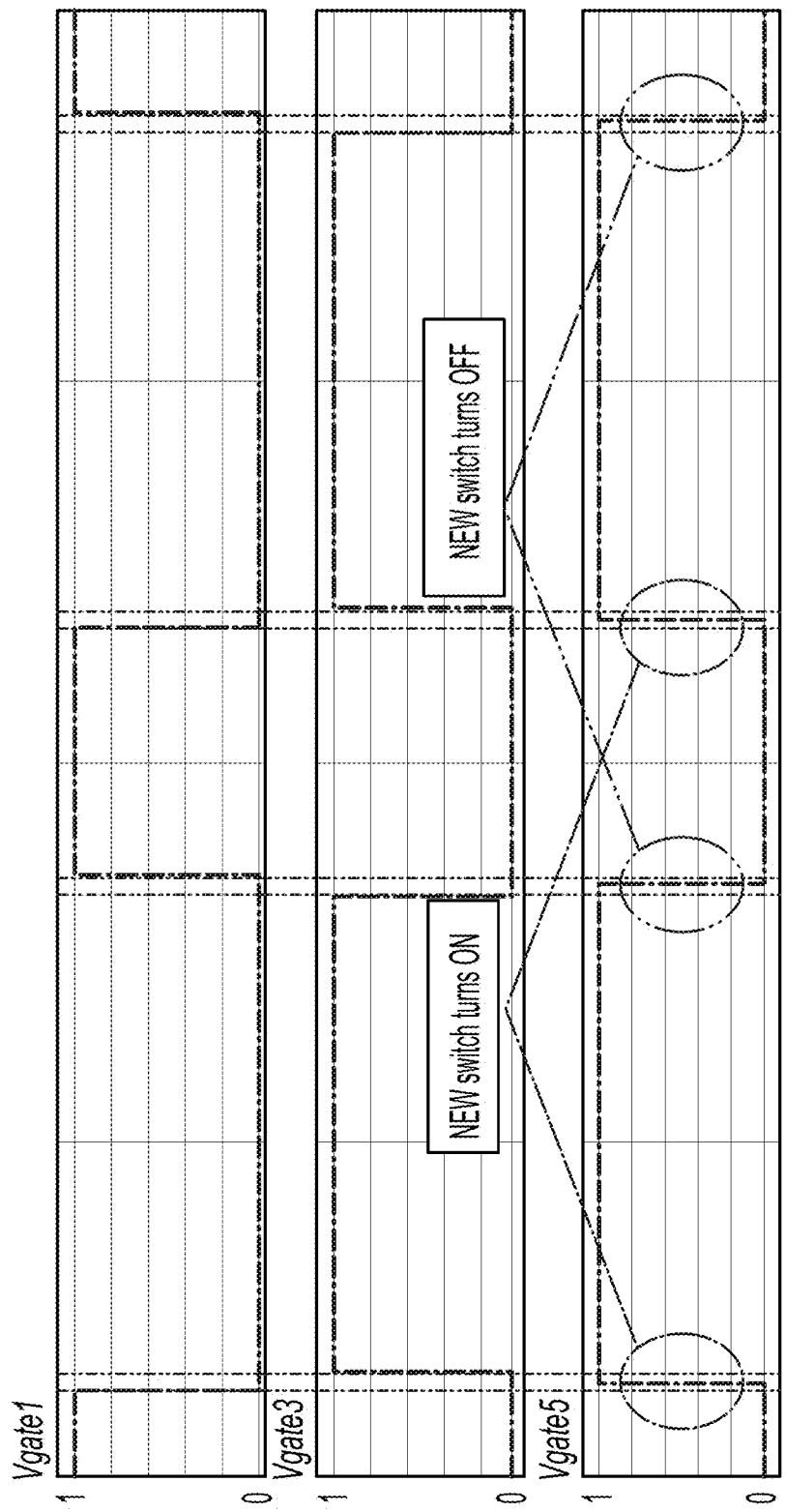
FIG. 37 depicts an example of when a new switch can turn on and off, according to some aspects.

FIG. 37 depicts an example of when a new switch can turn on and off, according to some aspects.

In some examples, a new switch can be turned on during the dead time shortly after the outer switch SW1 or SW4 turns off. In additional or alternative examples, the new switch can be turned off during the dead time shortly after the inner switch SW2 or SW3 turns off.

Figure 38:
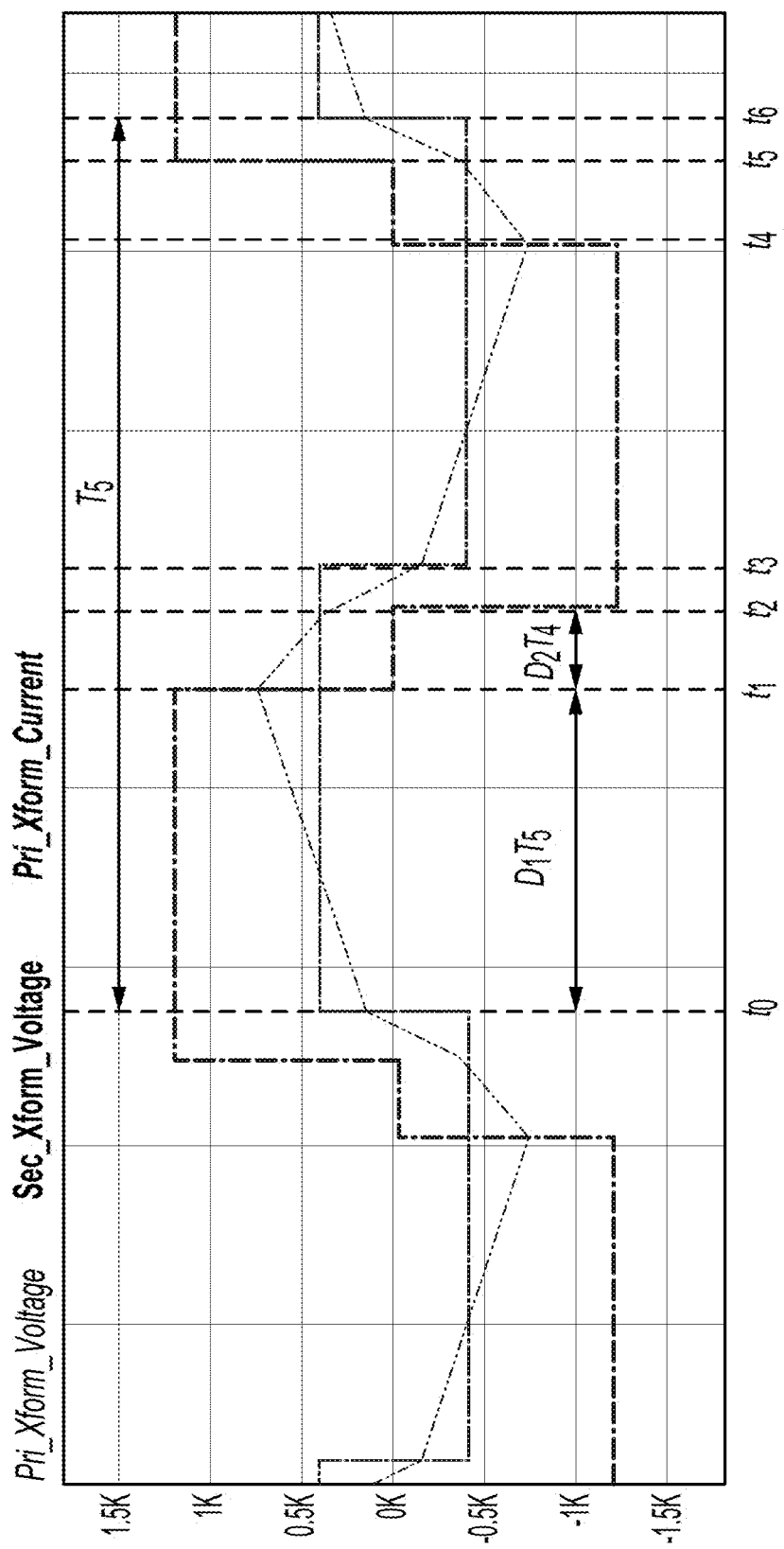
FIG. 38 is an example depicting a first soft-switching mode in which the primary side voltage rising edge is ahead of a secondary side voltage rising edge, according to some aspects.

FIG. 38 is an example depicting a first soft-switching mode in which the primary side voltage rising edge is ahead of a secondary side voltage rising edge, according to some aspects.

In some examples, the soft-switching constraint can be:

$$i_L(t_0) > 0,\ i_L(t_5) < 0$$

$$i_L(t) = \begin{cases} \frac{v_1 - v_2}{L_\delta}t + i_L(t_0) & t_0 \leq t \leq t_1 \\ \frac{-v_2}{L_\delta}t + i_L(t_1) & t_1 \leq t \leq t_2 \\ \frac{-v_1 - v_2}{L_\delta}t + i_L(t_2) & t_2 \leq t \leq t_3 \\ \frac{v_2 - v_1}{L_\delta}t + i_L(t_3) & t_3 \leq t \leq t_4 \\ \frac{v_2}{L_\delta}t + i_L(t_4) & t_4 \leq t \leq t_5 \\ \frac{v_1 + v_2}{L_\delta}t + i_L(t_5) & t_5 \leq t \leq t_6 \end{cases} \quad \text{where} \begin{cases} i_L(t_0) = \frac{v_2 + (1 - 4D_1 - 2D_2)v_1}{4f_s L_\delta} \\ i_L(t_1) = \frac{(1 - 4D_1)v_2 + (1 - 2D_2)v_1}{4f_s L_\delta} \\ i_L(t_2) = \frac{(1 - 4D_1 - 4D_2)v_2 + (1 - 2D_2)v_1}{4f_s L_\delta} \\ i_L(t_3) = \frac{-v_2 - (1 - 4D_1 - 2D_2)v_1}{4f_s L_\delta} \\ i_L(t_4) = \frac{-(1 - 4D_1)v_2 - (1 - 2D_2)v_1}{4f_s L_\delta} \\ i_L(t_5) = \frac{-(1 - 4D_1 - 4D_2)v_2 - (1 - 2D_2)v_1}{4f_s L_\delta} \end{cases}$$

Figure 39:
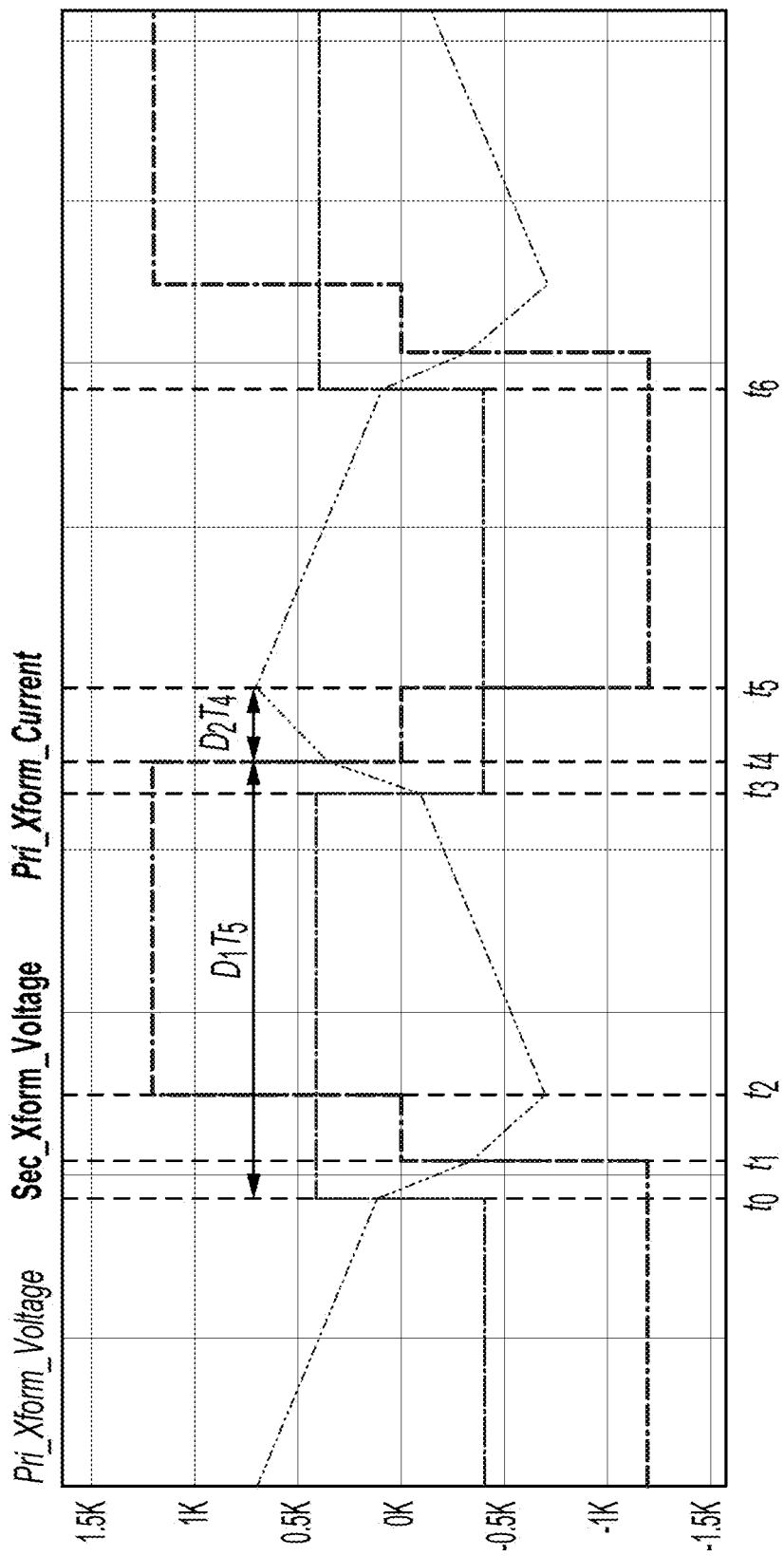
FIG. 39 is an example depicting a second soft-switching mode in which the secondary side voltage rising edge is ahead of a primary side voltage rising edge, according to some aspects.

FIG. 39 is an example depicting a second soft-switching mode in which the secondary side voltage rising edge is ahead of a primary side voltage rising edge, according to some aspects.

In some examples, the soft-switching constraint can be:

$$i_L(t_0) > 0,\ i_L(t_1) < 0$$

$$i_L(t) = \begin{cases} \frac{-v_1 - v_2}{L_\delta}t + i_L(t_0) & t_0 \leq t \leq t_1 \\ \frac{-v_2}{L_\delta}t + i_L(t_1) & t_1 \leq t \leq t_2 \\ \frac{v_1 - v_2}{L_\delta}t + i_L(t_2) & t_2 \leq t \leq t_3 \\ \frac{v_1 + v_2}{L_\delta}t + i_L(t_3) & t_3 \leq t \leq t_4 \\ \frac{v_2}{L_\delta}t + i_L(t_4) & t_4 \leq t \leq t_5 \\ \frac{v_2 - v_1}{L_\delta}t + i_L(t_5) & t_5 \leq t \leq t_6 \end{cases} \quad \text{where} \begin{cases} i_L(t_0) = \frac{(4D_1 + 2D_2 - 3)v_1 + v_2}{4f_s L_\delta} \\ i_L(t_1) = \frac{(2D_1 - 1)v_1 + (3 - 4D_1)v_3}{4f_s L_\delta} \\ i_L(t_2) = \frac{(2D_1 - 1)v_1 + (3 - 4D_1 - 4D_2)v_2}{4f_s L_\delta} \\ i_L(t_3) = \frac{-(4D_1 + 2D_2 - 3)v_1 - v_2}{4f_s L_\delta} \\ i_L(t_4) = \frac{-(2D_1 - 1)v_1 - (3 - 4D_1)v_2}{4f_s L_\delta} \\ i_L(t_5) = \frac{-(2D_1 - 1)v_1 - (3 - 4D_1 - 4D_2)v_2}{4f_s L_\delta} \end{cases}$$

Figure 40:
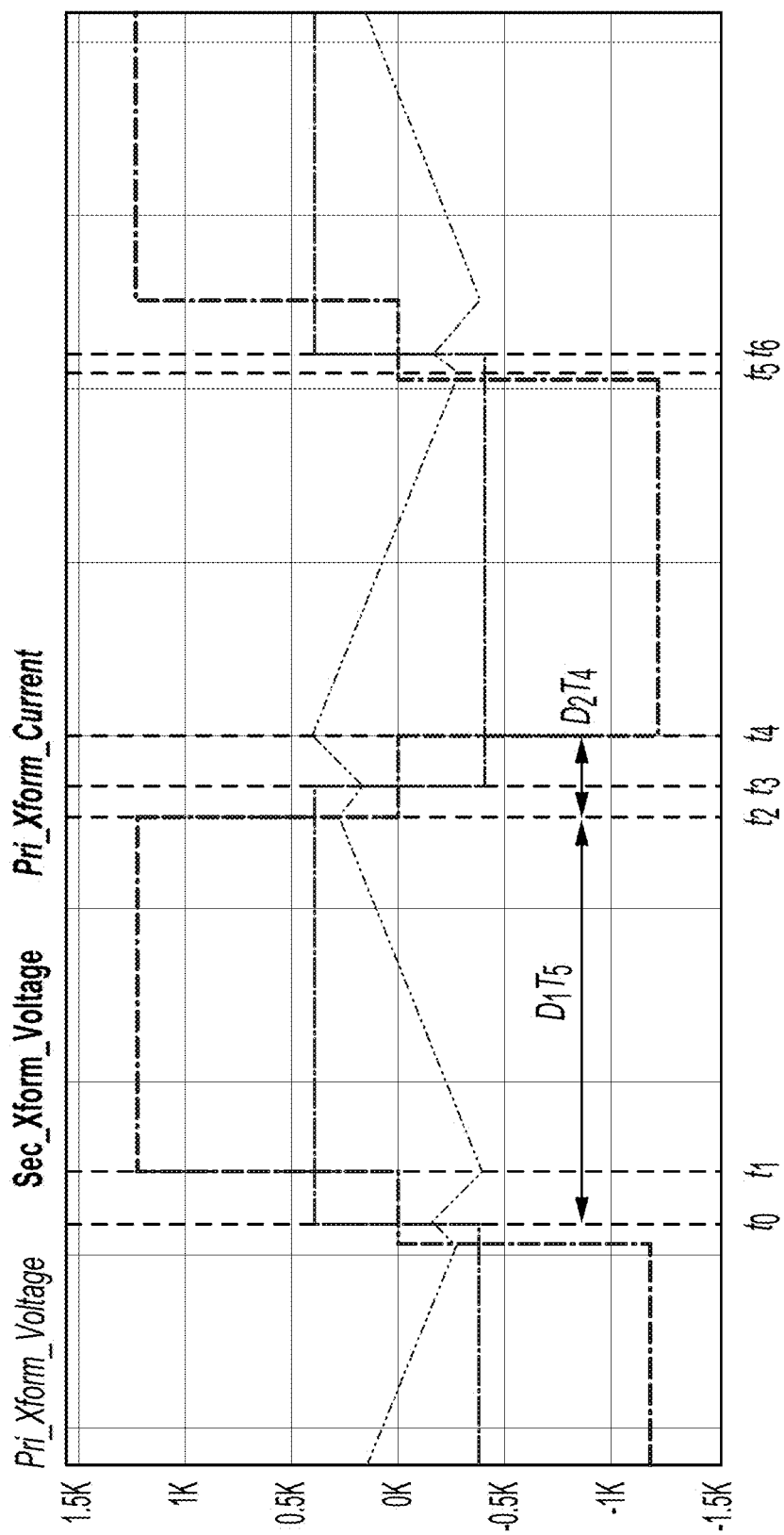
FIG. 40 is an example depicting a third soft-switching mode in which the secondary side voltage rising edge is between a primary side voltage falling edge and a primary side voltage rising edge, according to some aspects.

FIG. 40 is an example depicting a third soft-switching mode in which the secondary side voltage rising edge is between a primary side voltage falling edge and a primary side voltage rising edge, according to some aspects.

In some examples, the soft-switching constraint can be:

$$i_L(t_0) > 0,$$

$$i_L(t_1) < 0, i_L(t_2) < 0$$

$$i_L(t) = \begin{cases} \frac{-v_2}{L_\delta}t + i_L(t_0) & t_0 \le t \le t_1 \\ \frac{v_1 - v_2}{L_\delta}t + i_L(t_1) & t_1 \le t \le t_2 \\ \frac{-v_2}{L_\delta}t + i_L(t_2) & t_2 \le t \le t_3 \\ \frac{v_2}{L_\delta}t + i_L(t_3) & t_3 \le t \le t_4 \\ \frac{v_2 - v_1}{L_\delta}t + i_L(t_4) & t_4 \le t \le t_5 \\ \frac{v_2}{L_\delta}t + i_L(t_5) & t_5 \le t \le t_6 \end{cases} \text{ where } \begin{cases} i_L(t_0) = \frac{(2D_2-1)v_1 + v_2}{4f_s L_\delta} \\ i_L(t_1) = \frac{(2D_1-1)v_1 + (3-4D_1-D_2)v_2}{4f_s L_\delta} \\ i_L(t_2) = \frac{(1+2D_1-4D_2)v_1 + (1-4D_1-3D_2)v_2}{4f_s L_\delta} \\ i_L(t_0) = \frac{-(2D_2-1)v_1 - v_2}{4f_s L_\delta} \\ i_L(t_1) = \frac{-(2D_1-1)v_1 - (3-4D_1-D_2)v_2}{4f_s L_\delta} \\ i_L(t_2) = \frac{-(1+2D_1-4D_2)v_1 - (1-4D_1-3D_2)v_2}{4f_s L_\delta} \end{cases}$$

Based on the soft-switching constraint for each of the three modes, a soft-switching region for different voltage transfer ratio with respect to different phase shift and primary side duty cycle can be generated.

Figure 41:
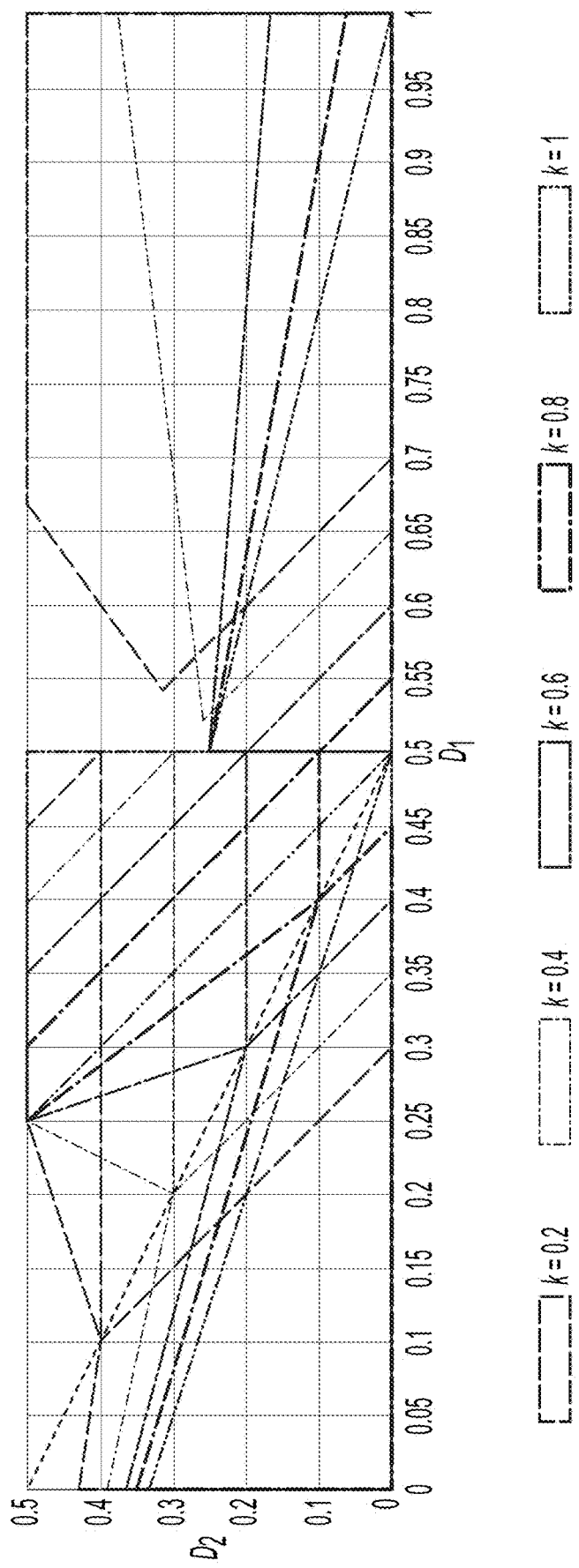
FIG. 41 depicts an example of different voltage transfer ratio with respect to different phase shift and primary side duty cycles, according to some aspects.

FIG. 41 depicts an example of different voltage transfer ratio with respect to different phase shift and primary side duty cycles, according to some aspects. In this example, $k=V_2/V_1$, $D_1$ relates to the phase shift ratio between primary and secondary side, and $D_2$ relates to the primary side duty cycle as described above.

Figure 42:
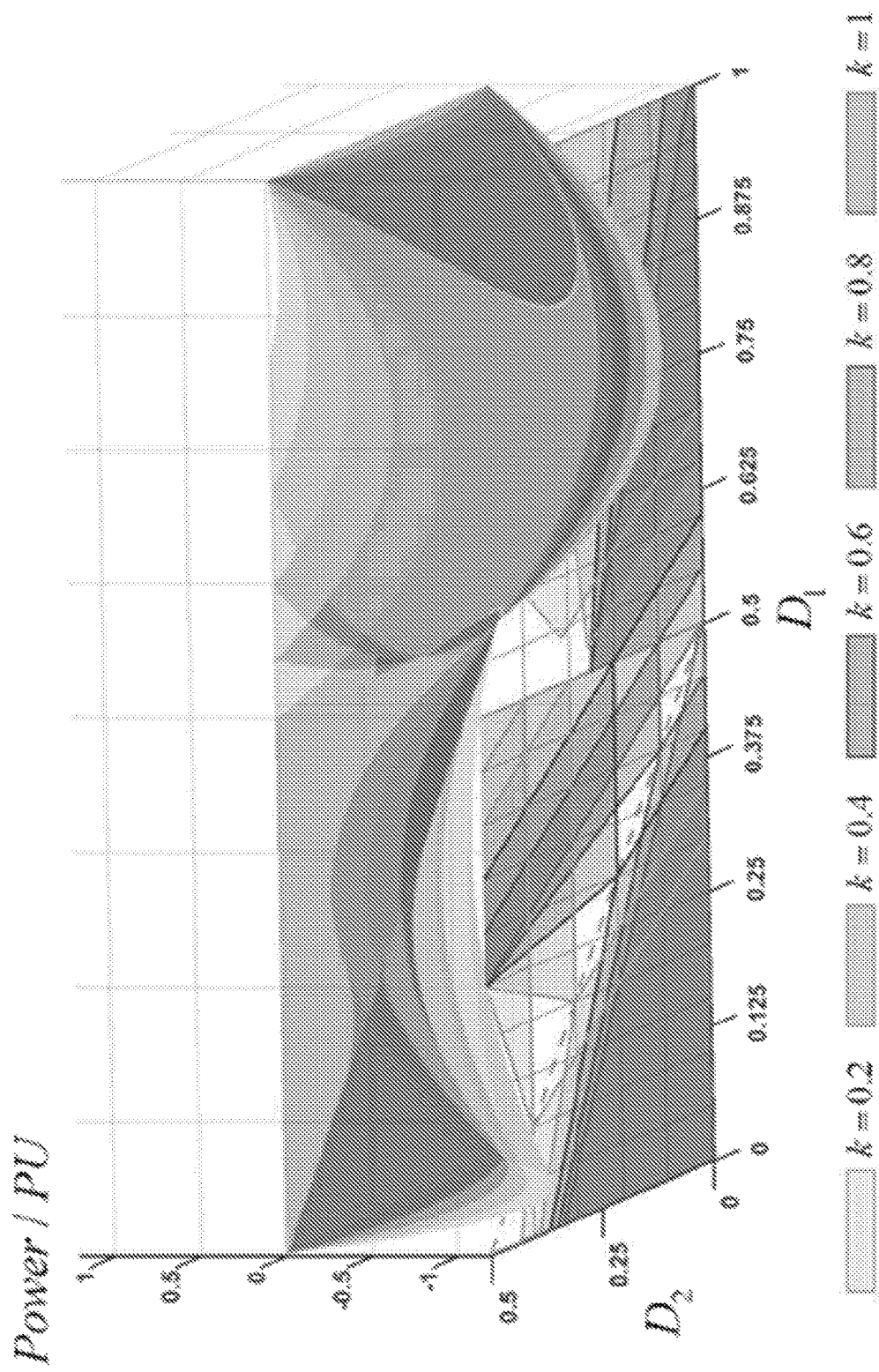
FIG. 42 is an example depicting that the soft-switching region can be larger than the optimized full bridge DAB, according to some aspects.

Compared to the passive NPC applied in the DAB, the active NPC can achieve zero voltage switching for all switches for a very large range of the load. FIG. 42 is an example depicting that the soft-switching region can be larger than the optimized full bridge DAB, according to some aspects.

Figure 44:
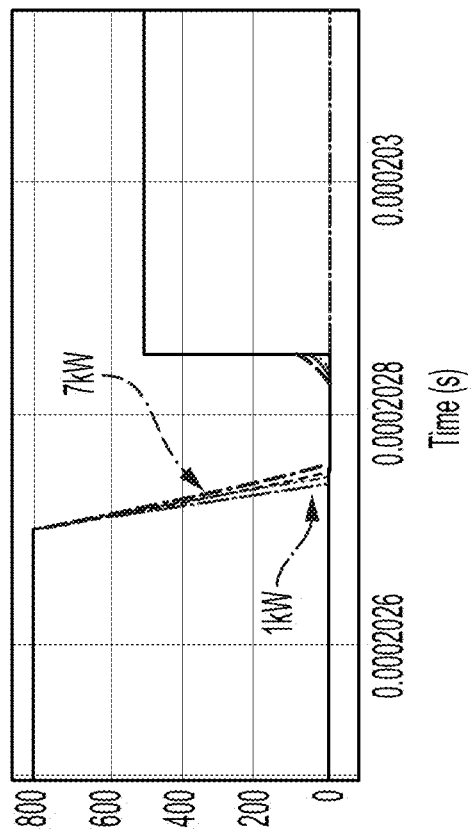
Figure 43:
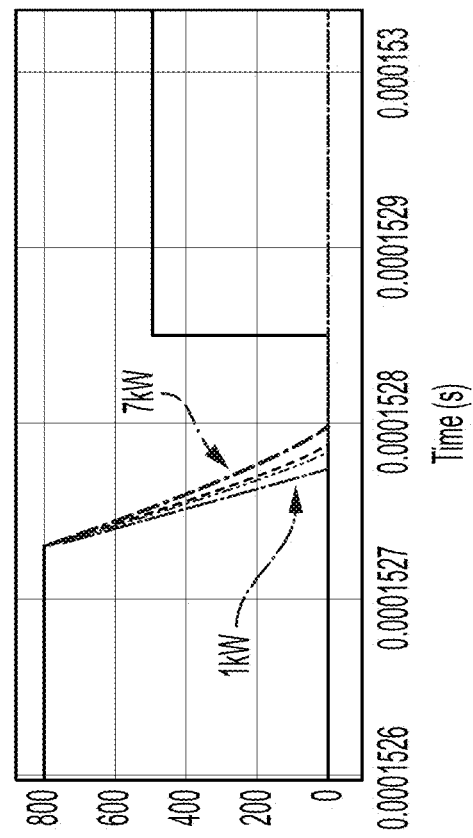

FIGS. 43-46 depict an example of a performance comparison between passive and active NPC, according to some aspects. FIG. 43 is an example of an active NPC DAB outer switch during a light load and FIG. 44 is an example of a passive NPC DAB outer switch during a light load.

At light load the inductor current may change to positive during the dead time, which can lead to the passive NPC outer switch voltage rising up again. The extra switch in the active NPC can prevent the current from changing direction during the dead time.

FIG. 45 is an example of an active NPC DAB inner switch during a light load and FIG. 46 is an example of a passive NPC DAB inner switch during a light load.

As described above, a passive NPC results in hard-switching for the two inner switches. In some examples, the body capacitor voltage can be reduced by nearly half but may never achieve ZVS. An active NPC can achieve ZVS since the inner switch is shorted by the extra switch during the dead time.

Figure 49:
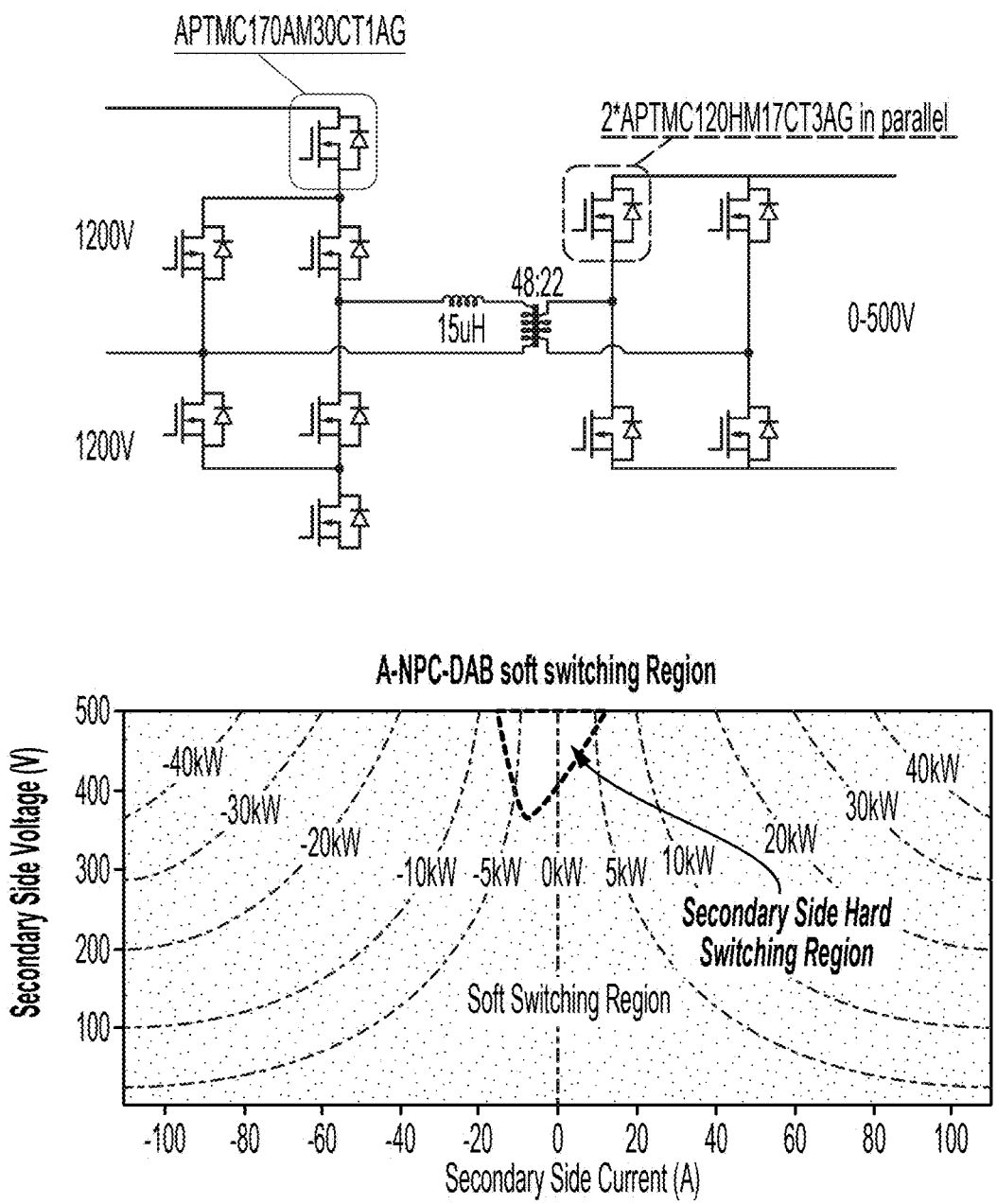

FIGS. 47-49 depict soft switching regions for the full-bridge DAB ("FB-DAB"), NPC-DAB and active NPC-DAB ("A-NPC-DAB") in a fast charger application, according to some aspects. FIG. 47 shows an example of the full bridge DAB (FB-DAB) topology and plots the soft switching region for the primary and the secondary switches. FIG. 48 shows an example of the NPC-DAB topology and plots the soft switching region for the primary and the secondary switches. For this topology the outer switches may be hard switched. FIG. 49 shows an example of the active NPC DAB (A-NPC-DAB) topology and plots the soft switching region for the primary and the secondary switches. In these examples, the A-NPC-DAB can provide the best performance.

In some examples, FB-DAB, NPC-DAB, and A-NPC-DAB can be used for the DC/DC stage of a 100 kW DC fast charger. Output inductors may be applied (not depicted in FIGS. 47-49) to prevent circulating current on the secondary-side.

In some examples, implementing an A-NPC-DAB to achieve soft switching in a modular medium voltage fast charger can provide the fast charger with a large voltage transfer ratio. In additional or alternative examples, implementing A-NPC-DAB can allow a fast charger to avoid using a large voltage rating device or cascaded devices at high voltage side. Full-load-range soft-switching for all switches can boost the operating switching frequency and shrink the passive component volume further. The A-NPC-DAB can have a smaller leakage inductance compared to FB-DAB, resulting in a reduced reactive power loss at the primary side. In some examples, large soft-switching operating range introduces more control freedoms, which can simplify the control or achieve more function.

Figure 50:
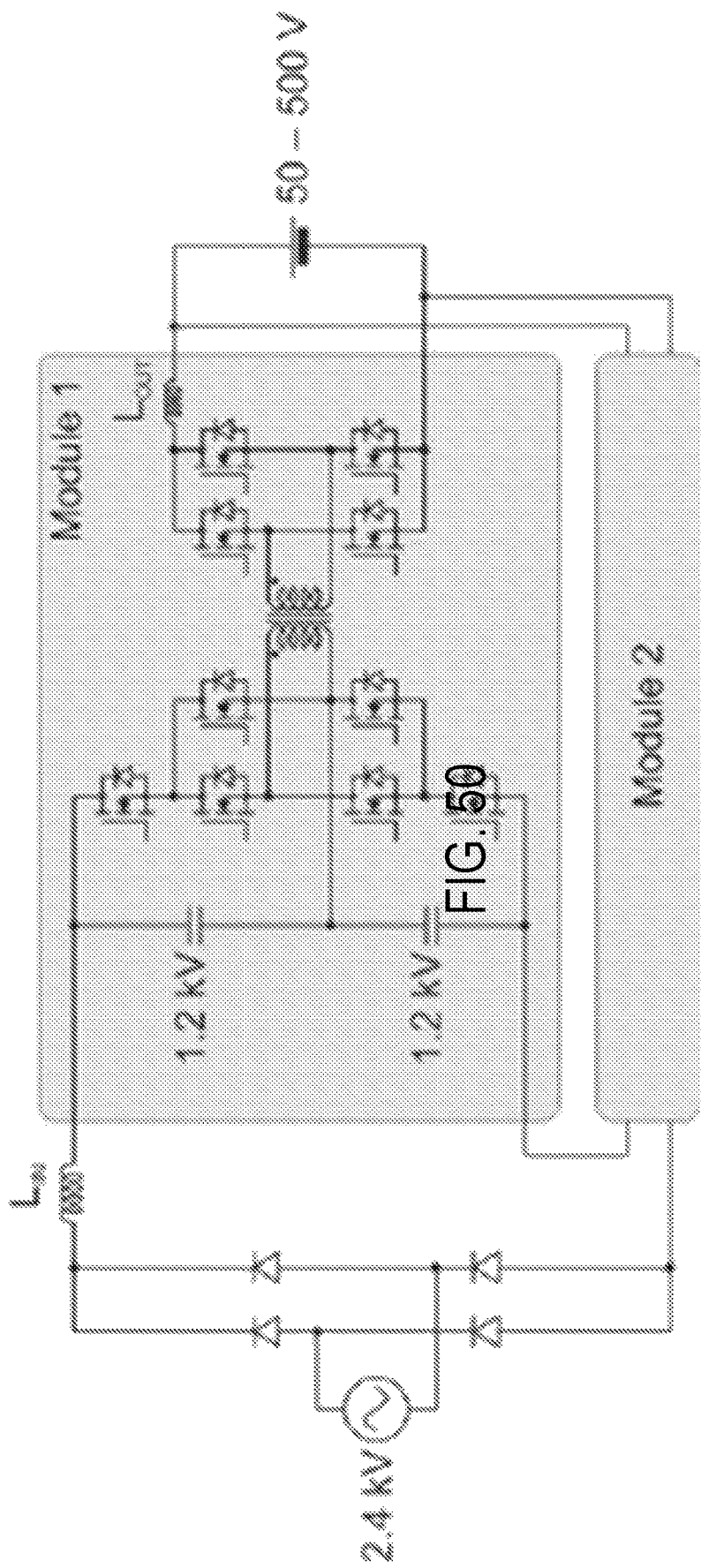
FIG. 50 depicts an example of a multi-cell boost topology with the three-level boost stage removed, according to some aspects.

For example, FIG. 50 depicts an example of a multi-cell boost topology with the three-level boost stage removed. In this example, the topology is capable of operating efficiently over a wide voltage range. Therefore, it is possible to use the topology for both power factor correction and for DC/DC conversion. In effect, three-level boost stage of the fast charger can be eliminated by using the active NPC-DAB with the switching scheme.

Illustrative Examples of an Auxiliary Capacitor to Reduce a NPC-DAB Turn-ON Voltage In some aspects, using an auxiliary capacitor to reduce a NPC-DAB turn-ON voltage can reduce the losses in a NPC DC/DC converter (e.g., the NPC DC/DC converter in FIG.

31). The auxiliary capacitor can operate in the same way if the diodes on the secondary are replaced with switches, operating in synchronous rectification. The inner switches of the NPC turn ON at non-zero voltage, resulting in additional losses. The innovation reduces the voltage at the moment of turning ON, thus reducing losses.

Figure 51:
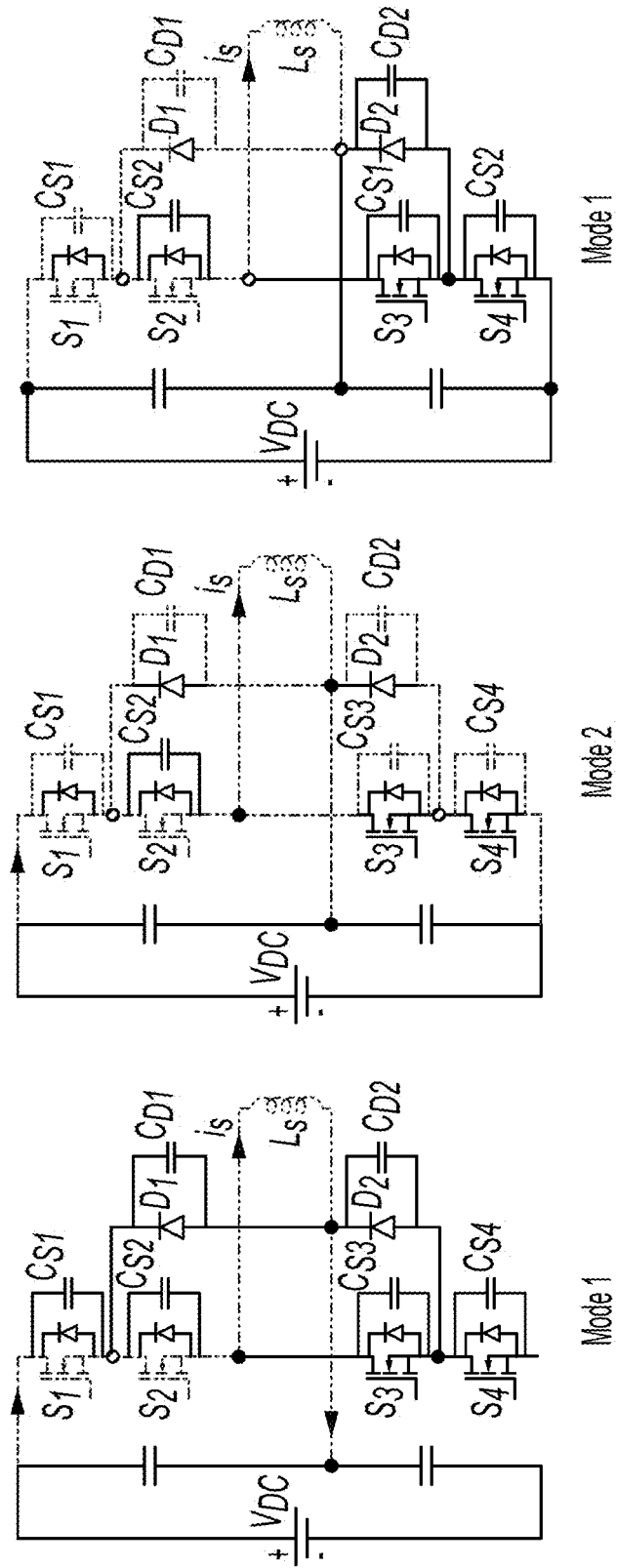
FIG. 51 depicts an example of a DC/DC converter primary-side NPC switches including an auxiliary capacitor operating in three different modes, according to some aspects.

FIG. 51 depicts an example of a DC/DC converter primary-side NPC switches including an auxiliary capacitor operating in three different modes, according to some aspects.

In the example depicted in FIG. 51, in mode 1, the current can pass through $S_1$, $S_2$, and the leakage inductor before $S_2$ turns off. In mode 2, circuit transient can occur after $S_2$ turns off and before $S_3$ turns on. Device parasitic capacitors: $C_{S1}$, $C_{D1}$, $C_{D2}$, $C_{S3}$, and $C_{S4}$ can be discharged or charged during this period. The transient can end when $D_1$ conducts and current freewheels through $S_2$ and $D_1$ in mode 3.

Figure 52:
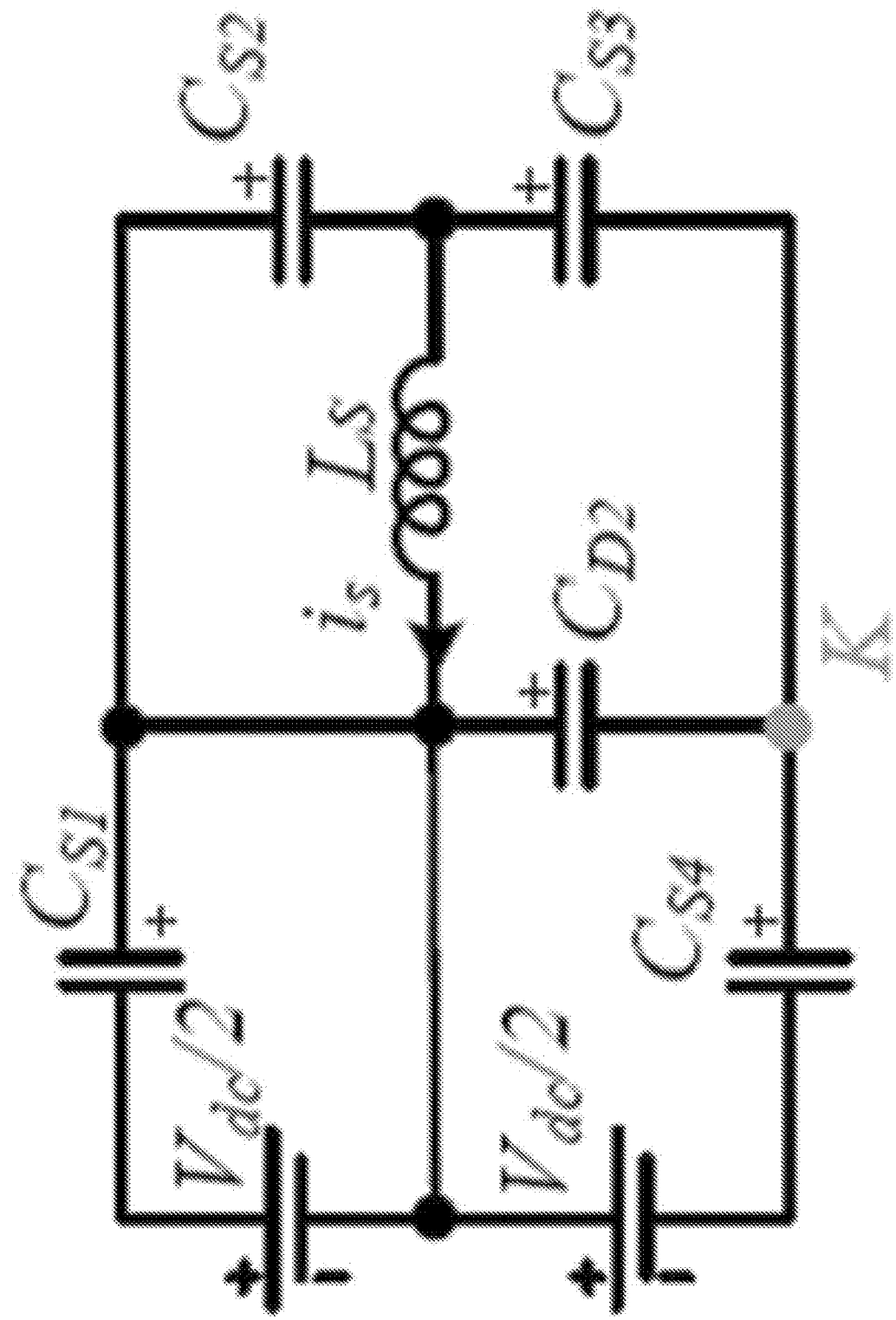
FIG. 52 depicts an example of an equivalent circuit to the circuit for Mode 2 of FIG. 52.

FIG. 52 depicts an example of an equivalent circuit to the circuit for Mode 2 of FIG. 51.

In this example, the equivalent circuit for mode 2 includes parasitic capacitors and regards a leakage inductor as a constant current source while a bus capacitor is a constant voltage source during the transient. The initial condition and final voltage for each capacitor are listed in the table in FIG. 53, where $V_x$ represents a final voltage of $C_{S3}$ or $C_{D2}$.

In some examples, assuming all charging and discharging current remains constant during the transient, an equation can be obtained that relates the final voltage of the capacitors to the initial condition by applying KCL for node K. In this example, the reduced turn-on voltage $V_x$ can be solved according to the following equations:

$$V_x \cdot C_{D2} + V_x \cdot C_{S4} = (800 - V_x) \cdot C_{S3}$$

$$V_x = \frac{V_{dc}}{2} \cdot \frac{C_{S3}}{C_{S3} + C_{S4} + C_{D2}}$$

Figure 54:
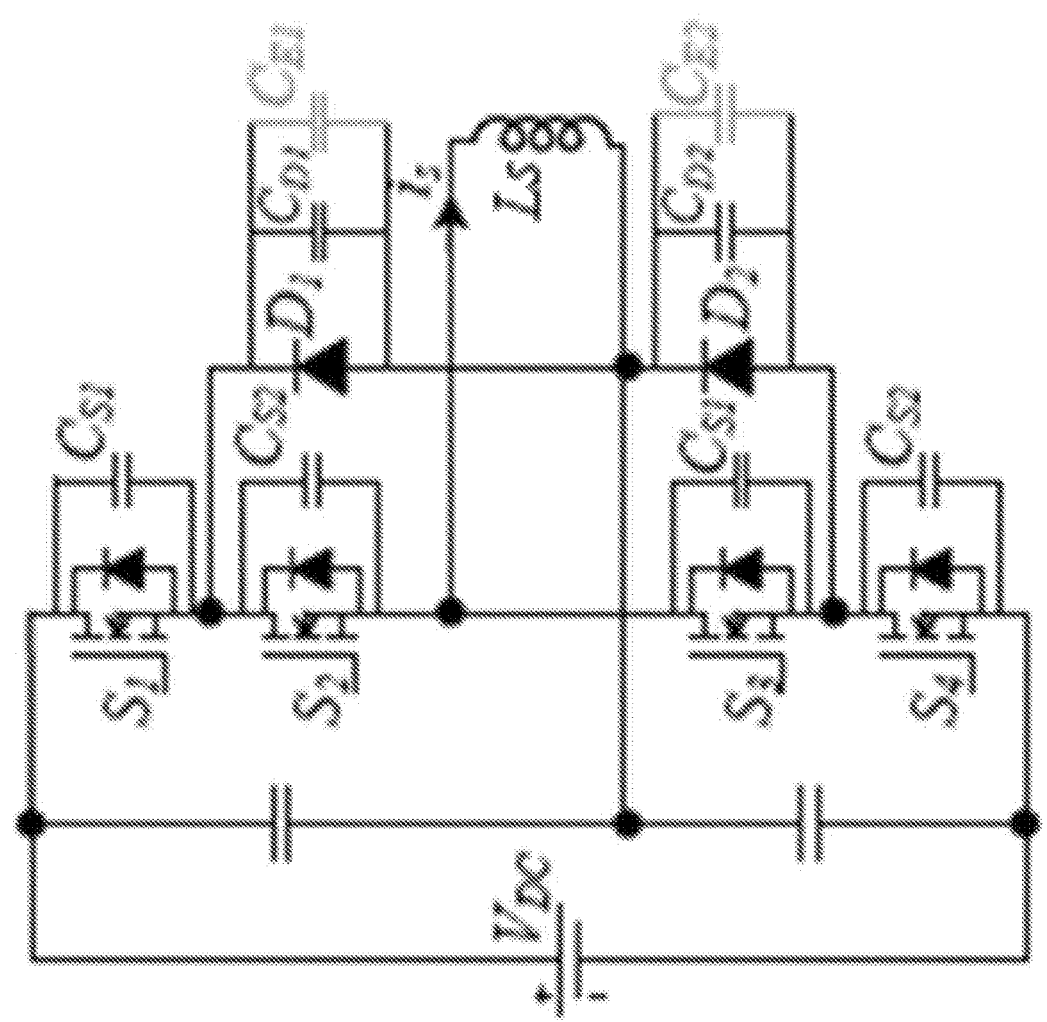
FIG. 54 depicts a primary side topology with external capacitors for reducing the turn-on voltage in NPC inner switches, according to some aspects.
Figure 55:
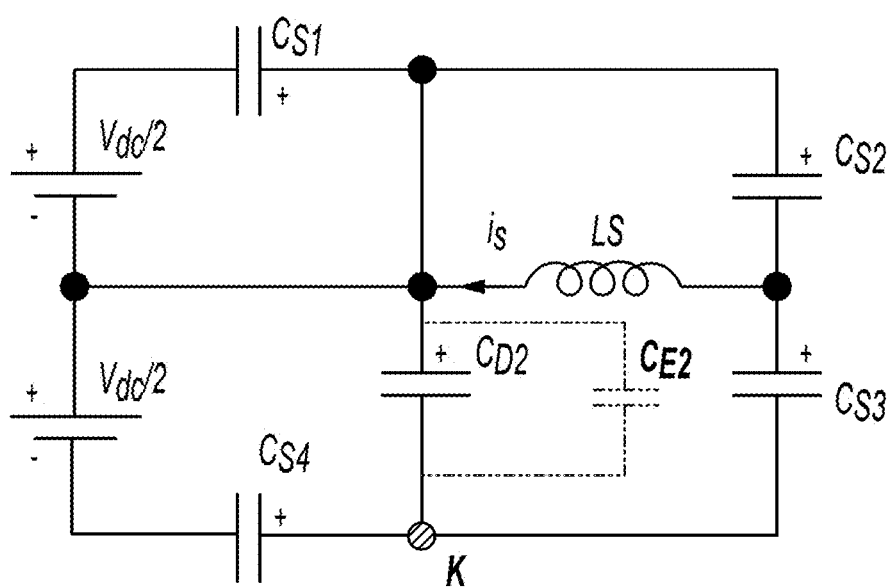
FIG. 55 depicts an equivalent circuit with external capacitor during transient, according to some aspects.
Figure 56:
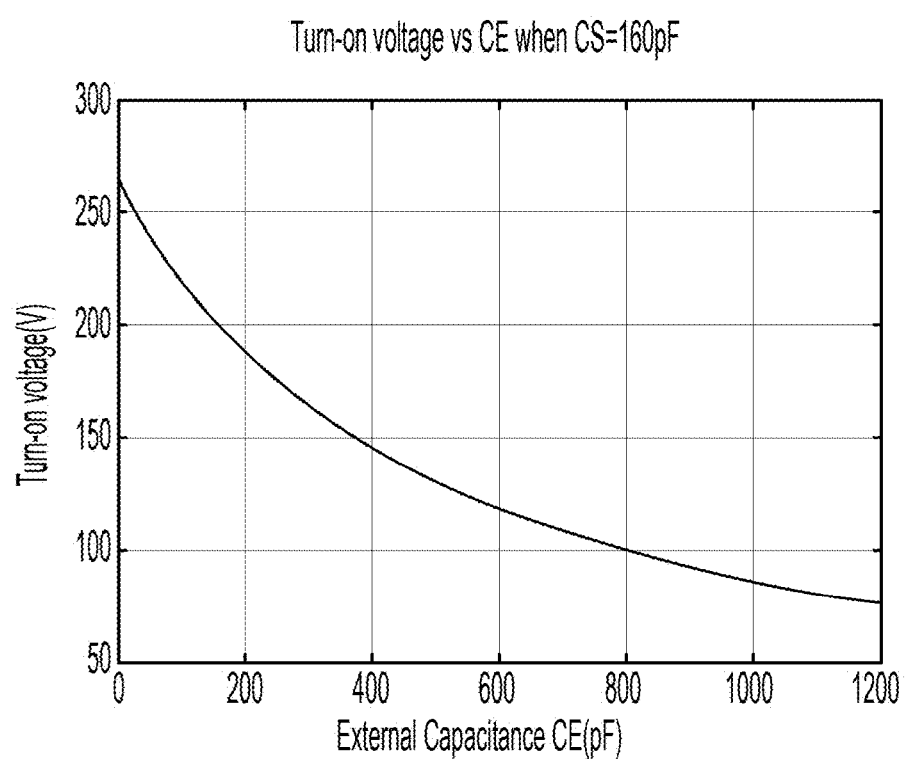
FIG. 56 depicts an example of a plot showing turn-on voltage decreases with external capacitance, according to some aspects.

In some aspects, adding an external capacitance in parallel with a diode parasitic capacitance can lower a turn-on voltage of the inner switch of the NPC. FIG. 54 depicts a primary side topology with external capacitors for reducing the turn-on voltage in NPC inner switches, according to some aspects. FIG. 55 depicts an equivalent circuit with external capacitor during transient, according to some aspects. FIG. 56 depicts an example of a plot showing turn-on voltage decreasing with an increase in external capacitance, according to some aspects. For example, in the plot depicted in FIG. 56, a 800 pF external capacitance reduces the turn-on voltage from 265 V to 100 V.

Illustrative Examples of a Comprehensive and Scalable Protection Scheme for Medium Voltage Power Electronics Systems In some aspects, a solid-state protection circuit can protect sensitive power converter electronics from grid events and can protect the grid from the power converter events. Conventional mechanical approaches used to protect existing power grid equipment are not capable of operating fast enough (e.g., in microseconds) to protect power converter systems, such as MV Fast charger described herein.

Figure 57:
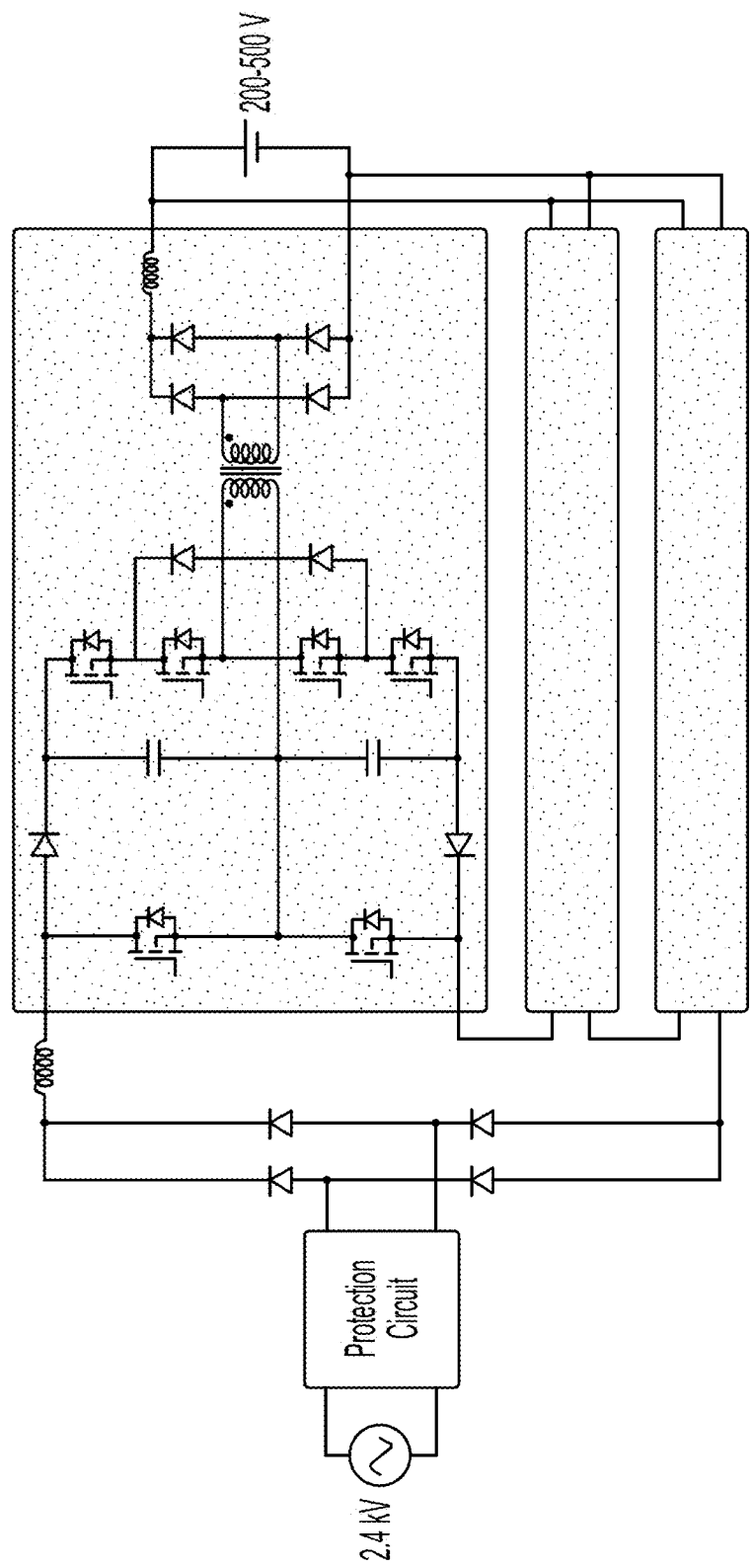
FIG. 57 depicts a protection circuit that can be located between a grid and a charger, according to some aspects.

FIG. 57 depicts a protection circuit that can be located between a grid and a MV fast charger, according to some aspects.

Figure 58:
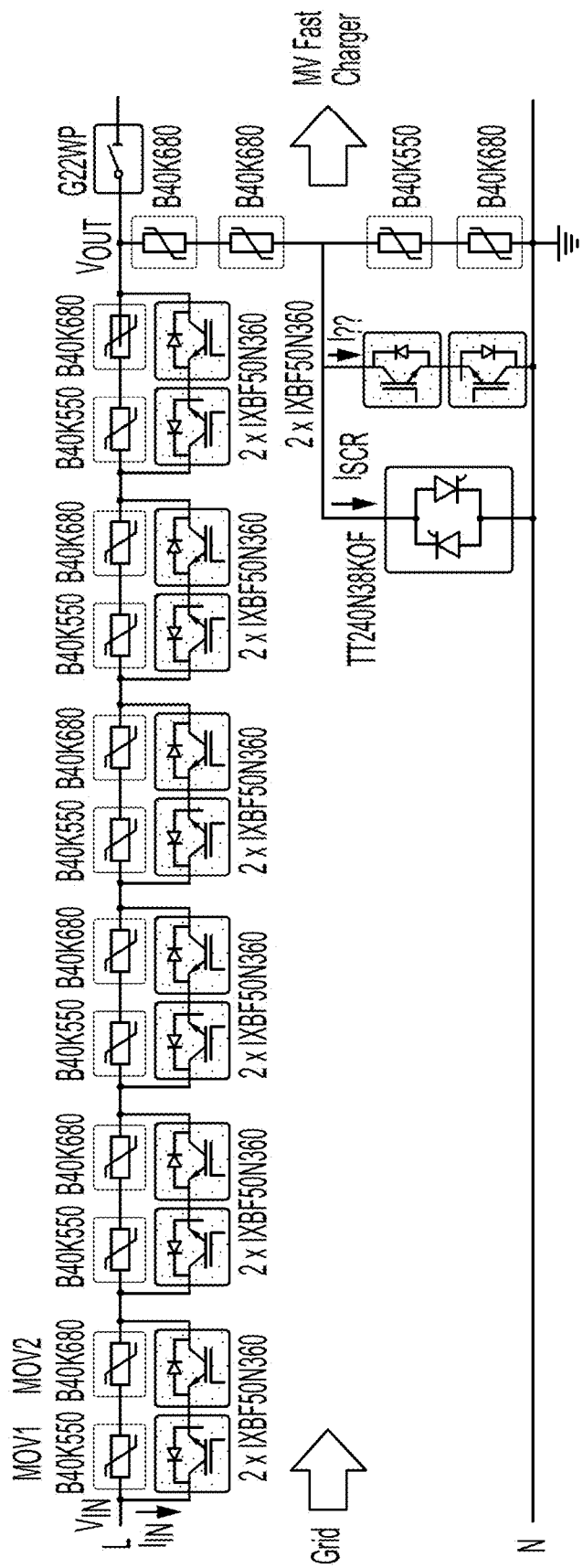
FIG. 58 is a schematic diagram of an example of a protection circuit implemented in a MV fast charger system, according to some aspects.

FIG. 58 is a schematic diagram of an example of a protection circuit implemented in a MV fast charger system, according to some aspects.

In the example depicted in FIG. 58, when overcurrent or overvoltage is detected, all series-connected insulated-gate bipolar transistors ("IGBTs") turn OFF. In some examples, Silicon controlled rectifiers ("SCRs") and IGBTs in parallel branches can turn ON, and HV Isolator (G22WP) can disconnect the MV fast charger from the grid. Continuing with this example, after the isolator is open, the SCRs and IGBTs in the parallel branches can turn OFF.

Figure 59:
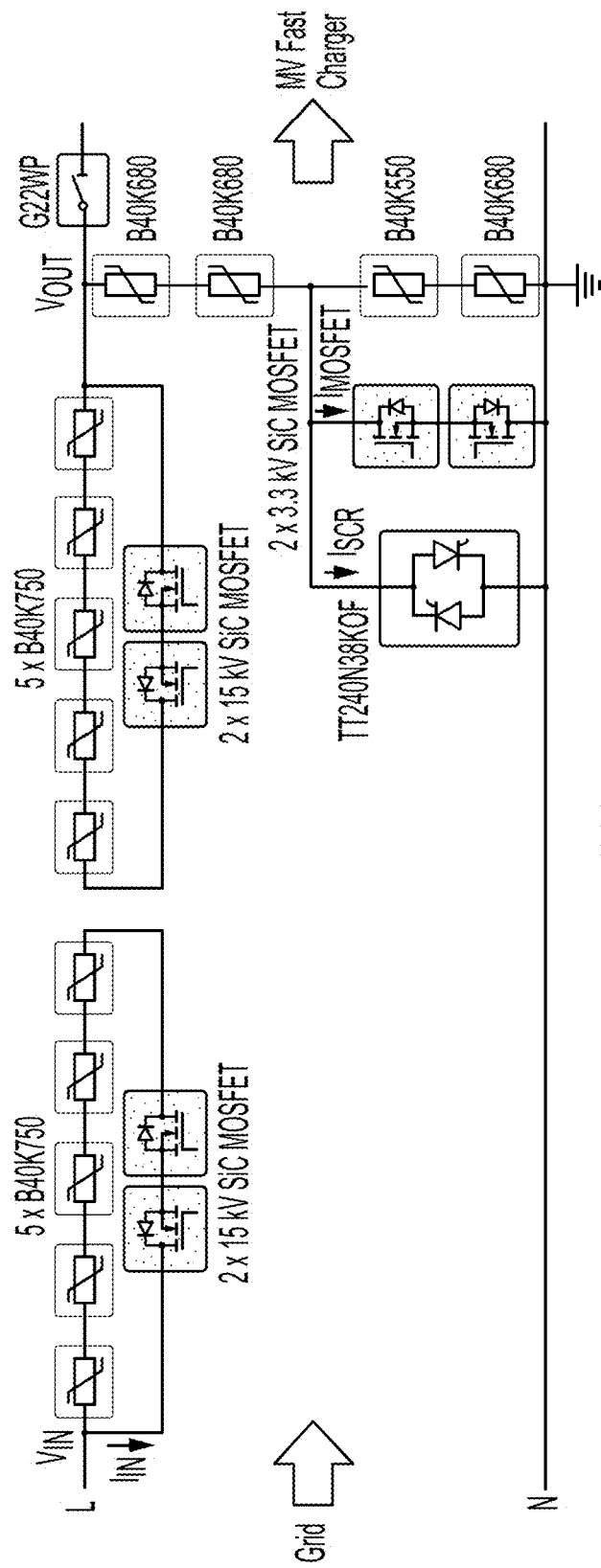
FIG. 59 is a schematic diagram of an example of the protection circuit with 15 kV MOSFETs implemented in a MV fast charger system, according to some aspects.

FIG. 59 is a schematic diagram of an example of the protection circuit with 15 kV MOSFETs implemented in a MV fast charger system, according to some aspects In this example, when overcurrent or overvoltage is detected, all series-connected 15 kV SiC MOSFETs turn OFF. SCRs and 3.3 kV MOSFETs in parallel branches turn ON and HV Isolator (G22WP) disconnects the MV fast charger from the grid. Continuing with this example, after the Isolator is open, the SCRs and IGBTs in the parallel branches turn OFF.

Figure 60:
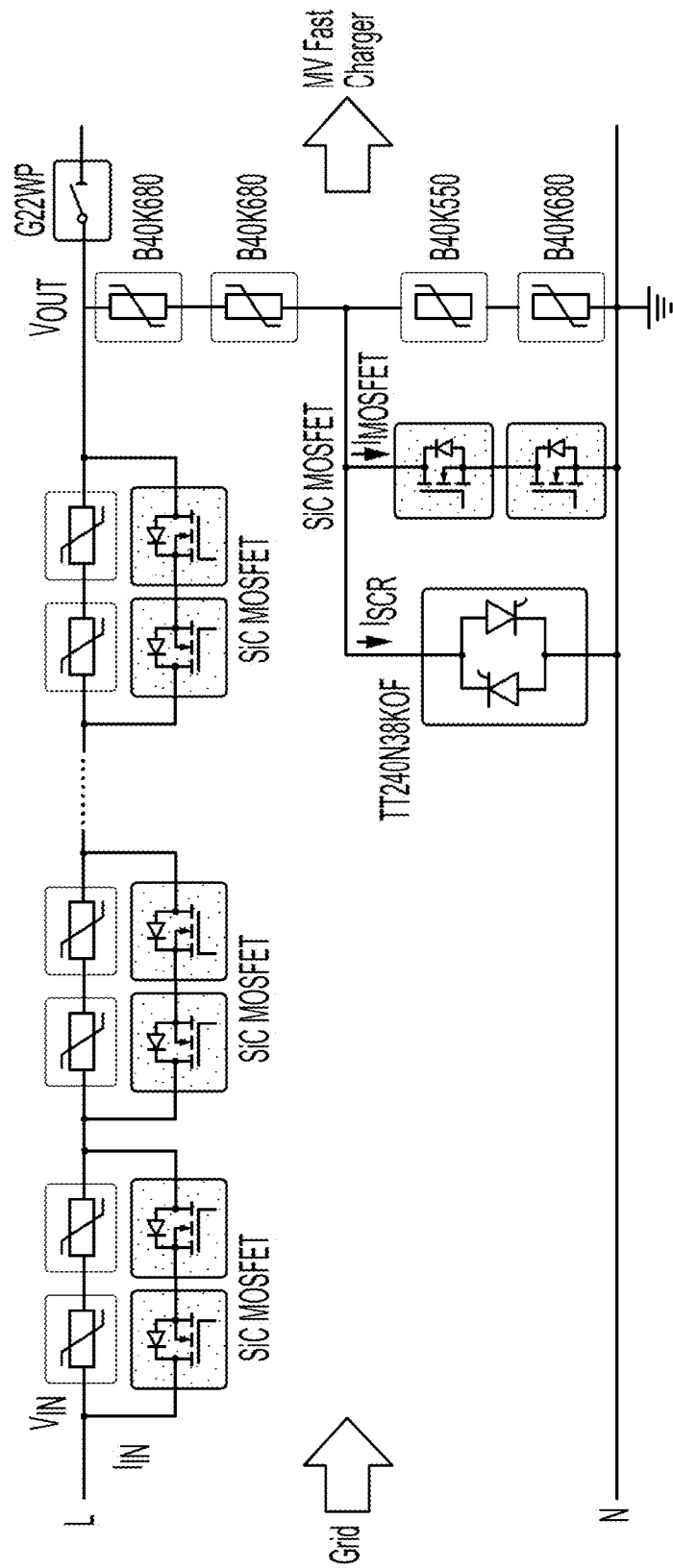
FIG. 60 is a schematic diagram of an example of the protection circuit with SiC MOSFETs and a higher input voltage implemented in a MV fast charger system, according to some aspects.

FIG. 60 is a schematic diagram of an example of the protection circuit with SiC MOSFETs and a higher input voltage implemented in a MV fast charger system, according to some aspects.

In this example, when overcurrent or overvoltage is detected, all series-connected SiC MOSFETs turn OFF. SCRs and SiC MOSFETs in parallel branches turn ON and HV Isolator (G22WP) disconnects the MV fast charger from the grid. After the Isolator is open, the SCRs and IGBTs in the parallel branches turn OFF.

Figure 61:
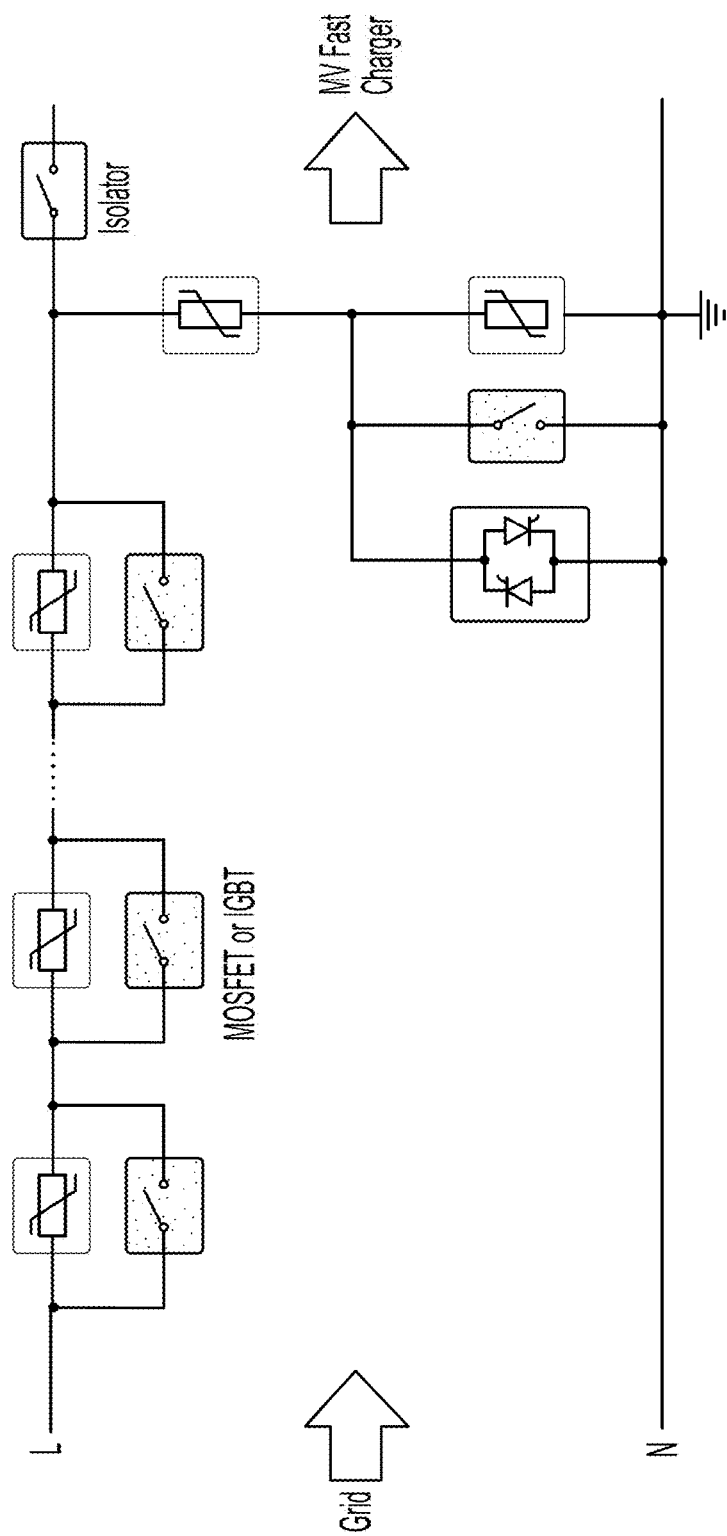
FIG. 61 is a schematic diagram of an example of a generalized protection circuit for higher input voltages, according to some aspects.

FIG. 61 is a schematic diagram of an example of a generalized protection circuit for higher input voltages, according to some aspects.

In the example depicted in FIG. 61, when overcurrent or overvoltage is detected, all series-connected bidirectional switches can turn OFF. SCRs and controlled bidirectional switches in parallel branches turn ON and HV Isolator (G22WP) disconnects the MV fast charger from the grid. After the Isolator is open, the SCRs and IGBTs in the parallel branches turn OFF.

Figure 62:
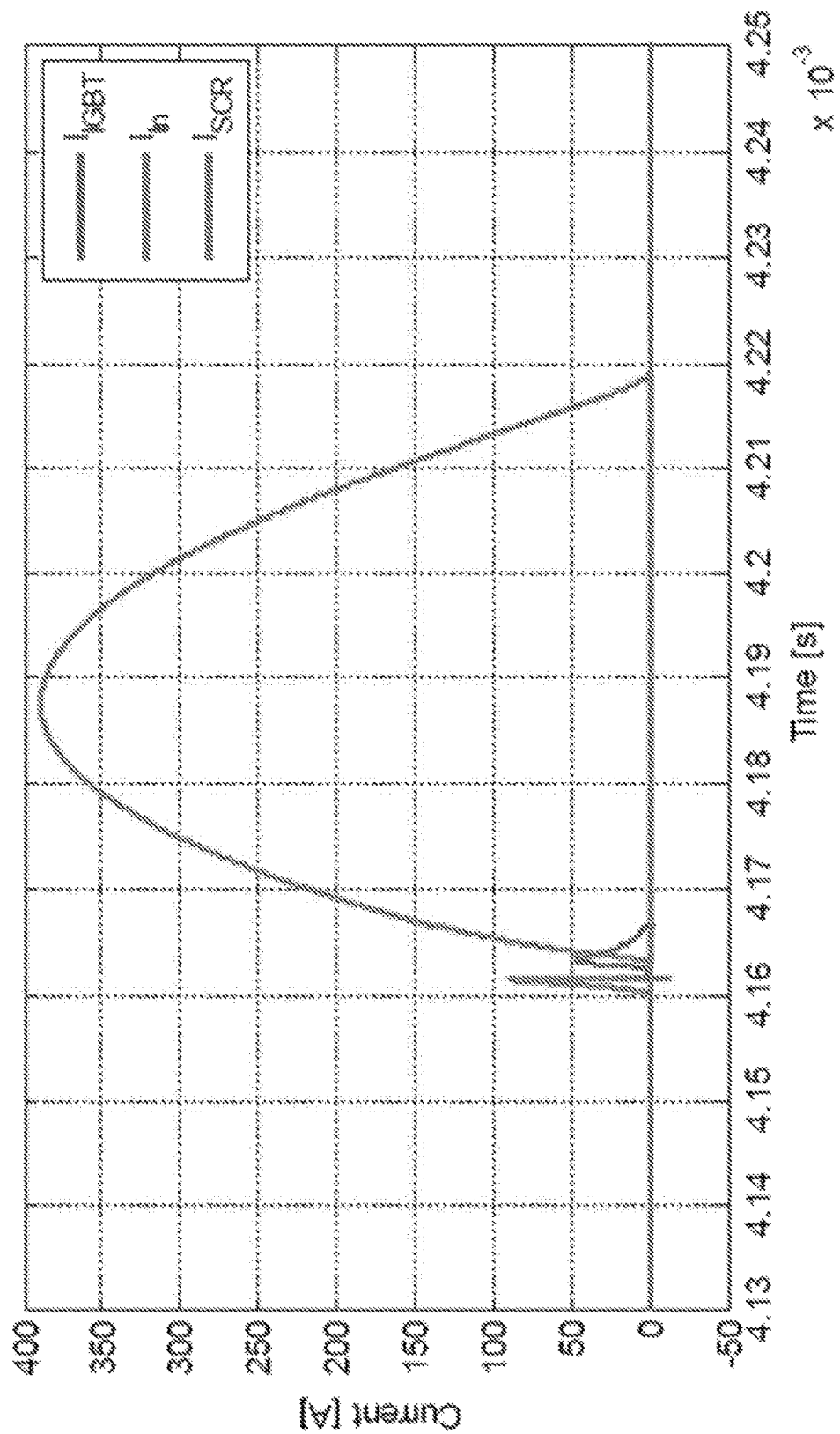
FIGS. 62-64 are graphs of an example of a simulated response of a protection circuit to the 30 kV 1.2/50 μs voltage pulse at the AC input, according to some aspects.
Figure 63:
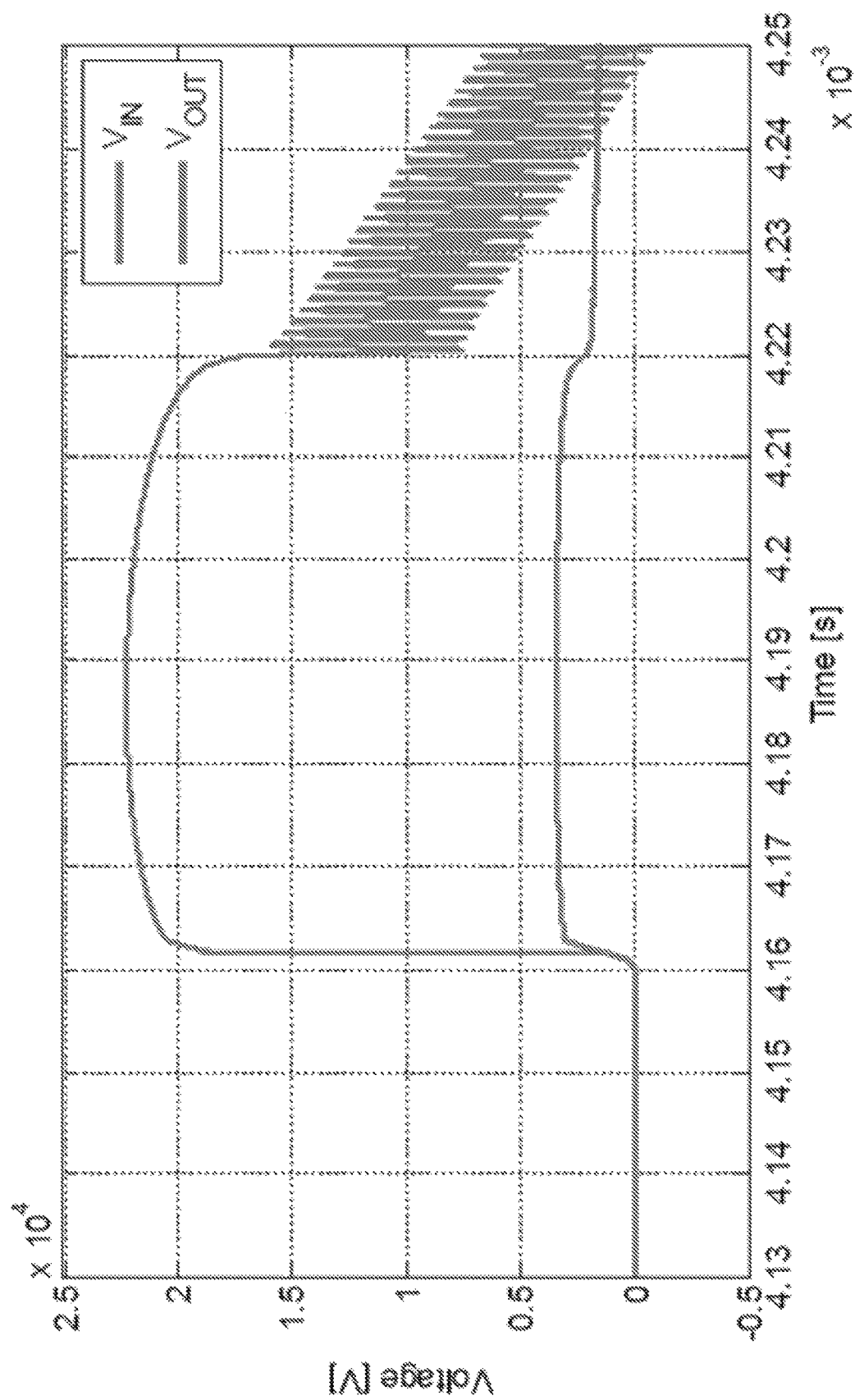
Figure 64:
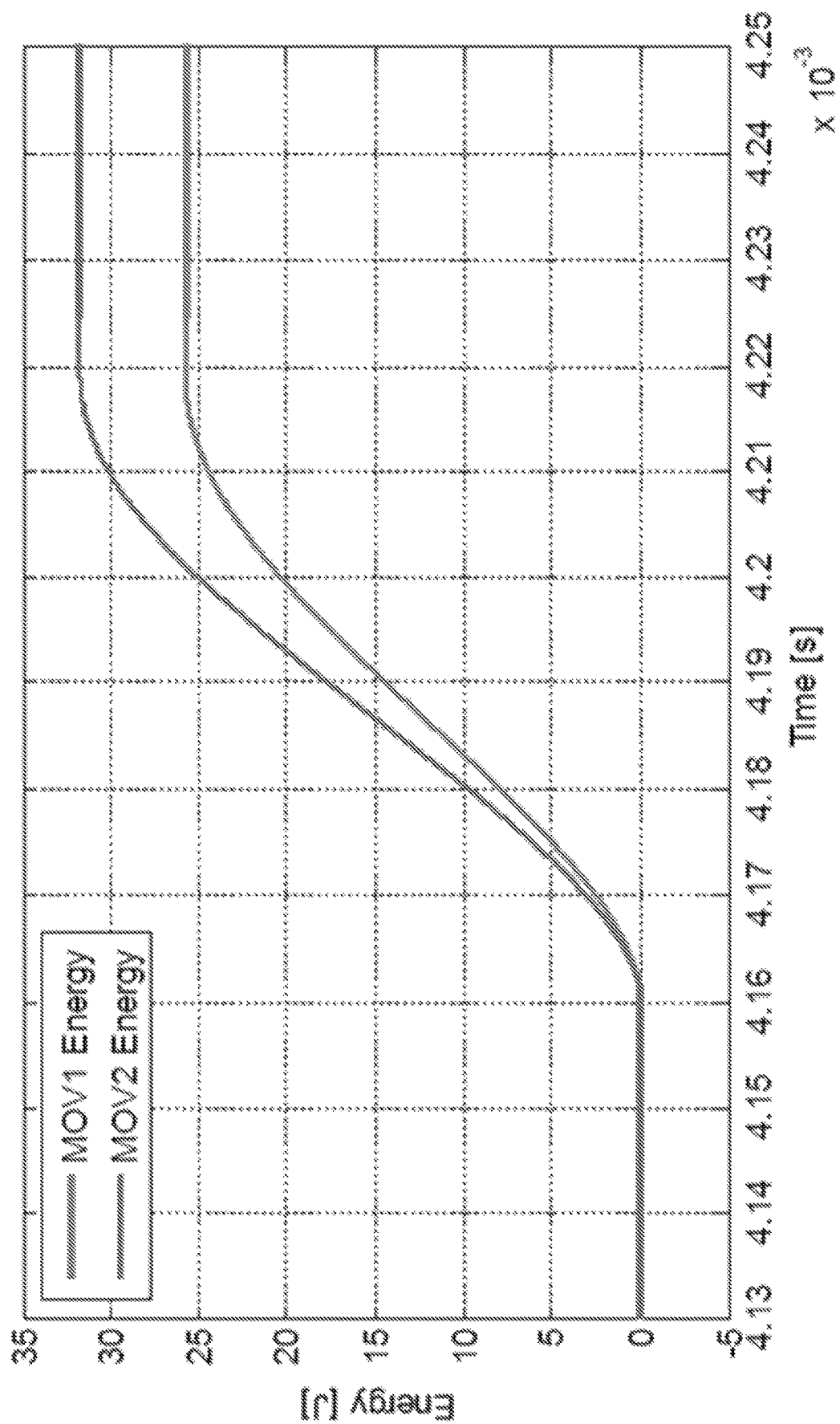

FIGS. 62-64 are graphs of an example of a simulated response of a protection circuit to the 30 kV 1.2/50 µs voltage pulse at the AC input, according to some aspects.

In this example, the pulse occurs at 4.16 ms. All the currents, voltages, and energy absorbed by the MOVs are below maximum permissible values.

Figure 65:
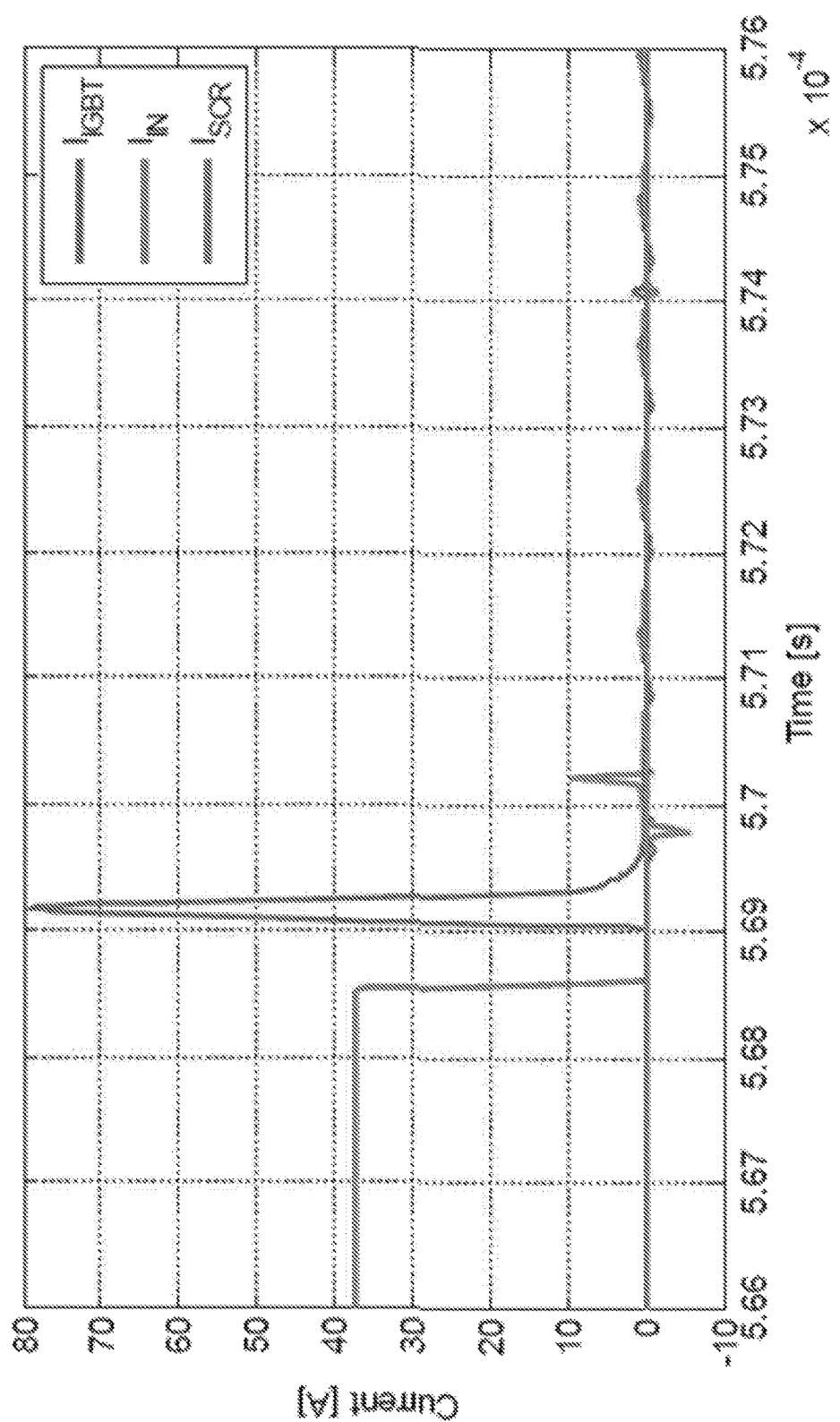
FIGS. 65-67 are graphs of an example of a simulated response of a protection circuit to the 12 kV, 60 Hz overvoltage at the AC input, according to some aspects.
Figure 66:
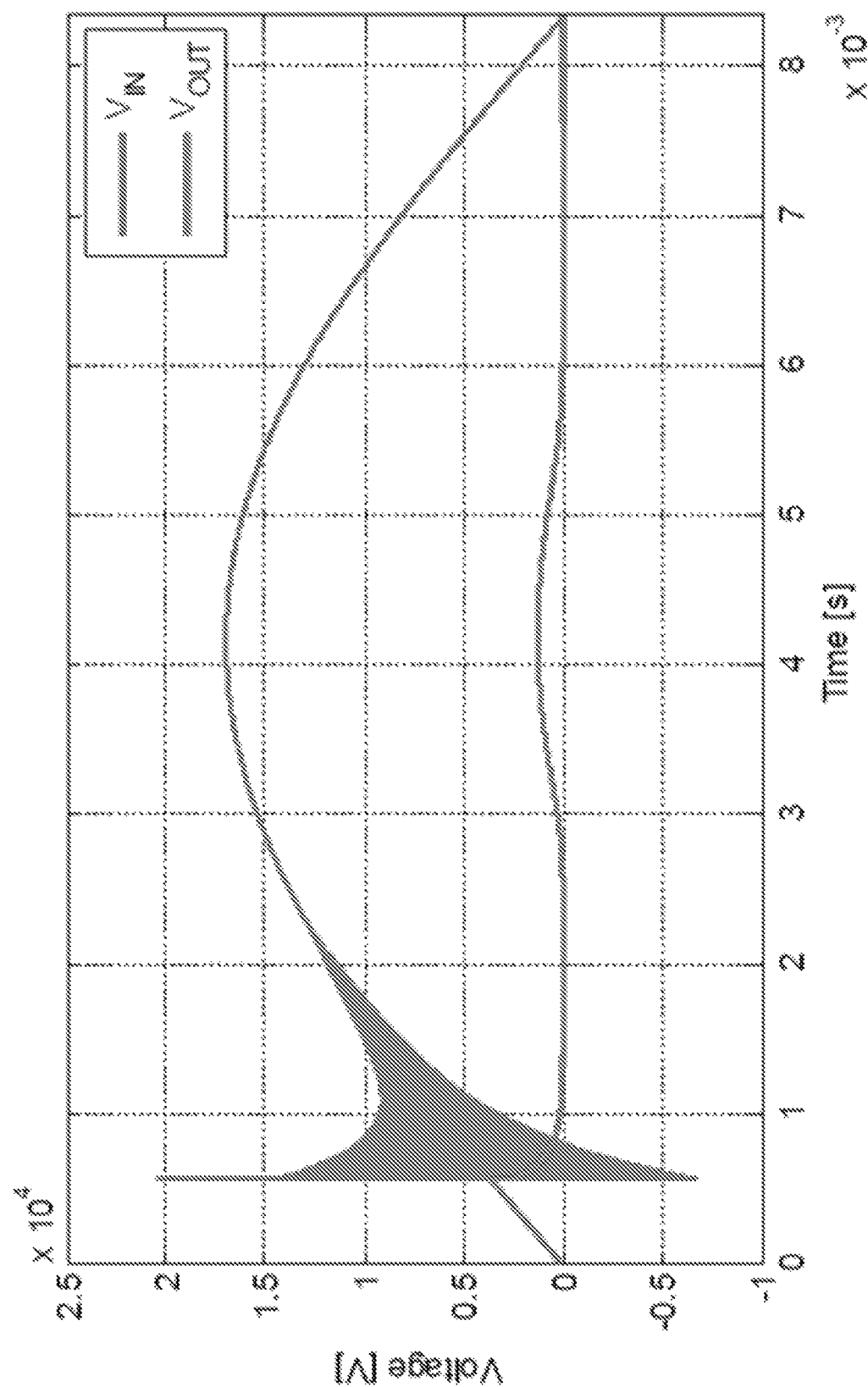
Figure 67:
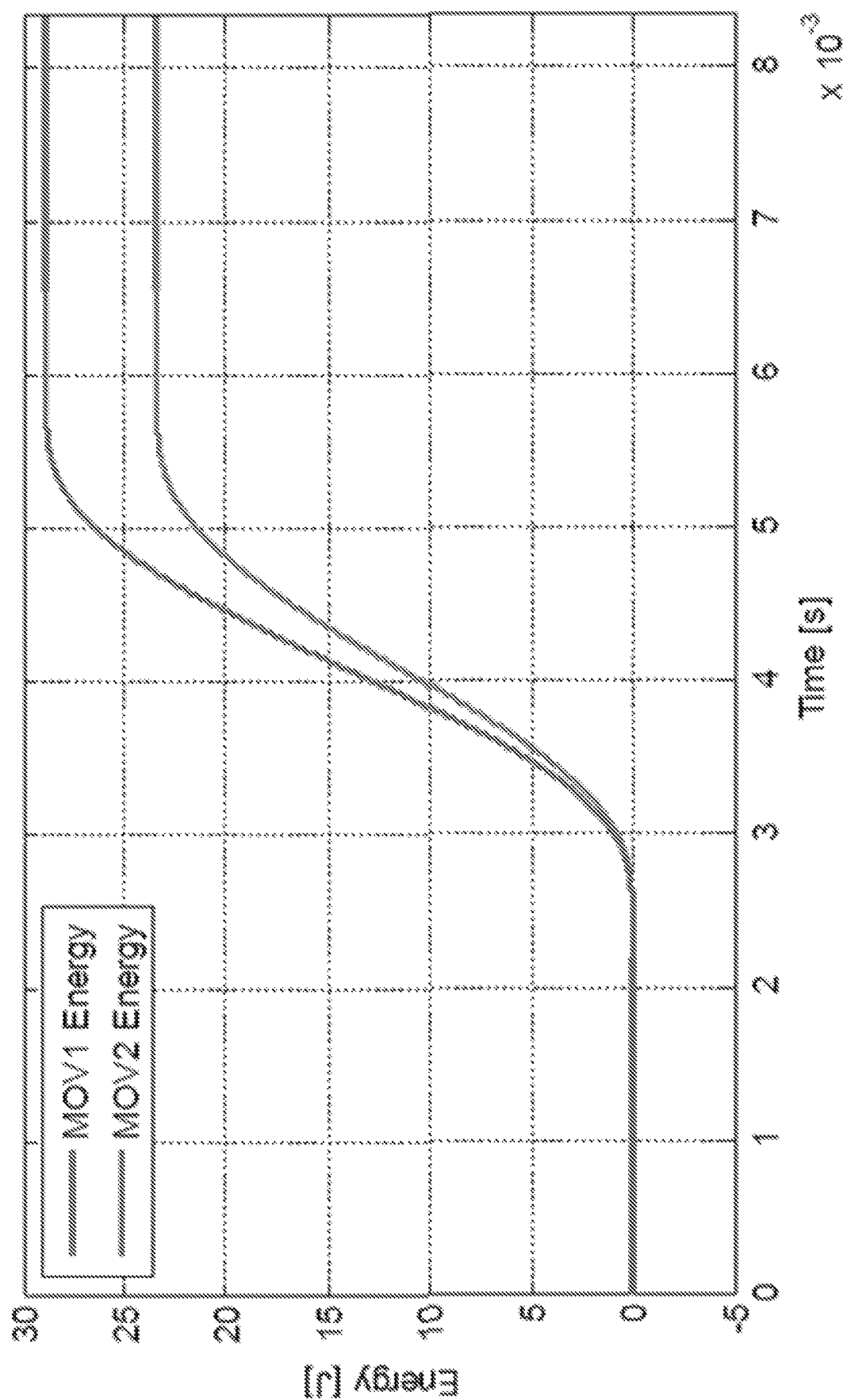

FIGS. 65-67 are graphs of an example of a simulated response of a protection circuit to the 12 kV, 60 Hz overvoltage at the AC input, according to some aspects.

In this example, overvoltage starts at line voltage zero crossing. All the currents, voltages, and energy absorbed by the MOVs are below maximum permissible values.

Figure 68:
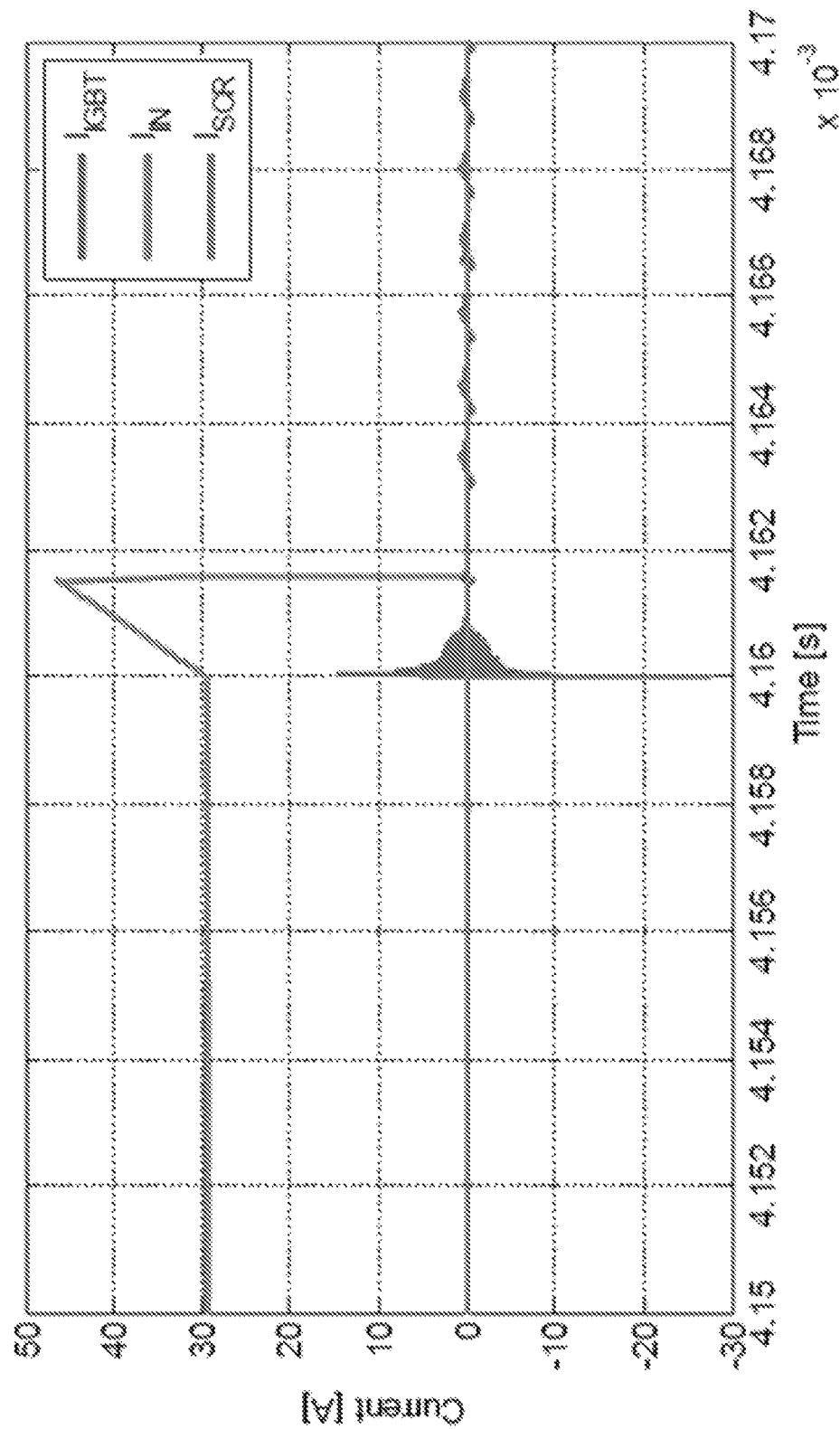
FIGS. 68-70 are graphs of an example of a simulated response of a protection circuit to the short circuit conditions before the fast charger rectifier diodes, according to some aspects.
Figure 69:
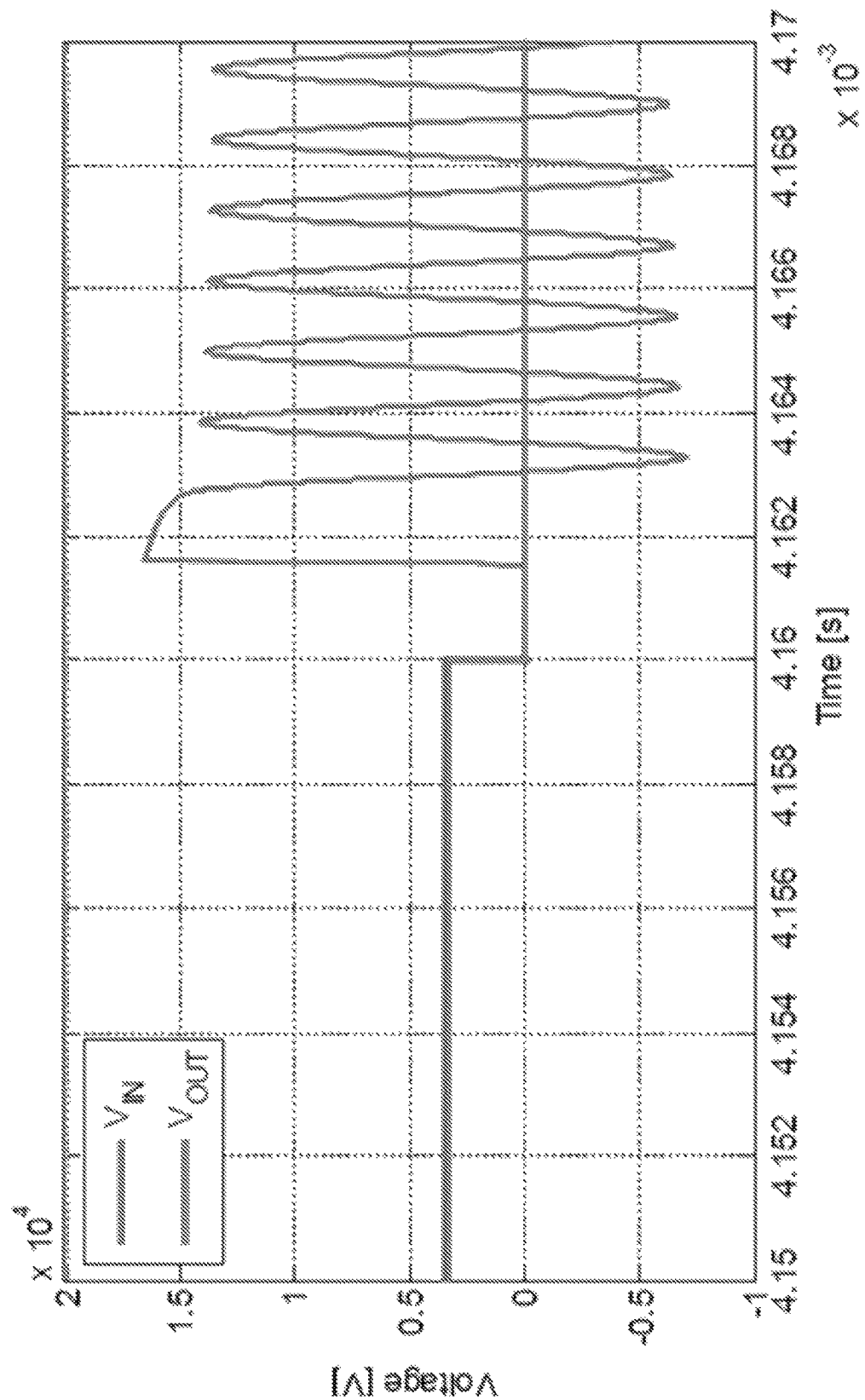
Figure 70:
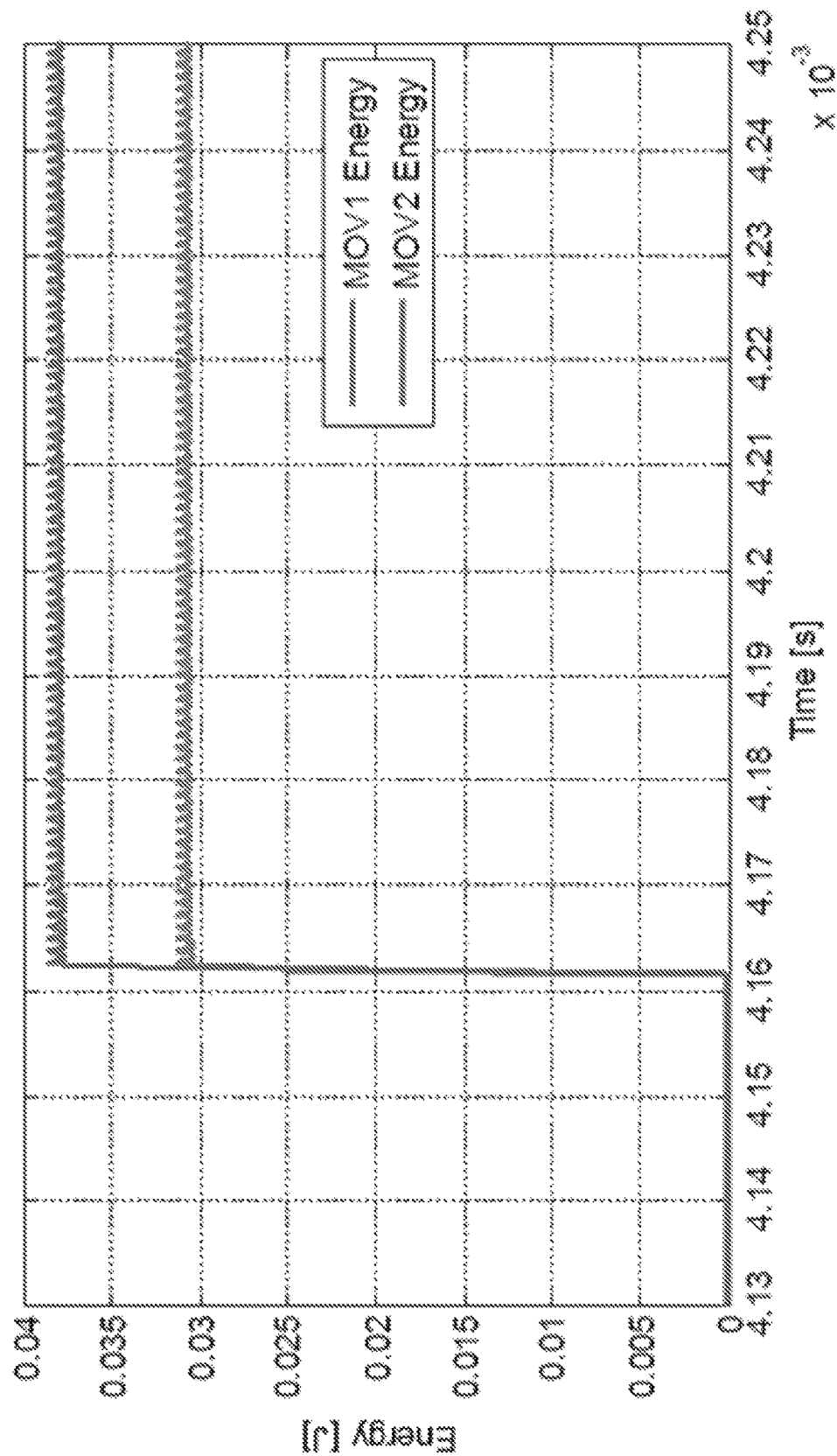

FIGS. 68-70 are graphs of an example of a simulated response of a protection circuit to the short circuit conditions before the fast charger rectifier diodes, according to some aspects.

In this example, the SC occurs at 4.16 ms. All the currents, voltages, and energy absorbed by the MOVs are below maximum permissible values.

Illustrative Examples of a High-Isolation Pulse Transformer with Low Coupling Capacitance for Gate Drive Power Supplies In some aspects, a high-isolation power supply for a gate drive circuit benefits from a high maximum operation voltage between the input and output terminals (e.g., a continuous DC or peak AC) and low coupling capacitance between the input and output terminals.

Figure 71:
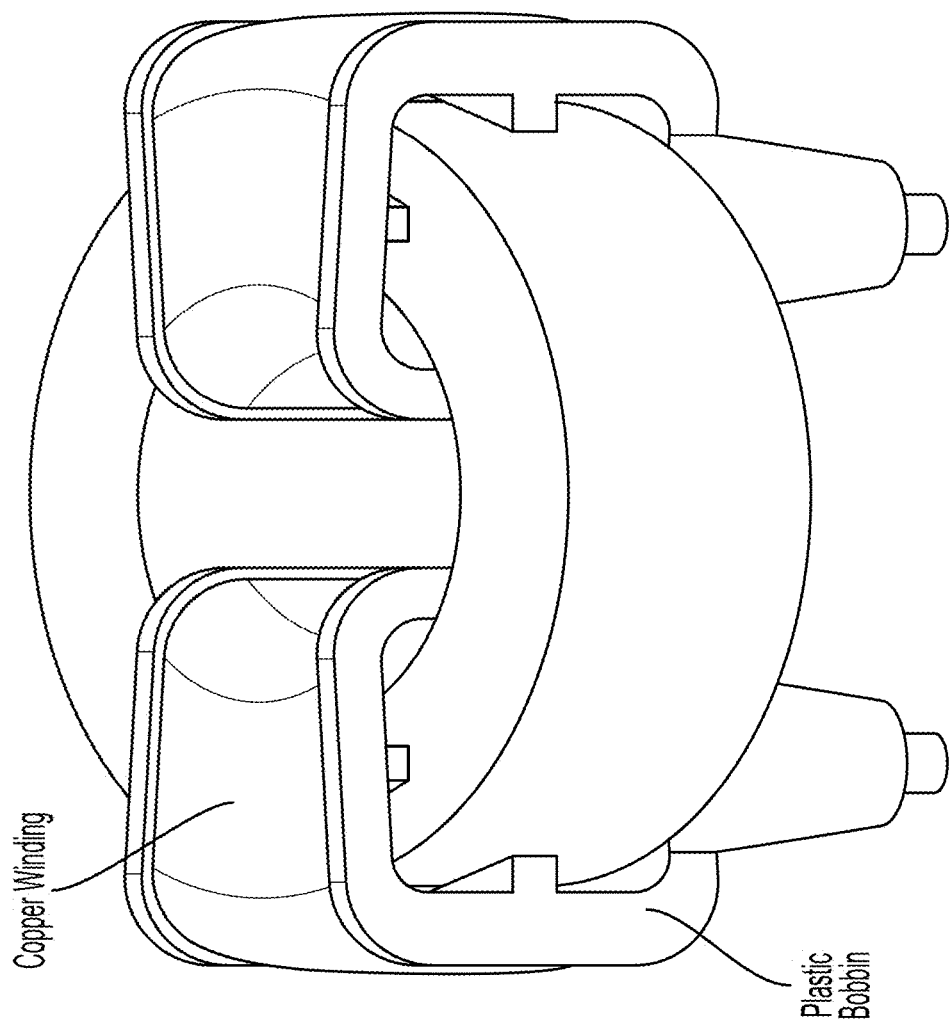
FIGS. 71-72 depict a perspective view and a cross-sectional side view respectively of an example of a pulse transformer with a toroid core, according to some aspects.
Figure 72:
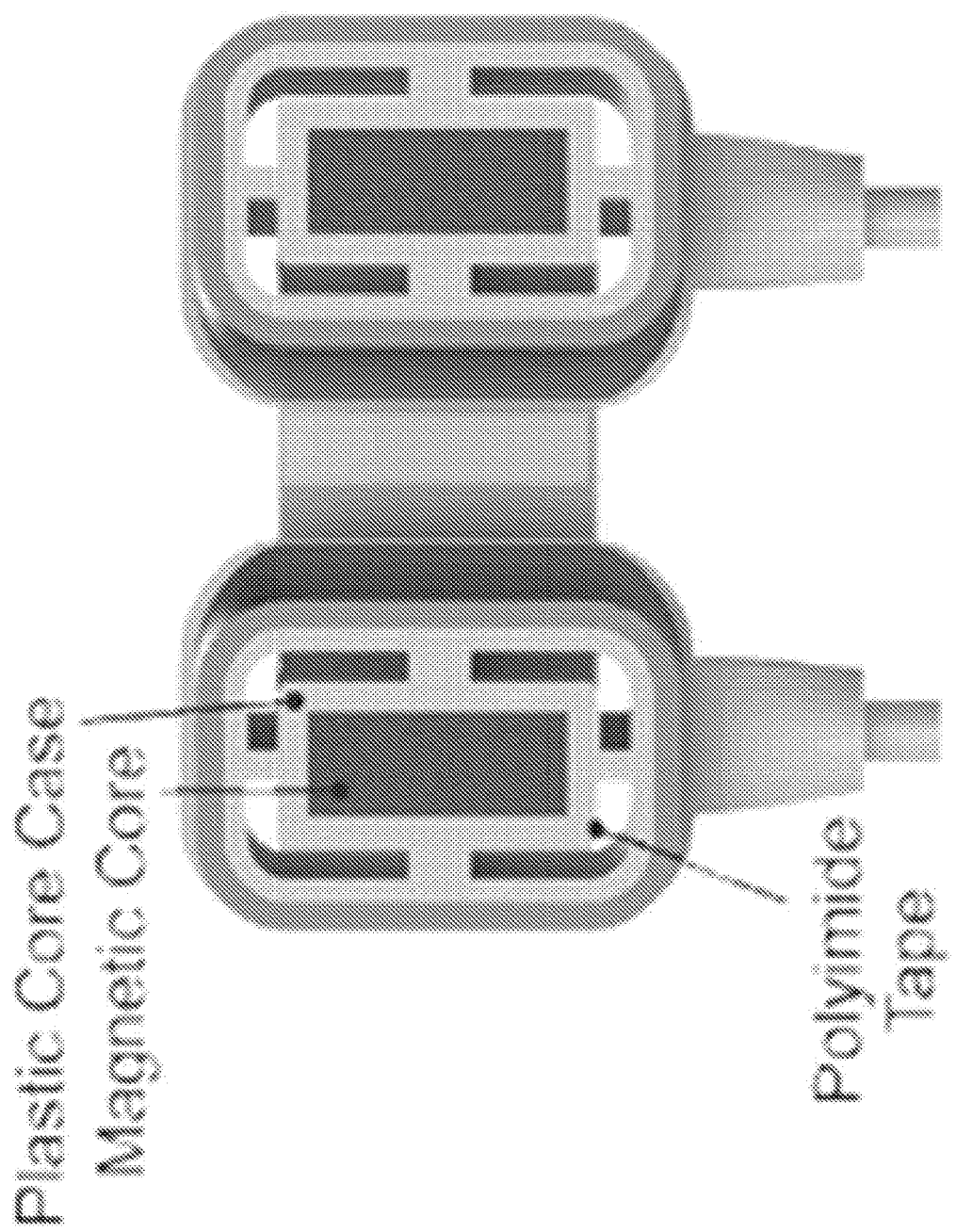

FIGS. 71-72 depict a perspective view and a cross-sectional side view respectively of an example of a pulse transformer with a toroid core, according to some aspects.

In some examples, the pulse transformer can generate 5 W output power with 12 kV continuous operating voltage and less than 1 pF primary-to-secondary coupling capacitance. The coupling capacitance can be based on the coupling path through the magnetic core. The air gaps between the core and bobbin can significantly reduce the coupling through the magnetic core. In additional or alternative examples, a core with a high p may be used to keep the leakage inductance low.

Figure 73:
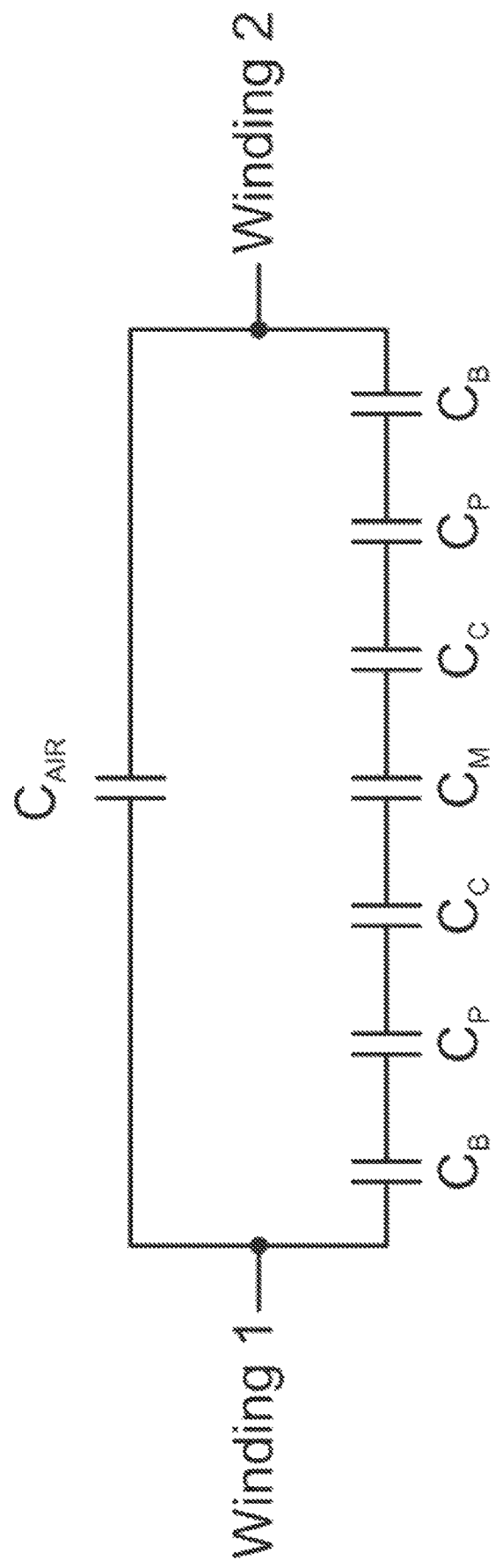
FIG. 73 is an example of an equivalent circuit for the coupling capacitance of the pulse transformer in FIGS. 71-72, according to some aspects.

FIG. 73 is an example of an equivalent circuit for the coupling capacitance of the pulse transformer in FIGS. 71-72, according to some aspects.

In this example, $C_{AIR}$ is the capacitance between the windings through air. $C_B$ is the capacitance of the bobbin core. $C_P$ is the capacitance of the polyimide tape. $C_C$ is the capacitance of the transformer core case. $C_M$ is the capacitance of the transformer core.

FIGS. 74-77 depict examples of the pulse transformer and are approximately a size of a quarter, according to some aspects.

Figure 74:
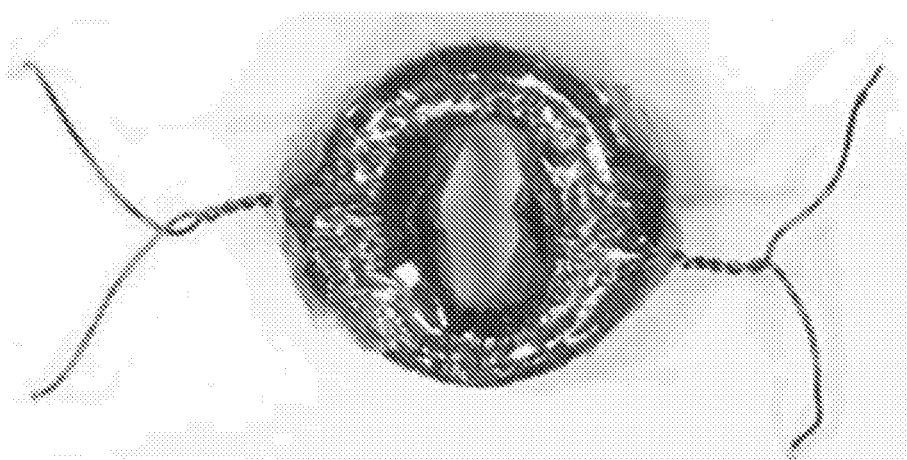
FIGS. 74-77 depict examples of the pulse transformer and are about the size of a quarter, according to some aspects.

FIG. 74 depicts a pulse transformer with a T38 ferrite core and no bobbin. In this example, a coupling capacitance of 3.3 pF was measured for the pulse transformer.

Figure 75:
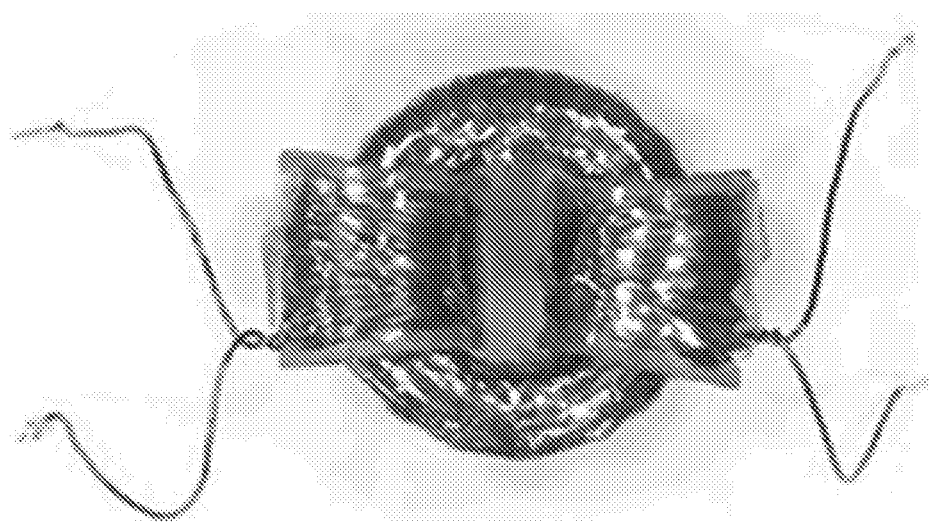

FIG. 75 depicts an example of a pulse transformer that includes a T38 ferrite core with a bobbin. In this example, a coupling capacitance of 1.5 pF was measured for the pulse transformer.

Figure 76:
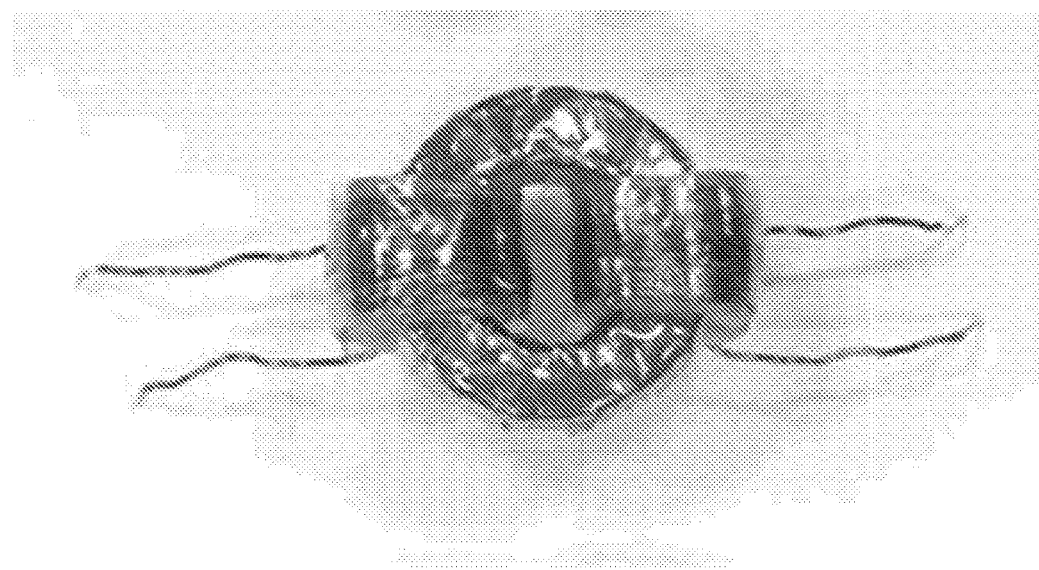

FIG. 76 is an example of a pulse transformer that includes a nanocrystalline core with an improved bobbin. In this example, a coupling capacitance of 1.2 pF was measured for the pulse transformer.

Figure 77:
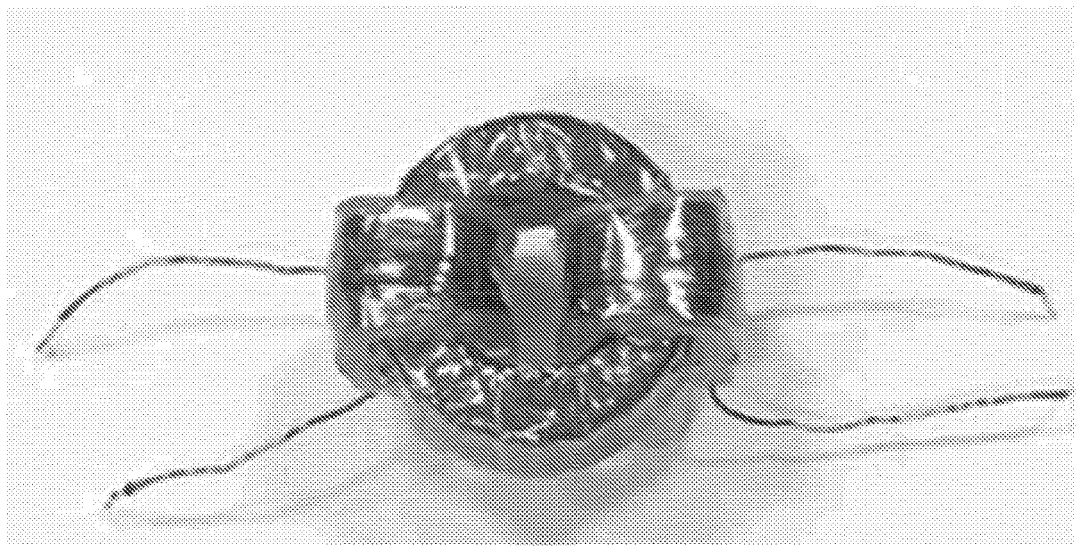

FIG. 77 depicts an example of a pulse transformer that includes a nanocrystalline core with a further improved bobbin. In this example, a coupling capacitance of 0.9 pF was measured for the pulse transformer.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. The examples of claims presented below are also not intended to be exhaustive or to limit claims emanating from the disclosure.

The invention claimed is:

1. A system comprising:
   one or more power electronic converters connected to a power grid;
   a rectifier;
   a power factor correction ("PFC") converter comprising one or more three-level boost ("TLB") power electronic converters comprising one or more input terminals and output terminals;
   one or more DC/DC converters comprising a plurality of input terminals, wherein the input terminals of the TLB converters are connected in series and the output terminals of the TLB converters are connected to the input terminals of the DC/DC converter;
   an input interface for measuring a rectifier input current, grid voltage, and TLB converter output voltage; and
   a processing device for:
      controlling the rectifier input current to be in phase with the grid voltage by applying one or more control signals to each of a plurality of active semiconductor switches inside each TLB converter.

2. A method for avoiding determining an operation region of a converter, the method comprising:
   receiving an input power signal comprising an input current signal;
   sampling a rectifier input current at a midpoint of an input current ripple;
   determining a future state and a duration of the future state in a next switching cycle for each of a plurality of three-level boost ("TLB") switches by determining a value of a switch duty cycle, wherein the value of the switch duty cycle is determined based on the equation:

$$d = 2Lf_s \frac{i_{avg\_ref}[k+1] - i_L[k]}{v_{bus}} + \frac{v_{bus} - |v_{in}|}{v_{bus}};$$

and
   using leading-triangle pulse width modulation to output one or more control signals by comparing the value of the switch duty cycle to an instantaneous value of a triangular periodic signal.

3. A system of power electronic converters comprising:
   a rectifier;
   a DC/DC converter comprising an active neutral point clamped ("ANPC") converter circuit on a primary and a converter on a secondary of a high-frequency transformer;
   an input interface for receiving an input current, input voltage, and output voltage signal; and
   a processing device for controlling the system.

4. The system of claim 3, wherein the ANPC converter circuit is configured to perform soft switching to improve a power efficiency of the DC/DC converter by controlling: a delay time between a voltage waveform on the primary of the high-frequency transformer and voltage waveform on the secondary of the high-frequency transformer; duty cycle of the primary-side ANPC converter circuit; and duty cycle of the secondary-side converter circuit.

5. The system of claim 3, wherein the ANPC converter circuit is configured to control one or more clamping position switches to achieve zero-voltage switching on all switches of the ANPC converter circuit.

6. A protection system for electrically coupling a power electronic converter to a medium-voltage electrical grid, the system comprising:
   a plurality of power electronic circuit breaker modules connected in series with a protectable power electronic converter;
   a power electronic circuit breaker module connected in parallel to the protectable power electronic converter; and
   a high-voltage relay to disconnect the protectable power electronic converter from the medium-voltage electrical grid in response to detecting an overcurrent or an overvoltage at one or more input terminals of the protectable power electronic converter by opening series-connected breaker modules, closing parallel-connected breaker modules, and opening the high-voltage relay to isolate the protectable power electronic converter from the medium-voltage electrical grid.

* * * * *